(12) United States Patent
Ehlers et al.

(10) Patent No.: US 7,343,226 B2
(45) Date of Patent: Mar. 11, 2008

(54) SYSTEM AND METHOD OF CONTROLLING AN HVAC SYSTEM

(75) Inventors: Gregory A. Ehlers, Bradenton, FL (US); Joseph Beaudet, Prince George, VA (US)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 11/588,010

(22) Filed: Oct. 26, 2006

(65) Prior Publication Data

US 2007/0043477 A1 Feb. 22, 2007

Related U.S. Application Data

(60) Division of application No. 10/628,518, filed on Jul. 28, 2003, now Pat. No. 7,130,719, which is a continuation of application No. 10/402,370, filed on Mar. 28, 2003, now abandoned.

(60) Provisional application No. 60/383,027, filed on May 24, 2002, provisional application No. 60/368,963, filed on Mar. 28, 2002.

(51) Int. Cl.
G05B 13/00 (2006.01)
G06F 17/00 (2006.01)
G06F 19/00 (2006.01)

(52) U.S. Cl. .................. 700/276; 700/291; 705/412; 702/60; 702/130

(58) Field of Classification Search ........ 700/276–278, 700/286, 291, 297–300; 705/412; 702/60, 702/130
See application file for complete search history.

(56) References Cited

U.S. PATENT DOCUMENTS 1,547,242 A 7/1925 Strieby

| 4,075,699 A | 2/1978 | Schneider et al. |
| 4,174,517 A | 11/1979 | Mandel |
| 4,217,646 A | 8/1980 | Caltagirone et al. |
| 4,218,737 A | 8/1980 | Buscher et al. |

(Continued)

FOREIGN PATENT DOCUMENTS

CA 2121124 A1 7/1993

(Continued)

OTHER PUBLICATIONS

"50 Successful DSM Programs", The Results Center, lists Mar. 1994.

(Continued)

Primary Examiner—Leo Picard
Assistant Examiner—Sean Shechtman
(74) Attorney, Agent, or Firm—Andrus, Sceales, Starke & Sawall, LLP

(57) ABSTRACT

A system and method manage delivery of energy from a distribution network to one or more sites. Each site has at least one device coupled to the distribution network. The at least one device controllably consumes energy. The system includes a node and a control system. The node is coupled to the at least one device for sensing and controlling energy delivered to the device. A control system is coupled to the node and distribution network for delivery to the node at least one characteristic of the distribution network. The node controls the supply of energy to the device as a function of the at least one characteristic.

19 Claims, 18 Drawing Sheets

U.S. PATENT DOCUMENTS

| | | | |
|---|---|---|---|
| 4,245,319 A | 1/1981 | Hedges | |
| 4,291,375 A | 9/1981 | Wolf | |
| 4,324,987 A | 4/1982 | Sullivan, II et al. | |
| 4,336,462 A | 6/1982 | Hedges et al. | |
| 4,338,791 A | 7/1982 | Stamp, Jr. et al. | |
| 4,341,345 A * | 7/1982 | Hammer et al. | 236/46 R |
| 4,367,414 A | 1/1983 | Miller et al. | |
| 4,382,544 A | 5/1983 | Stewart | |
| 4,466,074 A | 8/1984 | Jindrick et al. | |
| 4,475,193 A | 10/1984 | Brown | |
| 4,503,288 A | 3/1985 | Kessler | |
| 4,511,979 A | 4/1985 | Amirante | |
| 4,513,189 A | 4/1985 | Ueda et al. | |
| 4,514,594 A | 4/1985 | Brown et al. | |
| 4,520,576 A | 6/1985 | Vander Molen | |
| 4,521,645 A | 6/1985 | Carroll | |
| 4,523,307 A | 6/1985 | Brown et al. | |
| 4,539,562 A | 9/1985 | Sanders | |
| 4,549,274 A | 10/1985 | Lerner et al. | |
| 4,567,557 A | 1/1986 | Burns | |
| 4,630,218 A | 12/1986 | Hurley | |
| 4,663,775 A | 5/1987 | Olek | |
| 4,665,544 A | 5/1987 | Honda et al. | |
| 4,697,182 A | 9/1987 | Swanson | |
| 4,701,698 A | 10/1987 | Karlsson et al. | |
| 4,728,949 A | 3/1988 | Platte et al. | |
| 4,771,185 A | 9/1988 | Feron et al. | |
| 4,772,870 A | 9/1988 | Reyes | |
| 4,819,180 A | 4/1989 | Hedman et al. | |
| 4,847,554 A | 7/1989 | Goodwin | |
| 4,847,780 A | 7/1989 | Gilker et al. | |
| 4,847,781 A | 7/1989 | Brown, III et al. | |
| 4,847,782 A | 7/1989 | Brown, Jr. et al. | |
| 4,855,922 A | 8/1989 | Huddleston et al. | |
| 4,884,021 A | 11/1989 | Hammond et al. | |
| 4,888,495 A | 12/1989 | Feron et al. | |
| 4,897,798 A * | 1/1990 | Cler | 700/276 |
| 4,899,129 A | 2/1990 | MacFadyen et al. | |
| 4,899,217 A | 2/1990 | MacFadyen et al. | |
| 4,971,136 A | 11/1990 | Mathur et al. | |
| 4,977,515 A | 12/1990 | Rudden et al. | |
| 4,987,513 A | 1/1991 | Shelley | |
| 4,998,097 A | 3/1991 | Noth et al. | |
| 5,033,112 A | 7/1991 | Bowling et al. | |
| 5,045,823 A | 9/1991 | Nichols, III | |
| 5,086,385 A | 2/1992 | Launey et al. | |
| 5,090,024 A | 2/1992 | Vander Mey et al. | |
| 5,101,191 A | 3/1992 | MacFadyen et al. | |
| 5,109,222 A | 4/1992 | Welty | |
| 5,126,934 A | 6/1992 | MacFadyen | |
| 5,134,356 A | 7/1992 | El-Sharkawi | |
| 5,168,170 A | 12/1992 | Hartig | |
| 5,170,360 A | 12/1992 | Porter et al. | |
| 5,196,982 A | 3/1993 | Landsberg et al. | |
| 5,218,552 A | 6/1993 | Stirk et al. | |
| 5,220,311 A | 6/1993 | Schweitzer, Jr. | |
| 5,263,046 A | 11/1993 | Vander Mey | |
| 5,274,571 A | 12/1993 | Hesse et al. | |
| 5,278,862 A | 1/1994 | Vander Mey | |
| 5,289,362 A | 2/1994 | Liebl et al. | |
| 5,301,122 A | 4/1994 | Halpern | |
| 5,315,499 A | 5/1994 | Bilas et al. | |
| 5,323,307 A | 6/1994 | Wolf et al. | |
| 5,347,167 A | 9/1994 | Singh | |
| 5,414,640 A | 5/1995 | Seem | |
| 5,436,510 A | 7/1995 | Gilbert | |
| 5,462,225 A | 10/1995 | Massara et al. | |
| 5,469,365 A | 11/1995 | Diekena et al. | |
| 5,475,371 A | 12/1995 | Dunk et al. | |
| 5,501,267 A | 3/1996 | Iritani et al. | |
| 5,572,438 A | 11/1996 | Ehlers et al. | |
| 5,598,349 A | 1/1997 | Elliason et al. | |
| 5,684,710 A | 11/1997 | Ehlers et al. | |
| 5,696,695 A | 12/1997 | Ehlers et al. | |
| 5,924,486 A | 7/1999 | Ehlers et al. | |
| 6,181,985 B1 | 1/2001 | O'Donnell et al. | |
| 6,311,105 B1 | 10/2001 | Budike, Jr. | |
| 2001/0010032 A1 | 7/2001 | Ehlers et al. | |
| 2002/0019712 A1 | 2/2002 | Petite et al. | |
| 2003/0036810 A1 | 2/2003 | Petite | |
| 2003/0036822 A1 | 2/2003 | Davis et al. | |

FOREIGN PATENT DOCUMENTS

| | | |
|---|---|---|
| DE | 27 43 212 | 3/1979 |
| EP | 0 163 572 A1 | 12/1985 |
| EP | 0 288 413 A1 | 10/1988 |
| EP | 0 534 839 A1 | 3/1993 |
| EP | 0 577 532 A1 | 1/1994 |
| EP | 0 580 217 A1 | 1/1994 |
| EP | 0 688 085 A1 | 12/1995 |
| FR | 2 645 968 | 10/1990 |
| FR | 2 660 511 | 10/1991 |
| WO | WO 93/08653 | 4/1993 |
| WO | WO 94/00824 | 1/1994 |
| WO | WO 94/03989 | 2/1994 |
| WO | WO 94/09572 | 4/1994 |

OTHER PUBLICATIONS

"A-14—DMS 350A Programming Reference", Jul. 1998, 1 page.
"Bell of Pennsylvania's automatic meter reading coult mean greater security and privacy for customers", PR Newswire, Feb. 28, 1990.
"Boosting Your Home's IQ: Manufacturers agree on standards for creating the smart house", Technology, p. 70 (not dated).
"Cebus (R) power line carrier technologies from Intellon Corp. support home automation application", PR Newswire, Mar. 1, 1994.
"Commonwealth Edison Installs Metricom's communication network" Business Wire, Mar. 4, 1993.
"Demonstrating smarts; bright home; a demonstration home that utilizes consumer electronics . . . " Popular Science, Jul. 1991.
"DMS and Operator Interface Guide Specification", Dec. 1991, pp. 1-33.
"DMS Facilities Management System FMS2-35SX", Robertshaw Control Division, Nov. 1991, 4 pages.
"Energy announces a major development in its residential customer-controlled load manage . . . " PR Newswire Assoc., Jan. 19, 1994.
"Energy moves into fiber optics to control residential consumption", Energy Report, Dec. 4, 1992. vol. 20, No. 49 (sr abst).
"Entergy Enterprises" CC2000 test joined by Sprint Honeywell . . . PR Newswire Assoc., Aug. 26, 1993.
"First Pacific Networks, Central and South West Corp. to conduct energy management project in Laredo, TX", Business Wire, Mar. 24, 1994.
"Home automation: what's in it for utilities?", EPRI, Apr. 1990.
"Honeywell, Oracle Corp. unveil joint technology and marketing alliance", Electric Utility Week's Demand-Side Report, Mar. 3, 1994.
"Is DSM having an impact on electric-utility credit ratings?", Electrical World, Aug. 1993.
"Itron signs $27M contact with Baltimore Gas and Electric", PR Newswire, Apr. 4, 1994.
Johnson Controls makes entry into home energy automation market . . . , PR Newswire, Mar. 29, 1994.
"Leading companies demonstrate home automation based on Echelon's technology", Business Wire, Apr. 14, 1994.
"Lon Works—the choice in hone automation", Motorola, Mar. 1994.
"MicroSmart Control Network (Features and Benefits)", Siebe Environmental Controls, 1993, 10 Pages.
"MicroSmart Control Network System Overview", Siebe Environmental Controls, Nov. 1993, pp. 1-12.
"MicroSmart MSC-NC/NCM (Network Communications Module) Installation Guidelines", Siebe Environmental Controls, Jun. 1993, pp. 1-9.

"MicroSmart References (DOS Configuration Tool)", Siebe Environmental Controls, Jul. 1993, 2 pages.

"MSC-MPC Multi-Purpose Controller (Installation Guidelines)", Sieve Environmental Controls, Nov. 1990, pp. 1-17.

"MSC-MPC-100 MSC-MPC-RC MSC-MPC-RCM MicroSmart Multi-Purpose Controllers", Siebe Environmental Controls, Jul. 1993, 4 pages.

"MSC-NC(M) MicroSmart Network Communications Module", Siebe Environmental Controls, Jul. 1993, 2 pages.

"NetComm matures as advanced communication and metering system", Research Newsletter, 4th quarter 1990.

"PGW to begin automatic meter reader installations in 500,000 homes in June", PR Newswire Assoc., Apr. 2, 1993.

"PLC features & specifications", Regency Electronics, Inc. date unknown.

"Re-engineering electric utility metering and communications", Transmission & Distribution, Apr. 1994.

"Schlumberger launches new venture for building automation systems in Europe using Echelon Technology", Bus. Wire, Jul. 13, 1992.

"Scientific-Atlanta, Bell Atlantic To Offer Cost-Effective Information", PR Newswire, Sep. 23, 1991 (Mary Nagelhout).

"Section 2 Standard Program Functions (DMS 350A Programming Reference", Sep. 1987, pp. 2-1 to 2-18.

"Section 6: User Defined Programming (DMS 350A Programming Reference)", Apr. 1989, pp. 6-11 to 6-12 (double-sided).

"Using the line sharing switch in power utility load stufy application", Teltone Telesolutions, 1993.

"Variable electric rates", Transtext.

Cain, Charles J., "Metering gets real", Fortnightly, Apr. 1, 1994, pp. 39-40.

Coleman, Andrew et al., "Competitive edge-Power View. A DSM-focused technology", Fortnightly.

Dawson, Fred, "Energy saver can support voice and data", Multichannel News, Oct. 21, 1991.

Eaton Corporation, Cutler-Hammer—Westinghouse Products, Power Distribution Components Division, "IMPACC System Communications", IL 17384, May 1995, Revision 2.1, Appendix E (title page, contents listing and pp. E-1 through E-4).

Home Automation Laboratories, Fall 1994 Catalog.

Jones, David A., "Cutting edge; three houses that break the rules and break new ground . . . ", Builder Info Access, Nov. 1993.

Jones, David A., "Smart Money? Home automation systems", Builder June 1993, pp. 162-166.

Kaplan, Daniel, "DSM Monitoring a key issue for utility industry industry E-source", The Engery Dally, Oct. 5, 1993.

Karve, Anita, "Brainy Buildings", LAN Magazine, Aug. 1994.

McLeister, Dan, "Dramatic changes lie ahead for home automation", Professional Builder & Remodeler, Feb. 1994.

Millar, Heather, "Smart houses: getting switched on", Business Week, Jun. 28, 1993.

Niggli, Michael R., PowerView: Two-Way Customer Communications: (no ref or date).

Phillips, Tim, "Welcome to the computerized home", The Guardian, Mar. 10, 1994.

Piepmeler, James M. et al. "The tools of competition:" differentiation, segmentation . . . , The Electricity Journal, Nov. 1993.

Rupinski, Patrick, "New device automatically alerts company of power interruption", (no ref or date).

Saladyga, John S., "New home automation systems integrate security, energy and entertainment", Newsday, Inc., Oct. 15, 1992.

Salpukas, Agis, "Big hopes put on electric wires", The New York Times, Jul. 6, 1994.

Sanders, Michele, "Interfacing with the home of the future", Information Access, Apr. 1993.

Schrock, Clifford B., "conservation and safety for the 90's using cable TV networks", Cable Bus Systems Corp., (no ref or date).

Stevenson, Jr. William, "Elements of Power Analysis", 4th Edition (1982), pp. 13-18 PCT International Search Report.

Teletimer Energy Savings Service: Low-cost—high value building automation.

Vizard, Frank, "Building the Information superhighway", Popular Mechanics, Jan. 1994.

* cited by examiner

Figure 4D

Occupancy Modes — 4.10, 4.24, 2.26
Home | Away | Sleep | Vacant | User1 | User2 | User3 | User4
When my home is in Home Mode ☑ Active
Use the following settings for the areas controlled by the Heating/AC thermostat
Cooling setpoint: 80 °F  use: Economical Comfo ▽ Economy Profile — 4.32
Heating setpoint: 68 °F  ☑ My home is normally OCCUPIED during Home mode
Defaults — 4.28 | Apply — 4.30

Figure 4E

Occupancy Modes
Home | Away | Sleep | Vacant | User1 | User2 | User3 | User4 — 2.26
When my home is in Home Mode ☐ Active
Use the following settings for the areas controlled by the Heating/AC thermostat
Cooling setpoint: 85 °F  use: Economical Comfo ▽ Economy Profile — 4.32
Heating setpoint: 58 °F  My home is normally OCCUPIED during Away mode
Defaults — 4.28 | Apply — 4.30

Figure 4F

Occupancy Modes
Home | Away | Sleep | Vacant | User1 | User2 | User3 | User4 — 2.26
When my home is in Home Mode ☐ Active
Use the following settings for the areas controlled by the Heating/AC thermostat
Cooling setpoint: 90 °F  use: Economical Comfo ▽ Economy Profile — 4.32
Heating setpoint: 45 °F
  Maximum Comfort
  Balanced Comfort   OCCUPIED during Vacant mode
  Economical Comfort  Apply

Thermostat Scheduling

| | <<Prev | March | Next>> | March ⌄ | 2003 ⌄ | |
|---|---|---|---|---|---|---|
| Sunday | Monday | Tuesday | Wednesday | Thursday | Friday | Saturday |
| | | | | | | 1 Weekend |
| 2 Weekend | 3 Weekday | 4 Weekday | 5 Weekday | 6 Weekday | 7 Weekday | 8 Weekend |
| 9 Weekend | 10 Weekday | 11 Weekday | 12 Weekday | 13 Weekday | 14 Weekday | 15 Weekend |
| 16 Weekend | 17 Weekday | 18 Weekday | 19 Weekday | 20 Weekday | 21 Weekday | 22 Weekend |
| 23 Weekend | 24 Weekday | 25 Weekday | 26 Weekday | 27 Weekday | 28 Weekday | 29 Weekend |
| 30 Weekend | 31 Weekday | | | | | |

*Figure 4G*

Thermostat Scheduling

Select Thermostat: Heating/AC ⌄    Select Day Type: Weekday ⌄

Start>> Start at midnight in: Sleep ⌄ mode    Click to show instructions
Then at 04:30am ⌄ switch to User1 ⌄ mode
Then at 05:00am ⌄ switch to User2 ⌄ mode
Then at 05:30am ⌄ switch to Home ⌄ mode
Then at 07:30am ⌄ switch to Away ⌄ mode
Then at 04:00pm ⌄ switch to User2 ⌄ mode
Then at 05:30pm ⌄ switch to Home ⌄ mode
Then at 10:00pm ⌄ switch to Sleep ⌄ mode

[Apply to 3/18/2003]   [Apply to all Weekdays]   [Back to Calendar...]

*Figure 4H*

| Weekday ⌄ |
|---|
| New Day Type |
| Weekday |
| Weekend |
| Holiday |
| 8/13/2002 |
| |
| |
| 2/18/2003 |

*Figure 4I*

Configure Alert

Alerts

User Name: E. Minem  
Primary email: eminem@aol.com  
AccountID: 555  
Phone#: 5555555555

| Alert Description | Destination | Channel – Primary email | Channel – Web Page | Configurable | Priority | Single/Aggregate |
|---|---|---|---|---|---|---|
| Temperature out of Range | Home Occupant | ☑ | ☐ | ☑ | 1 | Single |
| Temperature out of Range | Service Provider | ☑ | ☐ | ☐ | 1 | Single |
| Gateway Not Responding | Service Provider | ☑ | ☐ | ☐ | 1 | Single |
| Temperature out of Range | Energy Provider | ☑ | ☐ | ☐ | 1 | Single |
| Gateway Not Responding | Energy Provider | ☑ | ☐ | ☐ | 1 | Single |
| Budget Limit Alarm | Home Occupant | ☐ | ☐ | ☐ | 2 | Single |
| Device is Malfunctioning | Home Occupant | ☐ | ☐ | ☐ | 2 | Single |
| Communication Failure | Home Occupant | ☐ | ☐ | ☐ | 3 | Single |
| Ramping Recovery Failure | Home Occupant | ☐ | ☐ | ☐ | 12 | Single |
| Duplicate IP address | Service Provider | ☑ | ☐ | ☐ | 12 | Single |
| Temperature out of Range | Energy Provider | ☑ | ☐ | ☐ | 12 | Single |

Note: You may add the secondary email as another channel by updating personal data. Click here to update account personal data Submit    Reset

*Figure 4J*

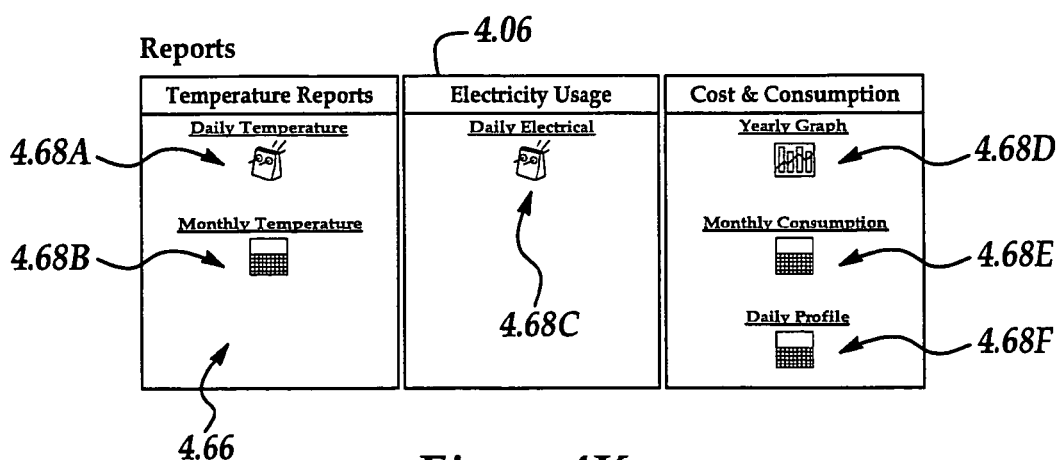

*Figure 4K*

Program Participation 4.96

Program Listing

| Participate | Product Name | Supply Type | Effective Dates From - To | Effective Daily From - To |
|---|---|---|---|---|
| ☑ | Emergency AC Curtailment | On Demand | 01/01 - 12/31 | 12:00am - 11:59pm |
| ☑ | A Group | On Demand | 01/01 - 12/31 | 12:00am - 11:59pm |
| ☐ | B Group | On Demand | 01/01 - 12/31 | 12:00am - 11:59pm |
| ☐ | Emergency HVAC Curtailment | On Demand | 01/01 - 12/31 | 12:00am - 11:59pm |
| ☐ | Emergency Hot Tub/Spa Curtailment | On Demand | 01/01 - 12/31 | 12:00am - 11:59pm |
| ☐ | Emergency Pool Pump Curtailment | On Demand | 01/01 - 12/31 | 12:00am - 11:59pm |
| ☐ | Emergency Shut Off | On Demand | 01/01 - 12/31 | 12:00am - 11:59pm |
| ☐ | Emergency Water Heater Curtailment | On Demand | 01/01 - 12/31 | 12:00am - 11:59pm |
| ☐ | AfternoonPeaker | Scheduled | 04/01 - 10/01 | 12:00am - 6:00pm |
| ☐ | MorningPeaker | Scheduled | 01/01 - 12/31 | 6:00am - 12:00pm |

[Apply] 4.100 4.98

*Figure 4R*

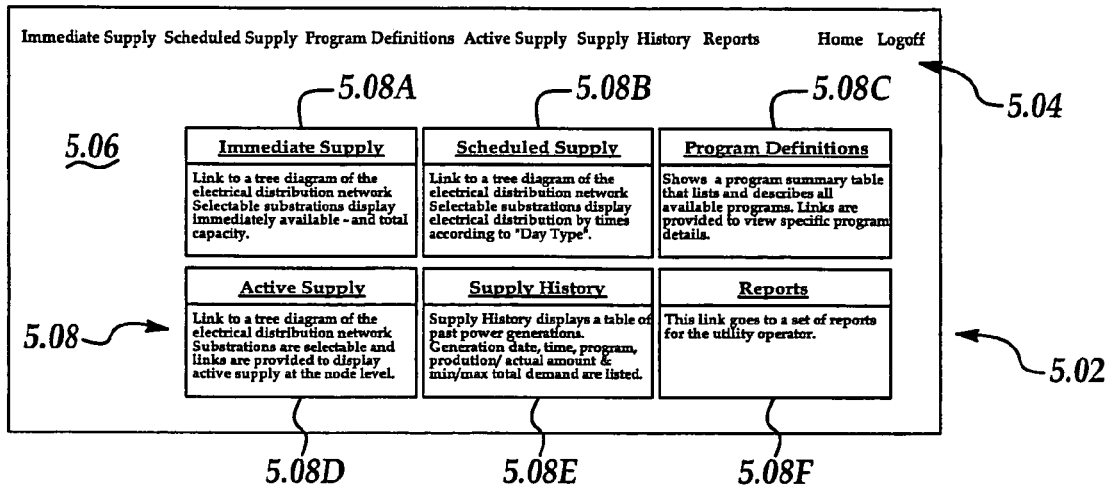

*Figure 5A*

SYSTEM AND METHOD OF CONTROLLING AN HVAC SYSTEM

RELATED APPLICATIONS

This application is a divisional application of application Ser. No. 10/628,518, filed on Jul. 28, 2003, now U.S. Pat. No. 7,130,719, which issued on Oct. 31, 2006, which is a continuation application based on and claiming priority from application Ser. No. 10/402,370, filed on Mar. 28, 2003, which claims priority to provisional patent Application Ser. No. 60/368,963, filed on Mar. 28, 2002, and which claims priority to provisional patent Application Ser. No. 60/383,027, filed on May 24, 2002, all of which are incorporated herein by reference.

FIELD OF THE INVENTION

The present invention relates generally to the delivery of a commodity, and more particularly, to a system and method for managing the delivery and usage of a commodity such as electricity, natural gas, steam, water, chilled or heated water, or potable or recycled water.

BACKGROUND OF THE INVENTION

Traditionally, utilities have done an excellent job of providing a reliable source of power to their customers. Utilities do this by accurately predicting consumer demand and then ensuring that they have adequate generation resources available to meet that demand. Historically, demand for power increases each year during peak heating and cooling months, resulting in a need for ever increasing amounts of generation capacity. A review of the peak period demand clearly show that the need for a substantial amount of new generation assets could be eliminated if there was a way to shift some of the demand from peak to off peak times.

The deregulation of the electric industry has heightened concerns over power outages, price volatility and how the eventual outcome will impact the economy and our way of life.

For example, recent events in California have captured the headlines and amplify these concerns. California suffers from 10 years of load growth with no new generation facilities being built to meet the demand. Internet data centers like the one in San Jose represent unanticipated new demands for power 24 hours a day equal to that of 60,000 homes. State mandated deregulation activities forced the major utilities to sell off their generation assets resulting in them having to buy the power they used to self generate from others.

Demand reduction programs and more advanced controls have been proposed to assist in reducing demand during peak times.

Currently, utilities do offer demand reduction programs to their customers. These programs are designed to shift loads out of peak periods by providing a financial incentive for consumers to move loads to a time when it is less expensive for the utility to produce or obtain power. Time of day rate is an example of such a program.

Another type of program offered by utilities is the traditional Demand Side Management (DSM) program. This type of program provides the customer a monthly credit for allowing the utility to interrupt power to major loads in their home during peaks or emergencies.

While both of these programs have been shown to work, they each have their problems. Time of day rate programs may be difficult for customers to understand. Therefore these programs have a very low participation rate among the customer base. DSM programs, on the other hand, have a much higher participation rate. However, DSM load sheds are seldom exercised by the utility. And, when the utility does exercise a load shed, the resulting interruption of power tends to affect customer comfort, thereby causing large numbers of customers to drop out of the program. In addition, current DSM programs cannot differentiate between those consumers that contribute to a load control, and those that don't, while providing incentive credits to all who sign up.

While both time of day rates and DSM programs can be effective, each have challenges in the area of customer satisfaction that erode their usefulness. In addition, utilities earn little revenue from these types of offerings and therefore look to new generation as a more economically viable option.

Thermostats, thermostatic control devices and environmental control systems have been designed, manufactured and Placed in use for many years. These devices are primarily designed to sense the temperature inside a site and based on occupant designated setting, activate the heating and/or air conditioning system or systems to maintain a comfort level based on the occupants designated level of comfort. There are two main types of design for these devices: a standard single control device or a dual control system.

The standard single control device can be set to activate a heating or cooling system based upon a manual switch to select either system and a degree setting mechanism to select the desired temperature to heat or cool to if the temperature falls or rises below or above the occupant designated set point. A dual control system is attached to both a heating and cooling system which has two set points, one for the heating system activation and one for the cooling system activation. With this type of a control, the user sets a desired minimum temperature, below which the heating system will be activated to raise the temperature during winter seasons, and a maximum temperature, above which the cooling system will be activated to drop the temperature during summer seasons.

This type of temperature control device provides the occupant the convenience of not having to manually select either the heating or cooling system, as is the case of the standard single control device, and allows the occupant to define a temperature range between which they are comfortable. Using these two main types of design as a base line, there are many variations, which have been developed over time. Over the years, these sensing and control devices have moved from traditional bi-metal contractors to more sophisticated electronic devices over the years, and have incorporated the ability to be programmed with multiple set points for both heating and cooling as well as having the ability to activate these different set points based on time of day, day of week, and/or externally generated control signals from utility companies indicating a fixed cost tier that is in effect, e.g., low, medium, high & critical, and to interface with an infra-red motion sensor that automatically sets back the temperature to a predetermined point based on the presence of a person in the area. However, most end use consumers do not have the time, experience, and/or access to data to monitor, track, and use these devices.

The present invention is aimed at one or more of the problems set forth above.

SUMMARY OF THE INVENTION

In one aspect of the present invention, a system and method manage delivery of energy from a distribution network to one or more sites. Each site has at least one device coupled to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

In another aspect of the present invention, a method of shifting energy requirements from a first period of time is provided. The method includes the steps of measuring energy usage of a controlled device operated by a customer, cutting off energy to the controlled device during the first time period, and providing a rebate to the customer based on actual energy savings as a function of the first time period, the measured energy usage, and known power requirements.

In still another aspect of the present invention, a thermostat device for controlling a heating and/or cooling system through interaction with a user is provided. The heating and/or cooling system are supplied with energy through a power distribution network. The thermostat includes a control panel for receiving input from the user and a display coupled to the control panel for visually presenting information to the user. The thermostat device is adapted to receive a characteristic of the energy being supplied and for displaying the characteristic on the display.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4D is a graphical illustration of an occupancy mode screen of the GUI of FIG. 4A;

FIG. 4E is a second graphical illustration of the occupancy mode screen of FIG. 4D;

FIG. 4F is a third graphical illustration of the occupancy mode screen of the GUI of FIG. 4D;

FIG. 4G is a graphical illustration of a thermostat scheduling calendar of the GUI of FIG. 4A;

FIG. 4H is a graphical illustration of a thermostat scheduling panel of the GUI of FIG. 4A;

FIG. 4I is a graphical illustration of a select day type drop down list of the GUI of FIG. 4A;

FIG. 4J is a graphical illustration of a config alert screen of the GUI of FIG. 4A;

FIG. 4K is a graphical illustration of a report screen of the GUI of FIG. 4A;

FIG. 4R is a graphical illustration of a program participation screen of the GUI of FIG. 4A;

FIG. 5A is a graphical illustration of a utility GUI, according to an embodiment of the present invention;

DETAILED DESCRIPTION OF THE INVENTION

1. Energy Management System and Methods—Overview

Figure 1A:
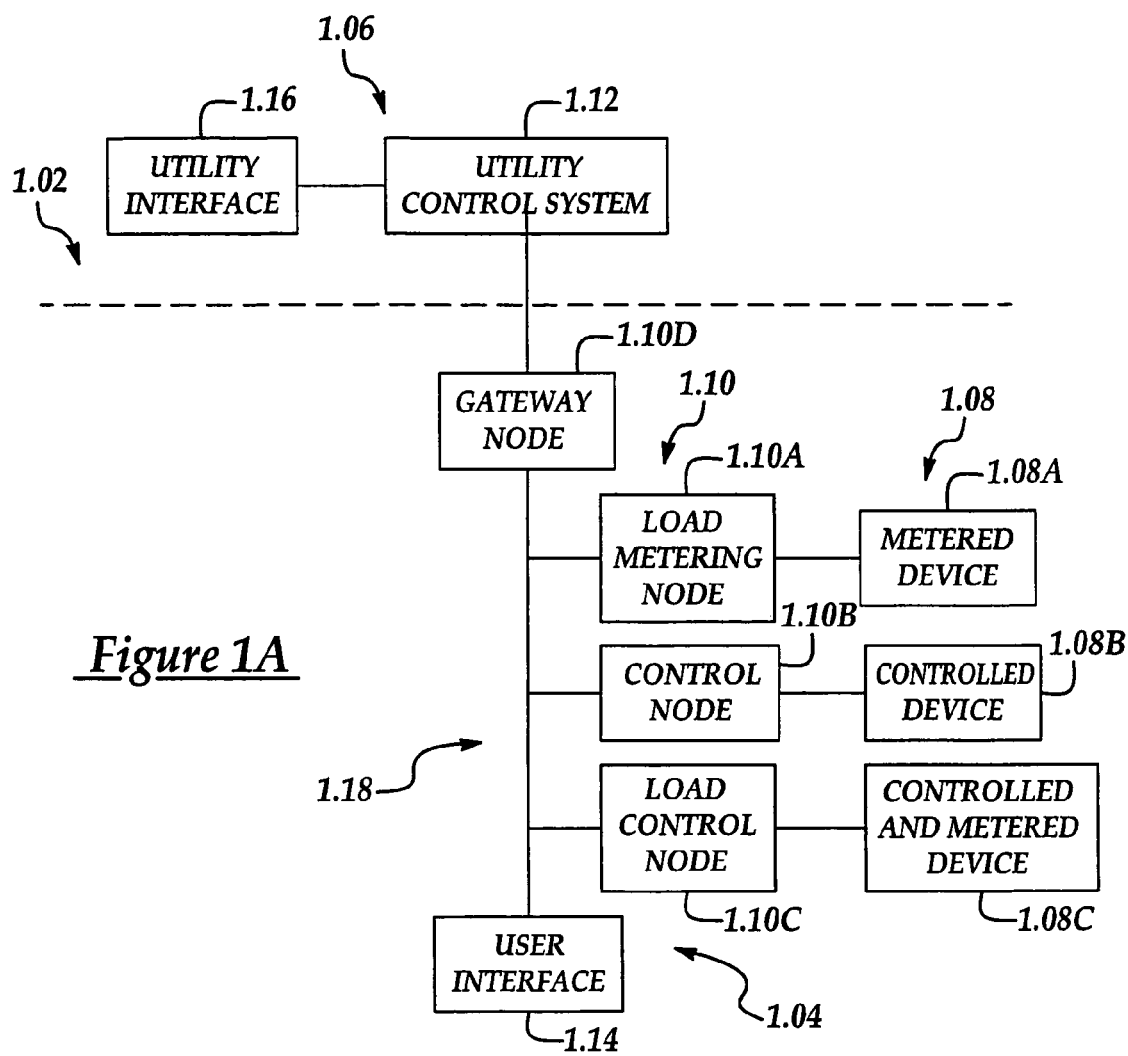
FIG. 1A is a block diagram of an energy management system, according to an embodiment of the present invention.

With reference to the drawings, and in operation, the present invention relates generally to a system 1.02 and method for managing the delivery and usage of a commodity, such as electricity, natural gas, steam, water, chilled or heated water, or potable or recycled water. More specifically, the system 1.02 is adaptable to manage the delivery and usage of energy, e.g., electricity and natural gas. While the below discussion focuses on the management of the delivery and/or usage of electricity, the present invention is not limited to such the delivery and/or usage of electricity.

In general, the system 1.02 allows at least one customer (or user) located at a customer site (indicated by reference number 1.04) and/or a utility (indicated by reference number 1.06) to manage delivery or usage of the electricity to the customer's site 1.04. The utility 1.06 may include both the generation of the electricity, e.g., via power plants, and/or the transmission of electricity to the customer sites 1.04.

The customer site 1.04 includes at least one device 1.08 which uses electricity and at least one node 1.10. In the illustrated embodiment, the customer site 1.04 includes three devices: a metered device 1.08A, a controlled device 1.08B, and a metered and controlled device 1.08C. Each device 1.08 may have an associated node 1.10.

As discussed in more detail below, in the illustrated embodiment, there are four different types of nodes 1.10: a load metering node 1.10A, a control node 1.10B, a load control node 1.10C, and a gateway node 1.10D.

The gateway node 1.10D provides two way communication between the gateway 1.10D and each other node 1.10A, 1.10B, 1.10C and between the gateway node 1.10D and a utility control system 1.12. It should be noted that although there are only one of each the devices 1.08A, 1.08B, 1.08C, shown, there may be any number of each type of device 1.08A, 1.08B, 1.08C (including zero).

The load metering node 1.10A, in general, measures the instantaneous power being delivered (typically, in kWh) to the associated metered device 1.08A. The load metering node 1.10A may also determine the total power delivered to the metered device 1.08A over a predetermined period of time, e.g., every 15 or 20 minutes. Information related to the instantaneous power being delivered and the accumulated power is delivered to utility 1.06 via the gateway control node 1.10D. For example, the metered device 1.08A may be an electricity meter which measures all power being supplied to the customer site 1.04.

The control node 1.10B, in general, is used to control the controlled device 1.08B. In the simplest form the control node 1.10B may controllably cut off and supply power to the controlled device 1.08B. For example, if the controlled device 1.08B is a pool pump used to filter a pool (not shown), the control node 1.10B may simply turn power to the pool pump on and off. Alternatively, the control node 1.10B may have control over features of the controlled device 1.08B, e.g., start time, end time, duration, etc.

The load control node 1.10C, in general, is used to both measure the instantaneous power being delivered to the controlled and metered device 1.08C and controls the device 1.08C. The load control node 1.10C may also determine the total power delivered to the metered and controlled device 1.08C over a predetermined period of time, e.g., every 15 or 20 minutes.

Nodes 1.10 may be utilized with any type of device 1.08 for which it is desirable to control and/or measure its power usage. For example, nodes 1.10 may be associated with the entire customer site 1.04, a pool pump, an HVAC system, a water heater, any appliance, such as a refrigerator, dishwasher, hot tubs, irrigation and well pumps, spas, coffer maker, etc., or other electrical or electronic device, e.g., televisions, stereos, etc.

The type of node 1.10 which is used with a device 1.08 is dependent upon the device and whether it is desirable to measure the device's power usage, control the device or both. In one aspect of the present invention a node 1.10 may be separate from the device 1.08. For example, in each device 1.08 it may be desirable to measure the energy usage of the entire customer site 1.04. Thus, a load metering node 1.10A may be associated with the site's electric meter.

Nodes 1.10 may either be integrated with the corresponding device 1.08 or be separate. For example, a load metering node 1.10A may be a separate device which is coupled to an electric meter (for retro-fit purposes). Alternatively, nodes 1.08 may be designed and manufactured to be integral with the devices 1.10.

The customer may access and control the system 1.02 through a user interface 1.14 (see below). The user interface 1.14 may be incorporated into another device, such as a thermostat (see below). Additionally, the customer may be given access to the system 1.02 through external devices, such as, mobile phones, personal digital assistants (PDA), laptop computers, desktop computers, or other suitable devices. Such devices may be linked to the system 1.02 via the internet, a wireless data network, or other suitable system.

The system 1.02 may be further accessed and controlled at the utility 1.06 via a utility interface 1.16 (see below).

In one aspect of the present invention, the load metering node 1.10A, the control node 1.10B, and the load control node 1.10C communicate with the gateway node 1.10D. In another aspect of the present invention, the load metering node 1.10A, the control node 1.10B, the load control node 1.10C, and the gateway node 1.10D may all communicate with each other. In the illustrated embodiment, the nodes 1.10 are interconnected by a network 1.18. The network 1.18 may be a wired network, such as an ethernet network, or a wireless network.

Figure 1C:
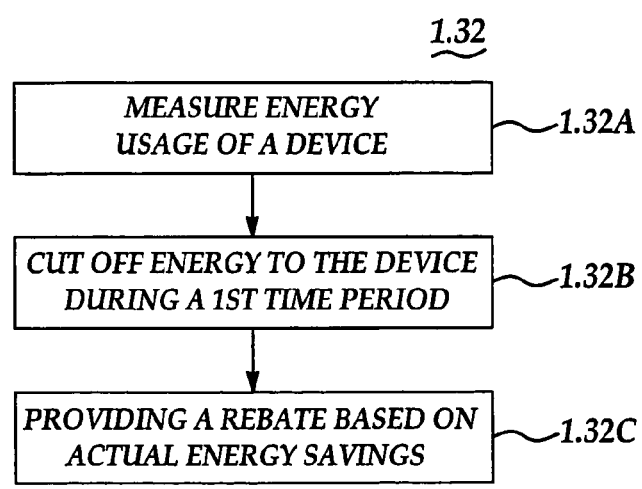
FIG. 1C is a flow diagram of a process for managing energy delivery according to an embodiment of the present invention.
Figure 1B:
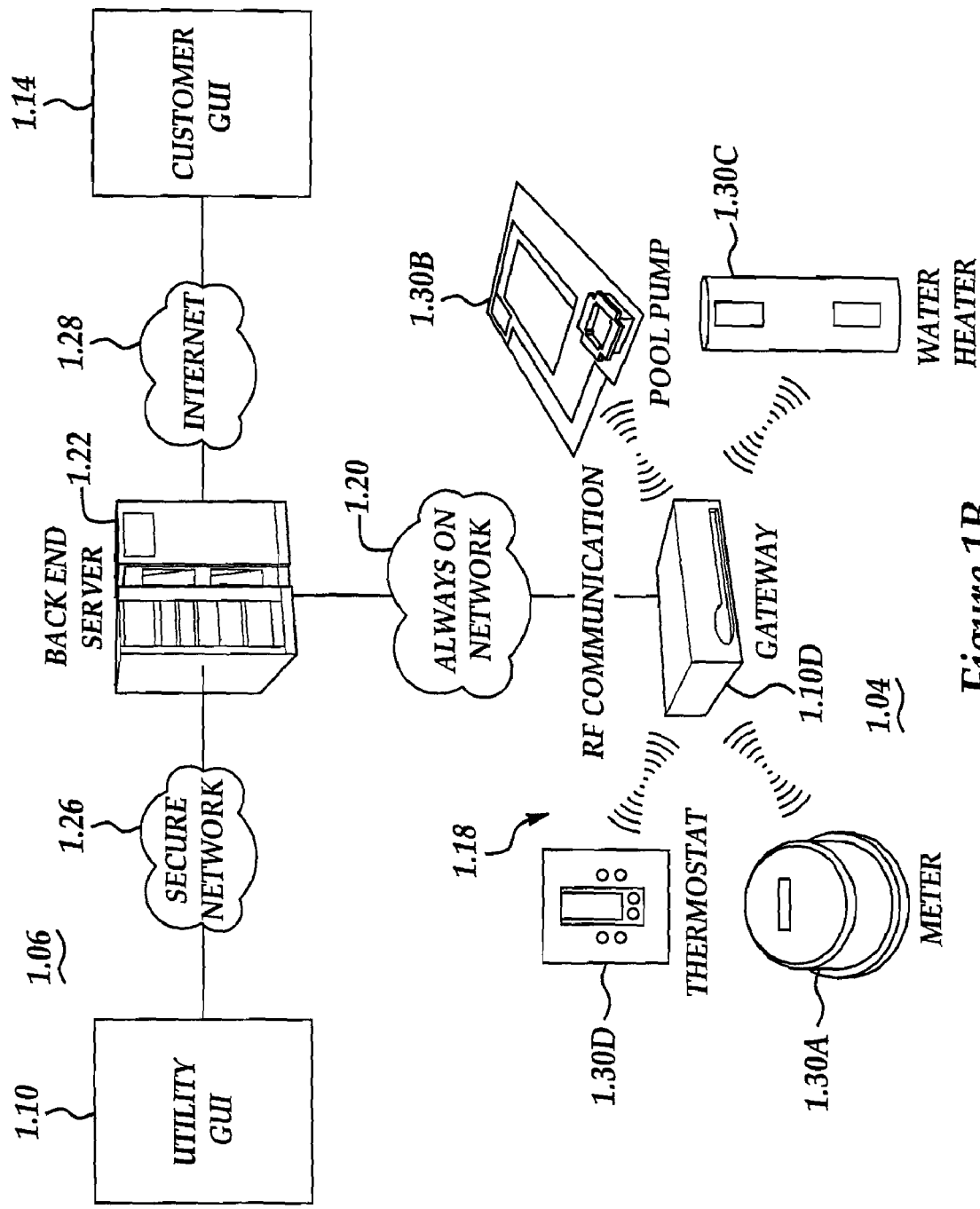
FIG. 1B is a diagrammatic illustration of one implementation of the energy management system of FIG. 1A.

An exemplary implementation of the system 1.02 is shown in FIG. 1B. In this illustrated embodiment, the gateway node 1.10D communicates to the utility control system 1.12 via an "always on", secured wired or wireless network 1.20 through a cable modem, DSL modem, or other suitable means (not shown). The utility control system 1.12 may be implemented in software which is stored and executed on a back-end server 1.22 (see below).

In one aspect of the present invention, utility control system 1.12 and the back-end server 1.22 may be provided by and/or serviced and/or maintained by a third party, i.e., a service provider.

Access to the utility control system 1.12 may be provided at the utility 1.06 through a secure network 1.26 such as a virtual private network (VPN).

Remote access to the system 1.02 may be provided to the customer through the back-end server 1.22 via the internet 1.28.

In the illustrated embodiment, the customer site 1.04 includes a metered device 1.30A, shown as an electric meter, a controlled device 1.30B, shown as a pool pump (illustrated graphically as a pool), and a metered and controlled device 1.30C, shown as a water heater. It should be noted, however, that any particular site may include zero, one or more of each type of device. In the illustrated embodiment, the system 1.02 also includes an advanced thermostat device 1.30D. Each device 1.30A, 1.30B, 1.30C, 1.30D communicates with the gateway node or gateway 1.10D.

As discussed more fully below, the customer has access to the system 1.02 and is able to monitor and control the nodes 1.10 and/or the devices 1.08 through the user interface 1.14.

The utility 1.06 may also monitor and control the usage of electricity by controlling the nodes 1.10 and/or the devices 1.08. More specifically, the utility 1.08 may define, modify, implement, and engage one or more Power Supply Program (hereinafter PSP or PROGRAM or PROGRAMS) which are designed to alleviate or reduce energy demand during peak periods. A PROGRAM may either be mandatory or optional. The user, through the user interface 1.14, may be able to subscribe or sign up for one or more optional PROGRAMS. A PROGRAM may be either automatically implemented when a predetermined set of conditions occur, such as time of day, or may be engaged, by the utility 1.06, as electricity demands require.

For example, a PROGRAM may automatically shift discretionary residential loads out of peak demand periods and credit consumers who participate with KWH rebates based on their actual (measured & verified) contributions. In one embodiment, the rebates would be directly related to the cost of the fuel or electricity during the shifted period. This PROGRAM delivers the same results Time Of Day rates were designed to deliver without a variable KWH cost component. Rebates for shifting demand provide the consumer incentive versus higher rates in peak periods. Further, the PROGRAM provides a variable rebate based on a customers actual contribution, instead of a fixed rebate.

With reference to FIG. 1C, in one embodiment of the present invention, a method of shifting energy requirements from a first period of time, is provided. The method includes the step of measuring energy usage of a device 1.08 operated by a customer (first step 1.32A). The device 1.08 has a known power rating. In a second step 1.32B, energy to the device 1.08 is cut off during the first time period. In a third step 1.32C, a rebate is provided to the customer based on actual energy savings as a function of the first time period, the measured energy usage, and the known power requirements.

For example, returning to FIG. 1B, a PROGRAM may be defined to include all pool pumps for a given set of customers, e.g., in a geographic location. The PROGRAM may be further defined by not allowing the pool pumps to run during a set period of the day. Customers having a pool pump may sign up or "subscribe" to the PROGRAM. The power rating for a customer's pool pump must be known and is stored within the system 1.02. A load control node 1.10C is either integral with or separate and coupled to the pool pump. The load control node 1.10C receives a signal from the utility control system 1.12 to disable the pool pump during the first time period. The load control node 1.10C further measures energy usage of the pool pump during the first time period to confirm that the pool pump is not running.

Another PROGRAM may also perform soft load control (control of comfort levels) on HVAC systems by modifying thermostat set points, use of temperature ramping and restricting the use of heat strips and secondary stages of compressors (see below).

In one aspect of the present invention, the system 1.02 is designed to operate like a power plant, in that it would be dispatched every working day to shift peak loads but would not operate on weekends or holidays. Further, the energy saved through engagement of a PROGRAM may be viewed as capacity in the same manner as the capacity of a power plant.

In one aspect of the present invention, the system 1.02 records actual interval data for a given entity or customer, and for each device 1.08 within that entity, or subsets thereof, as desired. In the case where the entity is a home, for example, actual energy interval data can be collected for each appliance, and/or selected appliances. Communications between the gateway node 1.10D and the other nodes 1.10A, 1.10B, 1.10C can be via wired or wireless means, including microwave, infrared, Radio Frequency (RF), or other wireless communications method. The actual interval data can be a basis for computing a customer's rebate. The gateway node 1.10D can additionally collect information regarding the health and maintenance of the energy devices to which it communicates. Accordingly, the gateway node 1.10D and the other nodes 1.10A, 1.10B, 1.10C, can be equipped to communicate based on the wired or wireless communications channel. Furthermore, the communications can be bi-directional, and can be encoded. The gateway node 1.10D can further communicate with the at least one server, and vice-versa. The gateway node 1.10D can thus include a processor and an Ethernet connection. Communications to the server can be via cable modem, DSL, power line carrier modem, or another bi-directional wired or wireless secured communications link.

In one embodiment, the gateway node 1.10D may include memory (see below) for storing pricing and scheduling information. For example, a gateway node 1.10D may store fifteen days of data when ninety-six readings from devices 1.08 are made per day.

Rebates can be provided based on, for example, overall usage. In one illustration, if a water heater is "on" for ⅓ of the time, historically, a consumer can get a ⅓ rebate for a non-peak period water heater usage based on the water heater being "off" for the entire peak interval.

The system 1.02 may also be adapted to receive from the customer a budget goal for a specified time period, e.g., one month. The system 1.02 may then monitor the customer's usage and send an email or other notification to the customer if it is determined that the specified budget goal will be exceeded during the specified time period.

As explained above and more fully described below, the system 1.02 may also include an advanced thermostat device 1.30D. The system 1.02 may have the ability to sense the current indoor temperature and could be enhanced to include at a minimum, humidity sensing, outside temperature, UV intensity, wind direction and speed, relative humidity, wet bulb thermometer, dew point and local weather forecast data or encoded signals as well as other analog or digital inputs used in the calculation of and maintenance of occupant comfort. In its basic form, the system 1.02 will manage the indoor air temperature. Using the optional enhanced system inputs, the system 1.02 may also manage the air quality and humidity at the site by controlling the operation of the appropriate heating, filtration, conditioning and cooling equipment in conjunction with damper and fresh air input ducts, electrostatic filters and ionization devices to maximize comfort and indoor air quality. The system 1.02 may manage its operation of the available environmental conditioning resources to maintain the optimum temperature, humidity and air quality conditions based on user defined minimum and maximum values for comfort indices and price of energy indices. In a more elaborate implementation, the system 1.02 may also have the ability to switch energy types e.g., electric versus gas for environment heating and would also have the ability to switch suppliers based on the asking price of the energy supplier serving the location if the services of an energy broker are utilized.

In one aspect of the present invention, the system 1.02 balances two primary factors. First, the system 1.02 maintains the environment within occupant defined acceptable minimum and maximum values at least for temperature and could be expanded to handle humidity and air quality. Second, the system 1.02 may vary these acceptable parameters based on, at a minimum, user defined preferences, price points and historical data (the gathering and retention of which is described later) to achieve the optimum environmental conditions. To provide feedback to the customer, the system 1.02 may also record the number of energy units (energy units as used here include for examples: kilowatt hours, BTU's, Therms, and Jules but is not so limited) used as a function of time for each of the loads monitored and/or controlled by the system 1.02 and would have the ability to report back detailed consumption data as a function of time and summarize these details to provide, at a minimum, daily averages for any defined period, monthly totals, as will as track the costs of each energy unit consumed per period and provide detailed and average daily cost for any user defined period as well as monthly totals. The system 1.02 may permit the entry of daily, weekly and monthly budget amounts for energy. The system 1.02 may monitor usage and provide visual and audible alerts if these amounts are being exceeded, thereby providing the opportunity to make corrections to system settings to achieve desired economic results. The system 1.02 may be capable of controlling loads beyond its primary management function of the environmental air management systems using the same economic modeling techniques and controls that it uses to manage its primary functions. It may also manage, report and track total site 1.04 energy unit usage and interface with energy unit suppliers via a communications channel. The system controls will be located at the site 1.04, while the processors for modeling and managing the sources and types of energy units to be utilized and committed to will be distributed (at energy brokers, ESP's and utilities) and operate over a communications network without regard to the actual location of or distance from the site 1.04.

In summary, and as explained in detail below, the system 1.02 supports and provides a wide array of monitoring and control points including:
Whole house interval metering;
HVAC thermostat monitoring and control;
Sub-metering and control of other major loads (such as pumps and electric water heaters); and,
Net metering for effective management of distributed generation assets.

In one embodiment, the system 1.02 is designed to provide monitoring and control of major loads, e.g., total electric load, HVAC systems, water heater, and pool pump (if existent). In another embodiment, the system 1.02 provides monitoring of most, if not all, devices which require energy, e.g., electricity or gas.

The system 1.02 is "always on", connecting the nodes 1.10 to the utility control system 1.02. This allows the system 1.02 to provide much higher levels of monitoring and management of loads. The 'always on' connectivity allows the utility 1.06 to know exactly how much load is available from each participating end use device 1.08 at a customer site 1.04 and allows the utility 1.06 to aggregate that load up to a circuit, sub station or to any other desired combined total. The utility 1.06 may target specific loads or geographic areas and manage demand more closely by getting verification of control requests as curtailment commands are initiated. The utility 1.06 can then pass detailed load curtailment data on to the back-office billing programs at the utility where credits can be applied to consumer bills commensurate with their contributions.

In another aspect of the present invention, the system 1.02 has the ability to monitor and control remote generating capacity such as photovoltaic systems (not shown) which may be located at a consumer site 1.04. Just as the system can monitor and verify load control reductions, it is equally capable of monitoring, dispatching and verifying remote generation capacity.

In still another aspect of the present invention, the system 1.02 allows the utility 1.06 to respond to requests for additional electrical supply. For example, when the utility 1.06 requires an increase in electrical supply, the utility 1.06 will be able to review current capacity and call upon some or all of that capacity in an Immediate Supply Request. Using the system 1.02, the utility 1.06 may command one or more customer sites 1.04 that meet the specified criteria, e.g., or enrolled in a specific PROGRAM, to provide their power contribution to the system's power generation supply. The gateway nodes 1.10D will continuously update the system 1.02 with current demand information in the form of available messages. That information, along with profile data, can be presented to a system operator to help them locate the best supply to call upon.

In one embodiment of the present invention, the utility interface 1.16 and the user interface 1.14 may be provided through a web browser (see below), such as Internet Explorer, available from Microsoft Corp. of Redmond, Wash.

The utility interface 1.16 may display the capability to define Power Supply Programs (PSP or PROGRAMS) in the system 1.02 and selectively apply substations and circuits that will participate in the PROGRAM when activated. The system 1.02 through the utility interface 1.16 may include the following capabilities.

The system 1.02 may allow an operator at the utility 1.06 to selectively assign devices 1.08 that apply to a specific PROGRAM. One or more substations and/or circuits may be included within the PROGRAM.

The system 1.02 may receive or generate an Immediate Supply Request (ISR) when additional electrical supply is needed. The Immediate Supply Request may include a start time and the supply request duration.

An operator, using the utility interface 1.16, activates one or more PROGRAMS in response to the ISR. Activation of the one or more PROGRAMS may be immediate or scheduled at a future time. To activate a PROGRAM, a PROGRAM schedule is downloaded to each of the gateway nodes 1.10D or nodes 1.10 affected. In one embodiment, the PROGRAM schedule may be downloaded to the appropriate gateway nodes 1.10D or other node 1.10 in advance of the scheduled time of operation.

In another aspect of the present invention, the system 1.02 can track, record, store, compute, etc. which customers actually participate in a PSP and how much demand was reduced in the home for the PROGRAM period.

The utility interface 1.16 may also display the current load generation available from the existing system 1.02. For example, a view of the current Power Distribution Network for a utility company including Transmission Substations (TSS), Distribution Substations (DSS), and circuits may be provided. The view may be appropriately annotated with identification information for each branch of the network (TSS, DSS and circuit). The view may display an aggregated capacity for a branch of the network currently available. The view may also indicate whether a PROGRAM is currently active on a branch of the system 1.02. For an active power supply program, the scheduled completion time may also be indicated.

The system 1.02 may also continually aggregate capacity and the current status of the distribution network and provides the updated information for display on the utility interface 1.16.

In a further aspect of the present invention, the utility interface 1.16 may allow the operator to analyze profiles of homes and individual load types. This data can allow the utility 1.06 to assess which loads should be curtailed to achieve the needed demand reduction. The system 1.02 may calculate home load profiles based upon information received from the load metering nodes 1.10A and/or load control nodes 1.10C This may include HVAC profiling. Using this data, site load profile data can be aggregated for the electrical distribution network topology.

The network topology load profile may be displayed as a snapshot to the operator. The operator may also review load profiles available in the system 1.02 at a specified time of day.

Configuration data is downloaded from the system 1.02 to each of the gateway nodes 1.10D. For example, this may be done at one or more of the following: at predetermined times, when requested by a gateway node 1.10D, and/or when a change, such as activation of a PROGRAM, has occurred.

For example, configuration data may include, but is not limited to the following: communication parameters for system components, schedules and power supply programs. In one embodiment, each device 1.08 has a unique identifier, such as a MAC address or an RF logical address. The intended device 1.08 for a given message may be included in the message received from the system 1.02.

In one aspect of the present invention, communications to and from the gateway nodes 1.10D or other nodes 1.10 are secured. For example, the communications may be secured using Secure Sockets Layer (SSL).

In another aspect of the present invention, if the system 1.02 loses communications with a gateway node 1.10D for a predetermined time, the system 1.02 may generate a Service Report.

In one aspect of the present invention, a gateway 1.10D may generate a message when a controlled device 1.08 has a change of state that alters its contributable supply by more than a predetermined range, i.e., a real-time demand range. The system 1.02 may use these updates to keep a live running total of available supply for the entire electrical distribution network and make these values available at the utility interface 1.16. In another aspect of the present invention, the system maintains a history of the consumption rates as a function fo time to create historical usage by device type and program to aid in planning and forecasting demand by device type. These values are available at the utility interface 1.16. In one embodiment, the system 1.02 may ignore supply values from a gateway node 1.10D that are older than a predetermined period of time, such as 30 minutes old.

The system may also receive messages from a gateway node 1.10D at predetermined time intervals, such as 15 minutes, whether a load changes or not. These messages can include the (a) demands generated for a device 1.08 in a PROGRAM and (b) the total demand generated for devices 1.08 in a PROGRAM. In one embodiment these messages may also include a gateway ID, a utility ID string, time/date stamp, current power draw of every controllable device 1.08, and whole house demand.

Through the user interface 1.14, the customer may have local and remote access to a rich set of functions and features. Some or all of these functions and features may be accessible through the thermostat 1.30D and/or through the internet 1.28 (via a web browser).

Using the user interface 1.14, the customer may directly access and control in-home devices 1.08. For example, with regard to the thermostat 1.30D, the customer may view current temperature, view current heating or cooling setpoint(s), override heating or cooling setpoint(s), resume scheduled heating or cooling setpoint(s), view heat/cool/auto mode, change the heat/cool/auto mode.

With regard to the electric meter 1.30A, the customer may view current electric meter accumulated consumption (kWh), view current electric meter demand (kW), view historical meter data.

With regard to a metered controlled device 1.08C, such as the water heater 1.30C, the customer may view current equipment load status (on/off data), control the state of output relays (on/off), view and override curtailment conditions of the device 1.08C, and/or view current demand and consumption data of the device 1.08C.

In one aspect of the present invention, the user interface 1.14 includes a scheduling feature. The scheduling feature allows the customer to customize the devices 1.08 to operate according to personal preferences (rather than a default configuration).

In one embodiment, the following scheduling features are accessible through the user interface 1.14.

With regard to the thermostat, the customer may define up to a plurality of occupancy modes, e.g., 8, for use in daily schedules, define daily schedules using an unlimited number of day-types, assign day-types using monthly calendars.

With regard to a controlled and metered device 1.08C, the customer may, for example, define a run-time operation and/or a desired start time.

Using the user interface 1.14, the customer may view or generate a variety of reports to view historical information about their homes and the devices 1.08 within. For example, some of the reports which may be available include:

Daily temperature reports displaying temperature and setpoints in, e.g, 15-minute intervals.
Monthly temperature reports displaying daily low, high and average temperatures.
Daily electrical reports displaying electrical consumption hourly and electrical costs in e.g., 15-minute intervals.
Monthly electrical reports displaying daily low, high and average energy consumption.
Monthly cost reports displaying daily low, high and average energy costs.
Monthly consumption reports displaying daily energy consumption and costs.
Yearly consumption and cost reports displaying monthly energy consumption and cost.

In another aspect of the present invention, the customer may also view information related to Power Supply Programs. For example, the customer may generate or view a report detailing the PROGRAMS offered by the utility 1.06. Additionally, the customer may select the PROGRAMS in which they choose to participate.

Using the user interface 1.14, the customer may have access to their account and home attributes. For example, the customer may be able to view and modify various parameters associated with their user profile. Such parameters may include name, address, home, work and mobile phone numbers, primary and secondary E-mail addresses, password (modify only) and password reminder, and/or budget thresholds. Furthermore, the customer may be able to view and modify various parameters associated with the thermostat 1.30D and HVAC system. Such parameters may include thermostat name, heating type and stages, cooling type and stages, and Safety, alarm, heat and cool limits.

Using the user interface 1.14, the customer may also be able to view and modify various parameters associated with any metered and controlled devices. Such parameters may include, e.g., the device name and description.

Using the user interface 1.14, the customer may also be able to view and modify various parameters associated with their home. Such parameters may include age and size, construction characteristics, water heater capacity and type(s), and energy related home accessories.

When the system 1.02 activates a PROGRAM (either automatically or via manual activation), a supply request is broadcast. The supply request may include a Curtailment ID, a Utility ID sub-string, Device Type Identifiers of the devices that are to contribute, a transaction identifier, and time elements indicating start time and duration. In one embodiment, the supply request is sent to all gateway nodes 1.10D and other nodes 1.10 and may be repeated to ensure that all of the gateways 1.10D and other nodes 1.10 will receive the request. Each gateway 1.10D and other nodes 1.10 receive the request and when the start time occurs, begin a Supply Request transaction.

In one embodiment, the gateway node 1.10D takes a whole-house meter reading (demand and consumption) and reports back to the system 1.02 that it has received the request and is participating. In the illustrated embodiment, every message includes the Curtailment ID so that the system 1.02 can collect all of the responses to the supply request and provide accurate analysis and billing/crediting information for the activated PROGRAM.

The gateway node 1.10D and other nodes 1.10 then proceeds to control the specified devices 1.08 and report the status of each device 1.08 back to the system 1.02 as they are processed.

Devices 1.08 that are currently drawing power report the total watts contributed and then proceed to open the relay for controlled devices 1.08B and/or controlled and metered device 1.08C. If a controlled device 1.08B is being used, an associated power rating may be used for the contributed power value. A controlled device 1.08 may be either shut-off, i.e., power cut off, or controlled to some predetermined state, e.g., a heating/cooling offset may be set to a maximum value for a HVAC system (see below).

Devices 1.08 that are not currently drawing power will report zero watts contributed and leave the relay closed. With the relay closed, once the device 1.08 starts to draw power, the gateway node 1.10D will measure its demand and then open the relay and then measure and report its contribution.

In one embodiment, a device's 1.08 contribution is equal to the power consumption rate prior to activation of the program for the time period of the PROGRAM, i.e., the amount of energy being saved.

If the device 1.08 is an HVAC system, adjusting the setpoint may not guarantee that the system may not run at all. If the HVAC is not running, its supply contribution message is reported as zero. The setpoints are offset and the temperature is monitored. When the temperature exceeds the appropriate heating or cooling original setpoint (prior to the offset change), the gateway node 1.10D may indicate what the contribution is. This represents when the equipment would have come on without the curtailment. By adjusting the setpoint of the thermostat 1.30D, the actual consumption of the HVAC system should reduce as a result of a higher setpoint for heating or cooling being established. The actual usage for a particular setpoint for a site 1.04 may, over time, be known and/or sampled and the offsets can then be computed and verified as needed to ensure that the reductions that are calculated are correct. The system 1.02 can thus measure the shorter and less frequent cycling of the HVAC system to create an overall energy savings amount. For example, if the unit consumes 5 kwh set at 72 and used 4.6 kwh set at 76 then the savings is 0.4 kwh per hour.

At the end of the Supply Request period, the gateway node 1.10D will re-enable the devices 1.08 and report a completion message to the system 1.02 that includes the whole house demand data and total consumption data. For the thermostat or thermostat devices, a reverse ramp can initiate to reduce the potential of creating a peak demand at the end of a curtailment or control period. This reverse ramp could include the restriction of secondary compressor stages as well as heat strips depending on the mode (heating or cooling) that the thermostat is in.

The system 1.02 may also send a supply request cancel message to abort the PROGRAM. When a supply request cancel message is received, the gateway node 1.10D will perform as if the time has expired and performed all necessary clean-up, wrap-up and reporting as described above.

In addition to reporting individual demand contributed by each device 1.08 during the PROGRAM, the gateway node 1.10D may also send the total demand generated for all devices 1.08 for the PROGRAM to the system 1.02.

In another aspect of the present invention, the gateway node 1.10D may receive a utility generated scheduled supply request. The gateway node 1.10D may be responsible for administering the PROGRAM within customer site 1.04. For example, the gateway node 1.10D may accept or download scheduled PROGRAMS from the system 1.02 in advance of the scheduled operation. The gateway node 1.10D may then monitor and control the affected devices 1.08 to carry out the PROGRAM.

During the PROGRAM, the gateway node 1.08D may report the electrical demand generated by each device 1.08 in the PROGRAM.

The gateway node 1.10D may also receive occupant device schedules from the system. Device schedules apply to customer devices 1.08 such as water heater, pool pump, hot tub and spas. The gateway node 1.10D may then be responsible for administering the device schedules within the customer site. The device schedules may be received by the gateway node 1.10D in advance of the scheduled operation. Then the gateway node 1.10D may monitor and control the affected devices 1.08 per the downloaded device schedules.

In another aspect of the present invention, if the gateway node 1.10D loses communications with the system 1.02 for a predetermined time, the gateway node 1.10D can re-enable devices 1.08 (water heater, pool pump, hot tub and spa). Note that the gateway node may have multiple days, e.g., three days, of schedules available. Water heaters can fall back to an operational mode, however, pool pump, spas, hot tubs and irrigation and well pumps may not. These latter devices may have to be cycled based on some programmed interval like, for example, 8 hours a day. Other devices 1.08 like an irrigation pump could not simply default to "on" or it may start and never stop. The ability to receive and run schedules is not limited to the gateway node 1.10D. Depending on the system implementation requirements, schedules, cycle run times and other operational commands may be downloaded to the control nodes 1.10 which will operate independently their individual schedules. This capability is designed to permit normal operation of the site 1.04 should the gateway node 1.10D fail or communications are lost between the gateway node 1.10D and the control node 1.10.

Figure 3A:
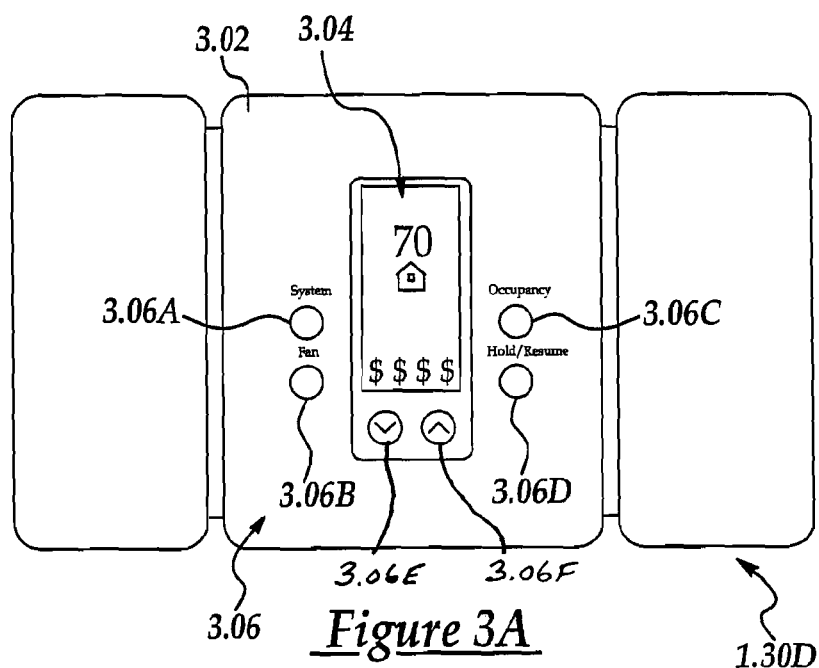
FIG. 3A is an illustration of an advanced thermostat device, according to an embodiment of the present invention.

With reference to FIG. 3A, the thermostat 1.30D in one embodiment, is a wall mounted device which has a control panel 3.02 with a display screen 3.04 and a plurality of input buttons 3.06. In the illustrated embodiment, the input buttons 3.06 includes a system button 3.06A, a fan button 3.06B, an occupancy button 3.06C, and a hold/resume button 3.06D. The input buttons 3.06 further include an first control button 3.06E and a second control button 30.6F.

Using the input buttons, the customer can control the HVAC system and other parts of the system 1.02 (see below). The thermostat 1.30D is in communication with the gateway node 1.10D (see above) and the gateway node 1.10D can query the current temperature and setpoint values of the thermostat 1.30D. Further, the gateway node 1.10D can change the heating and cooling setpoint(s) and offset values of the thermostat 1.30D (see below).

In one aspect of the present invention, the thermostat 1.30D may inform the gateway node 1.10D when its relay outputs or contact inputs change state, or the gateway node 1.10D can poll for this status. When this occurs, the gateway node 1.10D can query the thermostat 1.30D and send the current temperature and corresponding input or output status to the system 1.02.

The thermostat 1.30D may operate in a fallback mode upon loss of communication with the gateway node 1.10D. When communication resumes, the gateway node 1.10D can ascertain the state of the thermostat 1.30D and restore the desired functionality.

All changes made at the thermostat 1.30D can be communicated to the gateway node 1.10D or be received during a poll of the thermostat 1.30D. In one embodiment, the following functions can be accessible directly from the thermostat 1.30D:

View current temperature.
View current heating or cooling setpoint.
Override heating and cooling setpoints.
Resume scheduled heating and cooling setpoints.
View Heat/Cool/Auto mode.
Change Heat/Cool/Auto mode.
Activate/deactivate the fan.

As discussed above, load control nodes 1.10C provide two primary functions: 1) measure power consumption and instantaneous demand of an attached load and 2) control the load. In one embodiment, the load control node 1.10C includes a means, e.g., one or more means (see below) to allow the attached load to be connected or disconnected from main power. Alternatively, the load control node 1.10C may be integrated and/or coupled to a controller of the load for control of its functions.

In one embodiment, the load control node 1.10C may disconnect the load when a supply request command is received from the gateway node 1.10D and reconnect the load when a cancel supply request command is received from the gateway node 1.10D. The load control node 1.10C may further provide status information, e.g., state of load control means, when a status request command is received from the gateway.

In one aspect of the present invention, a load metering node 1.10A is coupled to a site's electric meter 1.30A. The load metering node 1.10A may accumulate time stamped cumulative consumption (kWh) data over a predetermined period, e.g., 15 or 20 minute time periods and be capable of storing up to a predetermined period of time's worth of data, e.g., 10 days.

The load metering node 1.10A is in communication with the gateway node 1.10D. The gateway 1.10D may query current accumulated consumption (kWh) from the meter 1.30A and/or "instantaneous" load measurement (kW) from the meter on request. "Instantaneous" can be determined by the capabilities of the meter. The gateway node 1.10D can query the 15-minute interval data. Data values can be returned with a timestamp.

2. Nodes

With specific reference to FIGS. 2A, 2B, 2C and 2D, the interaction with the devices 1.08 located at the customer site 1.04 is the node 1.10. The nodes 1.10 permit the system 1.02 to focus on the entire supply chain, from well head production and generation to the end consumption point. The nodes 1.10 are designed to give every energy-consuming device 1.08 the ability to intercommunicate with the entire supply chain if necessary and utilizes supply and demand balancing control logic, to improve the operational efficiency of end point devices 1.08, groups of end-point devices and the entire supply chain. This is accomplished by giving each end-point knowledge about the current demand on the entire supply chain coupled with the ability to alter its operation to assist in managing and balancing the overall demand on the delivery system. This information exchange is accomplished over an always on broadband, high-speed, point-to-point, point to multipoint or mesh network (see above).

Energy consuming devices 1.08 within a customer site 1.04 may have varying levels of operational intelligence. Appliances and other utility consuming devices 1.08 range from super energy efficient refrigeration units with embedded micro processor controls to dumb devices like water heaters and pool pumps which simply operate in an on or off state using sensors or timers to control their operational state. The nodes 1.10 provide an entirely new level of intelligence to each end device 1.08 and are designed to be modular in nature so as not to burden the end point control with more features or functions than it needs.

Nodes 1.10 may be designed to retrofit existing devices 1.08, as well as be fully integrated into the end point at the time of manufacture of a device 1.08.

In one embodiment, there are three types of nodes 1.10: a load metering node 1.10A, a control node 1.10B, and a load control node 1.10C, as well as the gateway node 1.10D. Each type of node 1.10 has common basic features as well as optional sub modules such as Interfaces, Metering or Control modules (see below).

The nodes 1.10 are designed to increase the operational efficiency of even the most intelligent end use device 1.08 by giving it knowledge of the entire "utility" supply chain that it is connected to, making it possible for the end use device 1.08 to perform its given function more efficiently and economically.

As shown, each node 1.10 includes a node processor 2.02. In one embodiment, the node processor 2.02 is a microprocessor. The node 1.10 also includes a memory device 2.04, such as non-volatile memory, for storing program and other data, as needed. Each node 1.10 also includes a two-way communications 2.06 channel for communicating with other components in the system 1.02. The communications channel 2.06 may be either a hardwired or a wireless system. Any suitable communications means may be used to communicate with the intended device. For example, the two way communications channel 2.06 may provide a means to communicate with other nodes 1.10 or a programming device 2.08. The programming device 2.08 may be used either at the site of manufacturing of the node 1.10 or onsite to configure and/or program the node 1.10. In one embodiment, the programming device 2.08 is coupled to the node 1.10 through a communications port (not shown). The two way communications channel 2.06 may also provide communication to the gateway node 1.10D and/or the other nodes 1.10A, 1.10B, 1.10C The nodes 1.10 may be connected in a network by the two way communications channel 2.06. The network may either be a wired, wireless, or a combined network.

In one aspect of the present invention, the nodes 1.10 provide the system 1.02 with the ability to monitor and control the operation of on site distributed generation resources, such as a photovoltaic system (not shown). This permits the system 1.02 to dispatch on site capacity when the demand and economics are favorable or the demand exceeds the supply creating an energy shortage. The system 1.02 may do this in conjunction with any other utility resource such as natural gas or propane that might be used to power the a device 1.08. This ability is further enhanced by a node's 1.10 ability to communicate with a plurality of other similar nodes 1.10 or any other control, monitoring, configuration or management node attached directly or indirectly to the system 1.02 making it possible for individual nodes 1.10 to jointly share the energy management process among many devices 1.08 using a unique set of decision criteria to maintain the operation integrity of the customer site 1.04 or any other sphere of control, e.g., a plurality of nodes 1.10 across multiple sites, while managing total demand, the economics of the operation and the end use devices.

In another aspect of the present invention, the system 1.02 permits communications outside the customer site 1.04, permitting individual nodes 1.10 or a plurality of nodes 1.10 in aggregation to intercommunicate with other control points which might include, but are not limited to, utility companies, energy suppliers, other sites or groups of sites, other sites or points of operation under the same ownership, energy and utility brokers, energy and utility service providers, independent power and utility producers, distribution sub stations, transmission sub stations, Gas and Water well operator and any other point of control or management or service organization associated with the site 1.04, the end point device or the "utility" delivery network servicing it.

As discussed above, each node 1.10 includes a two way communications channel 2.06, which permits the node 1.10 to intercommunicate with any other point or points within the system 1.02. This intercommunication may occur with any other point within the system 1.02 and may be, but is not limited to, another associated Node 1.10, a control aggregation point or an outside point like an energy or utility supply point associated with the customer site 1.03 or a control configuration, monitoring or management point. The system 1.02 interconnects either directly or indirectly a plurality of nodes 1.10 and related supply, monitoring, configuration and management points to create a secure ubiquitous communications channel over which broadcast, point to point, mesh and point to multipoint communications can occur as well as any other communications necessary to perform the energy management function. Because of the plurality of communications protocols and physical media over which data communications can occur, nodes 1.10 may have multiple Two Way Communications Channels, permitting the best media and protocols to be implemented to achieve the desired end result.

Figure 2A:
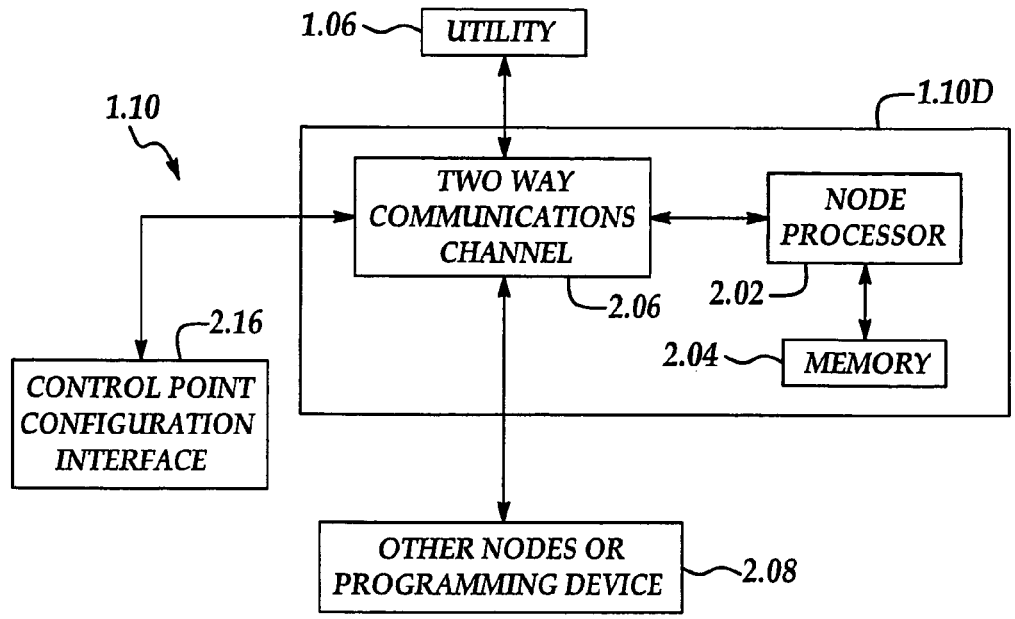
FIG. 2A is a block diagram of a gateway node used in the energy management system of FIG. 1A.
Figure 2B:
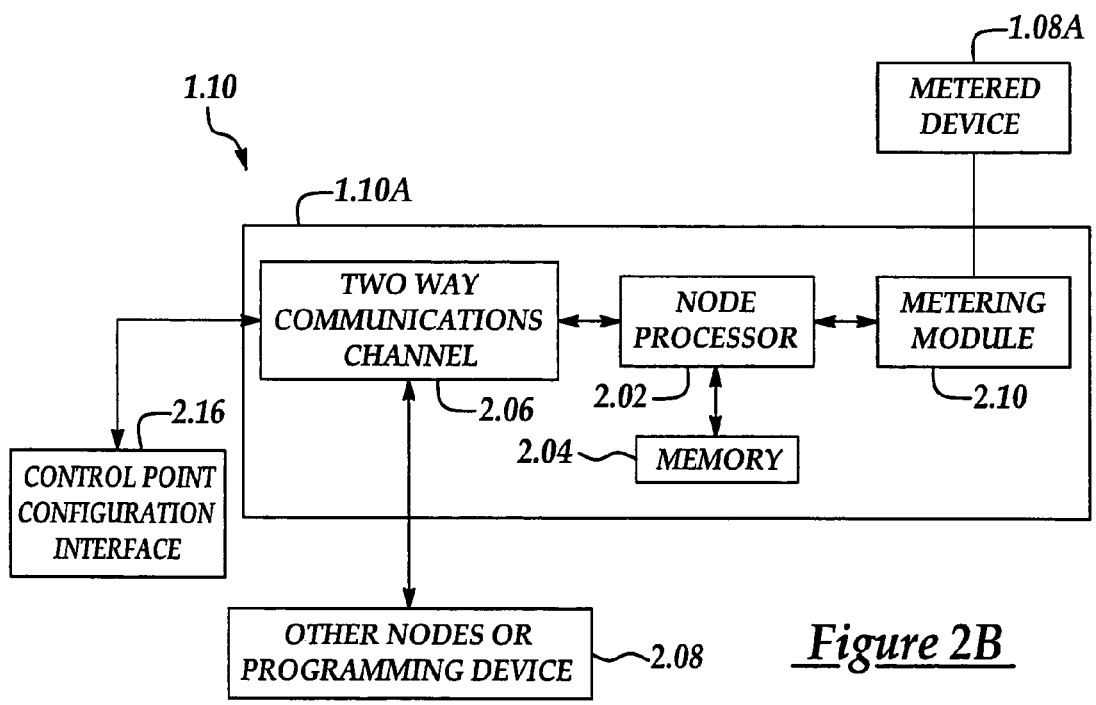
FIG. 2B is a block diagram of a metering node used in the energy management system of FIG. 1A.

With specific reference to FIG. 2B, an exemplary load metering node 1.10A is shown. As discussed above, the load metering node 1.10A measures the instantaneous power being delivered to the metered device 1.08A and may also determine the total power delivered to the metered device 1.08A over a predetermined time period, e.g., 15 or 20 minutes. The load metering node 1.10A includes a metering module 2.10 which is coupled to the metered device 1.08A for measuring power delivered to the metered device 1.08A. This information is relayed through the gateway node 1.10D over the two way communications channel 2.06 to the utility control system 1.12. In one embodiment, the metering module 2.10 includes a metering processor and memory for calculating and storing power data, such as accumulated power consumption.

In one embodiment, the metering module 2.10 includes means, such as one or more current transformers, for measuring power delivered to (or from) the associated device 1.08.

Figure 2C:
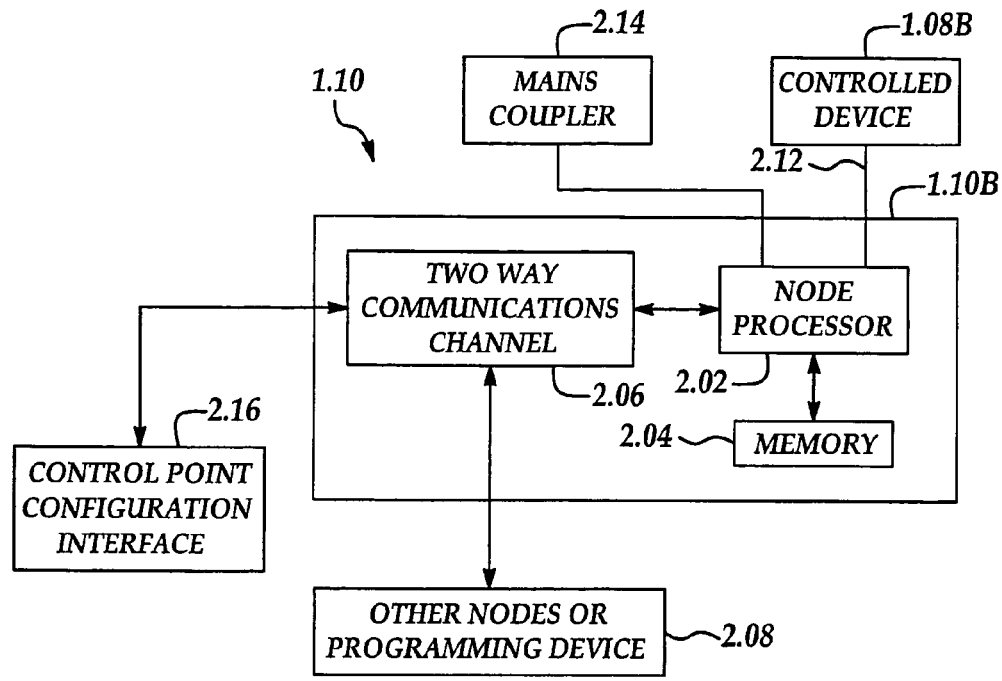
FIG. 2C is a block diagram of a control node used in the energy management system of FIG. 1A.

With specific reference to FIG. 2C, an exemplary control node 1.10B is shown. As discussed above, the control node 1.10B is used to control the controlled device 1.08. In the illustrated embodiment, the control node 1.10B is coupled to the controlled device 1.08B by a controlled device communications channel 2.12. In one embodiment, the control node 1.10 includes one or more relays (not shown) for connecting and disconnecting the controlled device 1.08B from power. In another embodiment, the control node 1.10 is interconnected to the controlled device's 1.08B onboard controls. In this embodiment, the control node 1.10B directly controls the operation of the controlled device 1.08B.

Figure 2D:
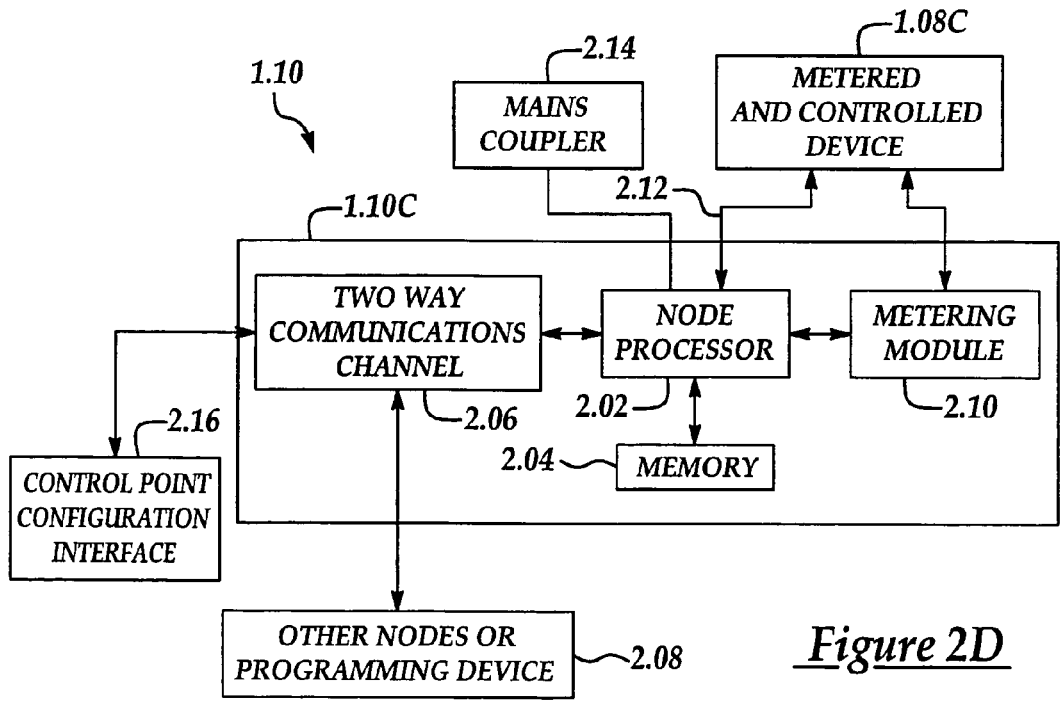
FIG. 2D is a block diagram of a load control node used in the energy management system of FIG. 1A.

With specific reference to FIG. 2D, an exemplary load control node 1.10C is shown. As discussed above, the load control node 1.10C performs both the metering function of the load metering node 1.10A and the control node 1.10B. Thus, the load control node 1.10C includes both the metering module 2.10 and the controlled device communications channel 2.12.

As discussed above, each node 1.10, in its simplest form includes a processor 2.02 and a memory device 2.04 within which control logic resides and runs. This control logic, processor 2.02 and memory 2.04 provide the node 1.10 with the necessary control intelligence to manage its associated load or generation resource as a stand-alone point or in conjunction with a plurality of other nodes 1.10 locations as well as manage communications over the controlled device communications channel 2.12 (for control and load control nodes 1.10B, 1.1OC) and over the two way communications channel 2.06.

In one aspect of the present invention, the gateway node 1.10D acts as a central control node, providing intercommunications between the other nodes 1.10 at the customer site 1.04.

In another aspect of the present invention, a plurality of nodes 1.10, which may be located at a single customer site 1.04 or across multiple sites 1.04, may be grouped for a specific purpose, e.g., control of all pool pumps in a defined geographic region or all pool pumps in a PROGRAM in a defined geographic region. For the plurality of nodes 1.10, a single node, which may be a gateway node 1.10D, may be chosen as the central control node.

In one embodiment of the present invention, the processor 2.02 and control logic provide the node 1.10 with the ability to sense what its current state of operation should be, based on commands received from the central control node or gateway node 1.10D, either within the customer site 1.04 or within the aggregation control sphere of the central control Node, and would manage the associated devices 1.08 based on this control state. Each node 1.10 may also report back the status of the associated device 1.08, their energy usage or other utility consumption rate (based on measurement from the metering module 2.10), to the assigned central control node 1.10.

Under this configuration, the nodes 1.10 may be cascaded from the central master control point down to the lowest level of control at an end point within the system 1.02 using, but not limited to, a tree and branch or star network, however deep the architecture dictates, to achieve the level of control desired. Each sub level of control would receive control parameters or commands from its subsequent higher level node 1.10 and would either directly control loads attached to it or command nodes 1.10 subordinate to it, to achieve the desired control or management state. Through cascading control functions into a chain of command, higher level nodes 1.10 can more effectively manage a plurality of devices 1.08 without encountering scaling limitations usually associated with automation control systems managing a plurality of loads from a central processor. By the nature of its design, the node 1.10 operating in a cascading control network as described above would not be limited or fixed in its structure and nodes 1.10 could migrate dynamically from one "group" to another or move up or down in the cascade structure to permit different control spheres and algorithms. This unique architecture permits each node 1.10 to have a customized process control program and data collection criteria allowing its level of control and interaction with its associated load or generation capacity to be designed to meet the management control program objectives.

In addition, the process is further enhanced if the load or generation point under the control of the control or load control node 1.10B, 1.10C has its own operational control processor (not shown) which is interconnected with the node 1.10B, 1.10C over the controlled device communications channel 2.12 to provide operational state and control commands, run diagnostics and tests, operational health and performance data, and alarm conditions. Data from the controlled or controlled and metered device 1.08B, 1.08C being accessible to other nodes 1.10 or control or monitoring or measurement nodes associated with the system 1.02 for either direct use or transfer to nodes external to the network, through whatever data transfer means are most suitable for the data type and priority level.

With reference to FIGS. 2C and 2D, to manage the operation of basic consumption points like pumps, motors or heating elements that are typically thermostatic, valve or relay controlled, the control node or load control node 1.10B, 1.10C may include a mains coupler 2.14 which permits the control node 1.10B or load control node 1.10C to attach or disconnect the load or generation capacity to the mains or distribution network for the "utility" product used or generated by the end device 1.08B, 1.08C.

In another embodiment of the present invention, the node control logic or program would be capable of receiving and processing data independent of specific controls from a central control point and at a minimum would monitor and control the operation of its associated load or generation capacity based on, but not limited to: the demand for the utility product, cost of the utility product, congestion levels on the delivery system and/or their associated cost, for electricity it would at a minimum, but not be limited to, monitoring demand, usage, sign wave frequency, voltage, and for other utilities such as, but not limited to, gas, steam or water, it would, but not be limited to, measuring line pressure, ambient temperature and any other factors and determine the best operating mode for its associated load or generation resource. Using parameters from a plurality of measurement, monitoring and control points associated with the utility delivery system, available to all nodes on the network, the node 1.10 would manage its associated consumption or generation demand and load on the "utility" delivery system in accordance with control parameters governing its operation, supplied to it through a control point configuration interface 2.16 and report any and all operational data, status and conditions back to one or multiple associated measurement, monitoring and control points as configured through the control point configuration interface 2.16. One example of a control point configuration interface 2.16 is an input touch screen located on a device 1.08.

In both the simplest form or the enhanced implementation above or any other combination of nodes 1.10 and control points, the individual nodes 1.10 are capable of controlling the operation of the associated load or generation capacity to shift, reduce or cap demand on the delivery system or in the case of generation to dispatch the available capacity to help meet the demand and ensure the integrity and reliability of the delivery system. Based on triggering parameters, which include but are not limited to: the time of day, the total demand on the delivery system, the real time cost of the utility, the full weighted cost of delivery including congestion charges, the minimum operating characteristics of the associated load or generation source, the total demand for the site 1.04, the total demand for the individual nodes 1.10 within an aggregate group, externalities like weather factors and the historical usage and demand patterns of the individual node 1.10 and/or its aggregate group of nodes 1.10, individual nodes 1.10 will determine their optimum operating characteristics and will operate their associated load or generation resource to improve those operational and performance characteristics.

As discussed above in one embodiment of the present invention, the load metering, control and load control nodes 1.10A, 1.10B, 1.10C communicate with the gateway node 1.10D through a wireless or radio frequency communications link. With reference to FIG. 1D, when a node 1.10A, 1.10B, 1.10C comes online or powers up, including initial power up when the node 1.10A, 1.10B, 1.10C is being added to the system 1.02, an initialization process 1.32 must be performed. In first step 1.32A, the gateway node 1.10D emits a beaconing signal. Generally, the gateway node 1.10D continually emits the beaconing signal. In a second step 1.32B, the node 1.10A, 1.10B, 1.10C receives the beaconing signal and responsively generates a response signal. In a third step 1.32C, the node being initialized 1.10A, 1.10B, 1.10C joins the network of nodes 1.10A, 1.10B, 1.10C through a handshaking routine between the gateway node 1.10D and the node being initialized 1.10A, 1.10B, 1.10C.

In another aspect of the present invention, the control and load control nodes 1.10B, 1.10C are connected to the whole distribution channel up to the utility 1.06. The control and load control nodes 1.10B, 1.10C may receive data, control parameters, and PROGRAM schedules through and/or from the gateway node 1.10D. Based on the received data, control parameters and/or schedules, the control and load control nodes 1.10B, 1.10C may control operation of the associated device 1.08.

Figure 2E:
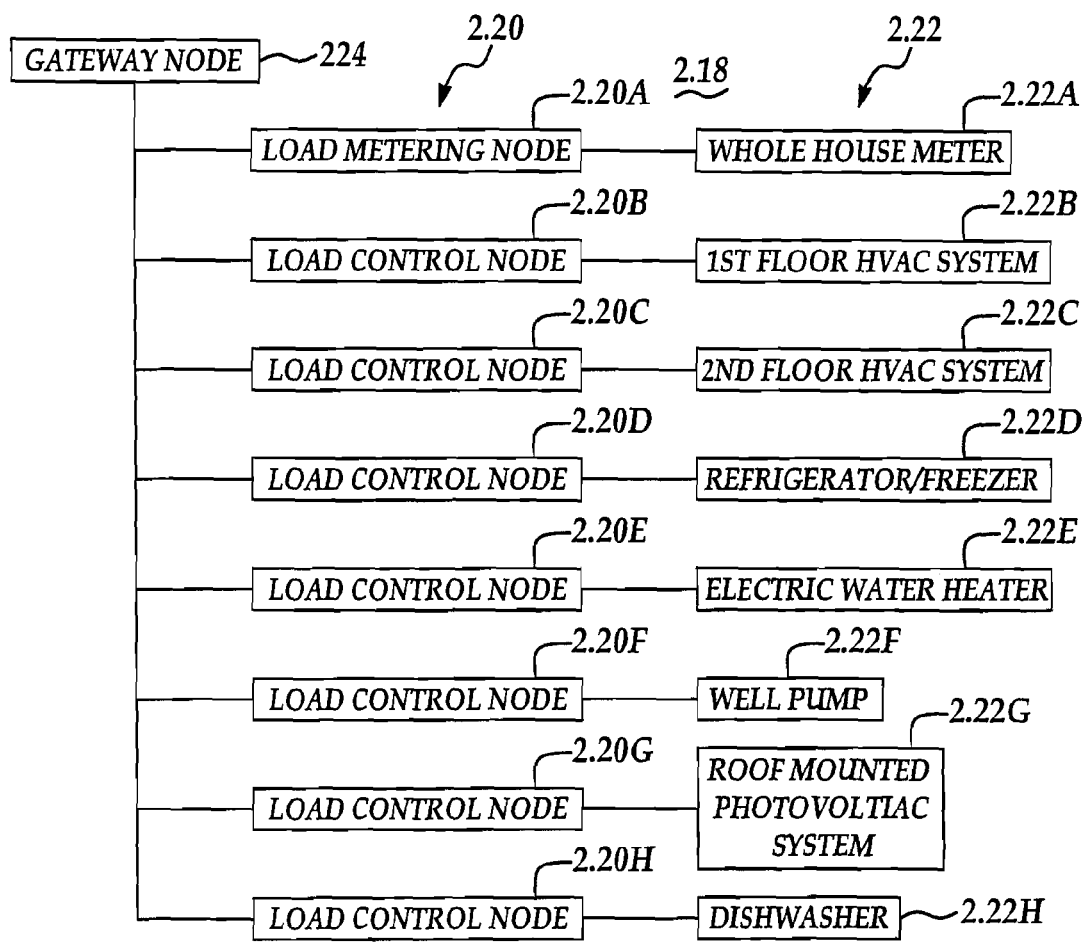
FIG. 2E is a block diagram of an implementation of the energy system of FIG. 1A at a customer site.

With reference to FIG. 2E, an example of the system 1.02 applied to a specific customer site, i.e., a residence or home 2.18 will be used to illustrate several functions of the system 1.02. In the illustrated embodiment, the home 2.18 includes eight nodes 2.20 coupled to eight devices 2.22.

A load metering node 2.20A is coupled to a whole house meter 2.22A. The whole house meter 2.22A could be associated with revenue grade power (electricity), gas or water. However for purposes of illustration, the whole house meter 2.22A is associated with electricity delivered to the home 2.18. The load metering node 2.20A monitors and reports the total house consumption of electricity. The load metering node 2.20A measures and reports total consumption as well as instantaneous demand and records and report consumption in total. Furthermore, the load metering node 2.20A may store interval data in non-volatile memory (see above) in accordance with industry standards and system management requirements for the entire home to other control nodes 2.20 within the home 2.18 and/or any other node associated with its aggregation group, the delivery supply chain or any other node needing or authorized to receive or access it.

In addition, the home 2.18 has first and second load control nodes 2.20B, 2.20C associated with its heating and air conditioning systems one controlling the main living space, i.e., the $1^{st}$ floor HVAC system 2.22B and the other controlling the second floor bedroom space, i.e., the $2^{nd}$ floor HVAC system 2.22C.

Third, fourth and fifth load control nodes 2.20D, 2.20E, 2.20F are associated with a refrigerator/freezer 2.22D, an electric water heater 2.22E, and a well pump (for yard irrigation) 2.22F, respectively. Sixth and seventh load control nodes 2.20G, 2.20H are associated with a roof mounted photovoltaic system 2.22G (comprised of a storage battery bank and inverter capable of generating 2500 watts of 240v 60 hz A/C power for up to 12 hours) and a dishwasher 2.22H.

While the system 1.02 will work with any "utility" provided product such as, but not limited to, gas, water, electric or steam, for ease of illustration electricity is the only utility product being used in this example. Each node 2.20 in this example has control parameters stored in its associated memory, which the control program for the node 2.20 uses to determine the optimum operating characteristics for the management of its associated load or generation capacity.

In one embodiment of the present invention, a gateway node 2.24 may be utilized to aggregate the premise nodes 2.20 and consolidate the communications process and/or control processes with upper level nodes 2.20 or any other nodes directly or indirectly in the system 1.02.

The nodes are connected in a network (as described above), but may operate autonomously or require direct commands to change their operational state. In one embodiment, the nodes 2.20 include basic logic so that if the node 2.20 is severed from the network either intentionally or by accident, the node 2.20 will continue to perform their management and monitoring functions to optimize their attached loads performance based on the last known condition of their associated utility supply chain.

In its simplest form, the home 2.18, may participate in any number of conservation or demand limiting programs, i.e., Power Saving Programs or PROGRAMS. The following illustrated how the nodes 2.20 may support these PROGRAMS. However, the following should not be interpreted to limit the present invention to any such PROGRAM.

By its nature of having a processor 2.02, memory 2.04, metering module 2.10, mains coupler 2.14, controlled device communications channel 2.12, two way communications channels 2.06, control point configuration interface 2.16 and the ability to communicate with and coordinate operational and load management processes among a plurality of end points, the node 2.20 may be programmed and configured to perform a plurality of control and interface functions and is not limited or constrained in its ability.

For example, the nodes 2.20 may be configured in a Load Limit or Load Cap Program. The term load limit or load cap may be interpreted in this example to mean a limit or cap on either the KW demand or the total cost of operation making this example either a physical energy usage or economic control process. Because of the optional metering capability of each node 2.20 and its ability to receive economic data from the supply chain serving it, the node 2.20 is capable of making decisions based on its rate of consumption as well as the cost it is incurring at any point in time.

Under a Load Limit or Load Cap Program, the customer would commit to maintain their total demand for any "utility" supplied product to a maximum demand level under an agreement with the supplier. Under such a Program the customer would be subject to a billing rate, which increases as the total demand for the product, increases. As a result, the customer that manages to maintain their demand in a flat pattern would have a much lower overall rate per unit of "utility" product consumed than one that had erratic usage patterns of peaks and valleys. The reasoning for such a program is that suppliers of "utility" products must commit to meet all demands on their system and therefore they reward consumers with consistent, managed consumption patterns with lower rates, because to meet their needs they do not have to have maintain large reserve margins. On the opposite side of the scale, they charge higher "demand charges" to those who do not manage their loads. As a result, customers can lower their costs by maintaining a consistent and flat load profile.

In our example, it will be assumed that the customer has agreed upon a maximum demand of 5,000 watts or 5 kw with its supplier, the utility. As mentioned earlier, this demand could just as easily have been a financial limit based on the fully loaded cost of delivering the utility product to the point of consumption and may be set by the owner, customer or any other entity associated with the site 1.04 wishing to maintain cost control over the utility product.

The gateway node 2.24 acts as the gatekeeper for usage and monitors and reports on the consumption and demand for energy at the whole premise level. The gateway node 2.24 could be, but is not limited to, a single point node dedicated to just this site 1.04 as part of a tree and branch control configuration or it could be a node which is part of an aggregate group of homes in a star network. By its nature, the gateway node 2.24 will monitor and store consumption and demand information and report it to other nodes 2.20 in the network within the home 2.18, as well as nodes outside the home 2.18 such as a central control node for the home 2.18 or aggregation group, energy providers, energy brokers, energy service providers, ISO's and other authorized agents. As the total demand for the home 2.18 approaches the agreed upon energy consumption limit of 5 kw, the rate of consumption data flowing from the gateway node 2.24 over the two way communications channels 2.06 would be received at a minimum by either the individual nodes 2.20 within the home 2.18 or by a central aggregation node in more elaborate implementations. Based on parameters provided to each node 2.20 through the control point configuration interface 2.16 or master control node parameters provided to an aggregation control node through the control point configuration interface 2.16 the load reduction, shifting and management process would be initiated. Based on the amount of load reduction needed, different levels of action may be taken to reduce the total demand utilizing priority shedding parameters which would result in the least important load in the group to perform a reduction function if operating and report the results followed by the subsequently higher levels within the group until the total demand for the site 1.04 was reduced to an acceptable level. The reverse process may initiate as the total load of the site 1.04 dropped below known levels of individual load consumption rates permitting previously shed or reduced loads to resume normal operation without exceeding the agreed upon demand cap. In addition, any device 2.22 which was shed due to its low priority in the demand prioritization scheme could increase its priority based on its minimum operating control parameters and cause its priority to be increase to a point that it will force a once higher priority load to become subordinate to it and thus swap its shed status with a device 2.22 of equal or greater load value to meet its minimum operational requirements.

This simplistic example is only to illustrate how a simple load reduction might be accomplished using the node 2.20. In this example, the stored energy available in the photovoltaic system's 2.22G storage batteries would most likely be dispatched first to offset the use of grid provided energy to meet the site's 1.04 energy needs versus shedding load if sufficient stored energy was available. To complete this example, the actions performed at each of the nodes 2.20 in the home 2.18 will now be examined individually. It should be noted that control can exist at the individual node level as illustrated by this example or could exist at the aggregation node level or at any high level in the overall node cascade depending on the deployment architecture and node processor control programming and control parameters chosen by the implementer.

The first and second load control nodes 2.20B, 2.20C for the HVAC systems 2.22B, 2.22C monitor and control the operation of compressors and resistive heating elements to maintain the indoor temperature. It also has the ability to intercommunicate with the HVAC systems 2.22B, 2.22C directly and control the temperature settings as well as have direct control over multi speed compressors and emergency heat strip operations using the controlled device communications channel 2.12 if the thermostatic control unit of the home 2.18 has a communications interface. This communications channel 2.12 also permits it to report on the systems' 2.22B, 2.22C operational characteristics and contact the customer, outside service providers or the manufacturer if any segment of the HVAC systems 2.22B, 2.22C malfunction using the two way communications channels 2.06 either directly or through a cascade of nodes 2.20. The load control nodes 2.20B, 2.20C for the HVAC systems 2.22B, 2.22C would utilize the metering modules 2.10 to monitor and report on the systems 2.22B, 2.22C rate of consumption of utility energy units but would not need the mains coupler 2.14 if it was managing the systems 2.22B, 2.22C operation through the controlled device communications channel 2.12. Depending on the total demand for energy units of the home 2.18, the node 2.20 may have the ability to manage the temperature within the home 2.18 based on customer's supplied parameters supplied through the control point configuration interface 2.16 to cause the HVAC systems 2.22B, 2.22C to reduce total demand and could based on a priority setting maintain separate control parameter for each HVAC system 2.22B, 2.22C depending on the time of day and occupancy status. To further enhance its operation efficiency, the load control node 2.20B, 2.20C associated with each HVAC system 2.22B, 2.22C may suppress the operation of secondary compressor operating stages and restrict the use of emergency resistive heat strips provided that the temperature recovery within the site 1.04 was progressing at a satisfactory rate. This capability permits the system 1.02 to operate at standard efficiency when the supply and associated cost of energy is low while greatly improving the operational efficiency of the system 2.22B, 2.22C when the supply and associated cost of energy is high. Using a plurality of optional parameters supplied by the customer, the energy provider and the gateway node 2.24, the system 2.22B, 2.22C would be capable of determining which mode of operation it should be implementing and control the overall consumption of the HVAC system 2.22B, 2.22C to achieve the desired consumption goal. By varying the operational parameter for the control of the system, the load control node 2.20B, 2.20C may choose, but not be limited to, selecting a higher level on comfort over cost; vary the rate of temperature change differently based on cost and occupancy status; totally restrict the operation of secondary states of compressor operation or emergency heat strips based on energy supplier critical load level signals or total premise consumption cap level attainment; modify the temperature setting or suspend the systems' 2.22B, 2.22C operation for a specified period of time under energy supplier critical load situations or total premise consumption cap level attainment; alternately cycle multiple units in a site 1.04 to avoid multiple units operating simultaneously; perform pre-cooling or pre-heating prior to higher pricing or demand periods being in effect; perform smooth and gradual temperature change setting in periods of moderate increased demand or price and more radical temperature change setting in periods of rapid increased demand or price; over-ride all controls and operate as normal causing other nodes 2.20 to carry the full burden of any load reductions necessary; cease operation until the indoor environmental condition reaches a parameter set maximum critical level or any other action programmed into the node 2.20B, 2.20C. This and other combinations of load curtailment and control negotiated between the nodes 2.20 in the home 2.18 or aggregation control group are monitored and reported by the central control point or the gateway node 2.24 to alert nodes within the home 2.18 or aggregation group of the total load level, demand, cost of energy and delivery, congestion costs and other related control parameter triggers.

The third load control node 2.20D for the refrigerator/freezer 2.22D monitors consumption of the refrigerator/freezer 2.22D using the metering module 2.10 and also communicates directly with the processor controls of the refrigerator/freezer 2.22D using the controlled device communications channel 2.12 to determine the operational status of the refrigerator/freezer 2.22D and to provide over-ride controls for normal default functions like defrost cycles when they might be delayed to reduce overall demand. This communications channel 2.12 also permits the third load control node 2.20D to report on the refrigerator/freezer's 2.22D operational characteristics and contact outside service providers or the manufacturer if it malfunctions using the two way communications channels.

The fourth load control node 2.20E for the water heater 2.22E monitors and reports on consumption and demand for the water heater 2.22E using the metering module 2.10 and also has the ability to directly control when the water heater 2.22E is connected to the utility supply chain or not through the use of the mains coupler 2.14 which permits the fourth load control node 2.20E to connect or disconnect it from the utility supply. In more elaborate implementations the fourth load control node 2.20E may use the controlled device communications channel 2.12 and the metering module 2.10 to monitor the rate of water usage, the input water temperature and the stored water temperature available within the water heater 2.22E. These advanced features add intelligence to the process of water heating improving the operational efficiency of the water heating process and improving the energy demand pattern for the water heater 2.22E. If so equipped, the water heater 2.22E may be interconnected to a heat recovery system of the HVAC system 2.22B, 2.22C and if demand for heating water can be accomplished through the heat recovery system versus energizing the heating elements within the water heater directly, the nodes 2.20 of these devices 2.22 or a central control node for the home 2.18 would coordinate and execute that collaborative action thus reducing the total demand for the home 2.18

At this point it should be noted that water heaters can be recharged in multiple ways using either waste heat from a heat or fuel cell or other on site generation unit. More advanced water heating systems in the south would benefit from using solar panels in conjunction with other forms of regeneration to eliminate any load on the energy delivery system. It is important to note that in the case of solar panels and propane the supply chain is limited to the premise geography but would be effected by the weather in the case of solar and by the market price for propane. In the case of propane other factors like the quantity on hand and the lead time to schedule a refill by the provider balanced against the projected quantity of propone the site 1.04 will consume between the current time and predicted refill schedule time all must be factored into alternative fuel usage as part of the supply chain balancing logic.

The fifth load control node 2.20F for the well pump 2.22F has direct control over the operation of the well pump 2.22F and operates the well pump 2.22F based on parameters supplied to it through the control point configuration interface 2.16. The parameters may include the run time requirements and preferred times of operation, established by the customer as well as network node updates, which could include weather information relating to local precipitation. Sensor input could be present using the local communications channel (controlled device communications channel 2.12), which could provide precipitation input or ground moisture content. It is important to note at this point that the controlled device communications channel 2.12 may be used to not only communicate with other node processor 2.02 embedded into associated loads or generation, but also has the ability to interface with analog to digital processors or devices or any other form of communicating sensor or node to supply inputs to the node 2.20F. This channel 2.12 enhances the operational control logic for items like pumps that have no embedded process controllers or sensors. In a similar fashion however, this communications channel and communicating sensors can be used in conjunction with embedded process controllers to enhance their operation and performance to even greater levels where practical.

On site generation, while not prevalent today, is being promoted by State and Federal regulatory agencies, utilities, DOE and others concerned with maintaining a high level of reliability and integrity in the electric delivery systems. In particular, renewable generation resources are being promoted, as they have no environmental impact and do not consume any natural resources. Solar and wind generation are the most common of these power generation resources. Due to the relatively low capacity output of solar and wind generation systems, to be effective in offsetting peak demands for power, they must have an associated storage system into which they can stockpile power in relatively low input quantities and then retrieve it in bulk when necessary. The most common form of bulk power storage today are wet cell, deep cycle, active glass mat, lead acid batteries, which can be connected in parallel and series to create an electric storage facility of virtually any capacity and voltage. Great improvements have been made over the years in battery and inverter/charger technology. Companies like Hart, Signwave, Balmar and Trace are leaders in the battery charger/inverter market. By using embedded processors, sensors and solid state power converters, these companies have systems which can store DC power into battery storage systems at 12, 24, 36 and 48 volts and then retrieve it on demand and convert it to 120v or 240v AC power at 60 hz with utility quality and reliability. Companies like Trace already manufacture and market Inverter systems that manage photovoltaic arrays attached to battery storage systems that not only can be used to supply or supplement the needs of a residential home, but can safely sync and connect to the utility grid and sell power back to the utility at levels and for time periods specified by the owner.

While photovoltaic systems have come a long way in the past 15 years, they are limited in their energy management capability and need the addition of the invention to manage the storage and conversion process from DC to AC to make them part of a fully integrated energy management system. The load control node 2.20G with its ability to communicate with other nodes 2.20, sharing load and control data and managing demand within a site 1.04 or other group permits on site generation resources like the Trace power inverter to provide maximum benefit to the customer, the energy industry and the environment.

The seventh load control node 2.20H for the dishwasher 2.22H meters and monitors the dishwasher 2.22H and communicate with its embedded control processor through the controlled device communications channel however in most cases would not require the mains coupler 2.14. With the addition of the load control node 2.20H, the dishwasher 2.22H may be capable of performing its designated function at the best time and in the most efficient manner to meet the needs of the customer while interacting with all of the other nodes 2.20 in the home 2.18 to meet the contractual obligations of the energy demand cap under which it must operate. In this example, the node 2.20G may be a retrofit device attached to the embedded controller of the dishwasher 2.22H or may be fully integrated into the embedded processor thus reducing the overall cost of the combined systems by sharing processor and memory components.

The system, as described above, is designed to integrate all "utility" consuming and generating resources over a plurality of network media and designs to create dynamically defined and reconfigurable groups of any size and provide them with the ability to collaborate and intercommunicate to manage the demand on the delivery system and supply chain of "utility" providers and their products.

As discussed more fully below, alerts or message may be sent to the utility 1.06 and/or the customer (via email or the customer interface 1.14) and/or the service provider and/or a maintenance provider.

In one aspect of the present invention the control and/or load control node 1.10B, 1.10C receives information related to a characteristic of the commodity supplied by the utility 1.02, i.e., electricity, and controls operation of the controlled or controlled and metered device 1.08B, 1.08C. In one embodiment, the characteristic is related to the availability of electricity. In another embodiment, the characteristic is related to the cost or relative cost of electricity.

For example, using the exemplary home 2.18 discussed above, if the refrigerator 2.22D was scheduled or otherwise needed to initiate or perform a defrost cycle, the onboard refrigerator controls may query the associated load control node 2.20D to determine the cost or relative cost of electricity. The cost may be expressed as an actual value, i.e., dollars per unit electricity, or as an relative classification, e.g., high or low or peak vs. non-peak time periods. Based on the received cost or relative cost, the onboard controller of the refrigerator 2.22D may decide to either whether to perform the defrost cycle or to postpone the defrost cycle. In one embodiment, this decision may be based on a simple comparison between the actual cost and a predetermined value which may have been input by the customer. In other words, if the actual cost were above the predetermined value, then the scheduled action would be postponed.

In one embodiment of the present invention, each device 1.08 has an integrate node 1.10. By virtue of the node 1.10 being fed information directly from the supply chain, i.e., the utility, regarding the availability and/or cost of energy, the device 1.08 may make decisions based upon this information. For example, functions of the device 1.08 may be delayed and re-scheduled for another time. Or a different more energy efficient mode may be chosen.

In another aspect of the present invention, energy consumption for a device 1.08 may be trended or otherwise compared with predetermined threshold to detect and/or predict a failure or need for maintenance. For example, if the door of the refrigerator 2.22D was left open, energy consumption would increase. If energy consumption was increasing, the rate of increase could be compared with a predetermined value and an alert or message generated if the rate met or exceeded a predetermined value. Alternatively, the rate of consumption could be directly compared with a predetermined value to determine if an error or malfunction existed. In another example, if the filter of the pool pump 1.30B becomes clogged, the pool pump 1.30B will begin to work harder. This may also be seen through analysis of the energy consumption of the pool pump 1.30B.

In still another aspect of the present invention, a control node 1.10B or load control node 1.10C may be linked to one or more sensors (not shown) which sense parameters of the corresponding device 1.08B, 1.08C. The sensors may currently exist or be a part of the device 1.08B, 1.08C or be added to the device 1.08B, 1.08C. For example, the water heater 1.30C of the above example may have a water temperature sensor. Readings from the water temperature sensor may be received by the control node 1.10B or the load control node 1.10C and used in determined how to control the water heater 1.30C. For example, if the water heater's 1.30C control is instructing the water heater 1.30D to heat the water contained therein (based, at least in part, on the water temperature), the water heater 1.30C may first check with the associated load control node 1.10C to determine if it should proceed. The load control node 1.10C may approve or not approve based on a number of factors, including as indicated above, a characteristic of the electricity supply and/or cost or relative cost of electricity, as well as the energy requirements of other devices 1.08 within the home 2.18 (or devices 1.08 at other sites).

In another aspect of the present invention, a device 1.08 may be a storage system or an inverter system. For example, the device 1.08 could include one or more batteries (not shown) coupled to the power transmission network by a load control node 1.10C. When energy is relatively less costly or more available, e.g., during non-peak hours, the load control node 1.10C could control a mains coupler 2.14 to provide energy to the batteries. During peak periods, the load control node 1.10C may then control the mains coupler 2.14 to reverse and direct energy from the batteries to other devices 1.08.

In another aspect of the present invention, the system 1.02 allows the devices 1.08 working with their associated nodes 1.10 to make joint decisions based upon the information received from the supply chain. For example, if a curtailment PROGRAM affects a group of pool pumps within a certain geographic region, limiting each pump's run time to 15 minutes per every hour. Each pump and/or corresponding load control nodes 1.10C may determine which pumps will run during each 15 minute segment of each hour.

In still another aspect of the present invention, the customer may set a limit for the total power demand for the home 2.18 during any given period, e.g., 5000 Watts. The gateway node 1.10D receives the total current demand, i.e., power being used, on a real-time basis. Thus, if another device 1.08 in the home 2.18 wanted to perform a function, the device 1.08 (through the associated node 1.10) may query the gateway node 1.10D for permission. If the requested function would cause total demand to exceed this amount (or come within a predetermined threshold), the gateway node 1.10D may not allow the device 1.08 to perform that function.

In a further aspect of the present invention, the customer or system 1.12 may set up a desired operating parameter for a particular device 1.08. For example, the customer may indicate that he wants the pool pump 1.30B to operate for a given period of time each day, e.g., eight hours. In one embodiment, the system 1.12 will schedule the operation of the pool pump 1.30B based on the information received from the supply chain, e.g., the cost or availability of electricity.

3. Advanced Thermostatic Control Device

As discussed, in one aspect of the present invention the thermostat 1.30D is an advanced thermostatic control device linked to the power distribution network. The thermostat 1.30D is also linked to the nodes 1.10 within the customer site 1.04 either directly or through the gateway node 1.10D and receives information from and regarding the power distribution network and the devices 1.08. As a result of the availability of information from up and down the supply chain, the thermostat 1.30D may more efficiently manage and offer additional functionality to the user.

In one aspect of the present invention, the thermostat device 1.30D receives information related to a characteristic of the energy being supplied and displays the characteristic on the display 3.04. In one embodiment, the characteristic is related to the availability of the energy. For example, the characteristic could be either "peak" or "non-peak" hours. If the power distribution network was operating during peak hours, "PEAK" could be displayed on the display 3.04. Or if the power distribution network was operating during non-peak hours, "NON-PEAK" could be displayed on the display 3.04.

In another embodiment, the present invention, the characteristic may be related to the cost of the energy or electrical power being supplied. For example, the characteristic could be the actual cost of a specified unit of energy. The actual cost could be displayed on the display 3.04. Alternatively, the characteristic could be a relative cost, i.e., is the actual cost near or about a baseline cost, or above or below the baseline cost.

With specific reference to FIG. 3A, in the illustrated embodiment, the cost or relative cost may be displayed to the user graphically. In other words, the cost could be displayed using a one or more symbols (shown as "$"). The number of symbols are related to the cost, i.e., the more symbols displayed the greater the actual or relative cost. For example, the thermostat 1.30D may use a scale from 1 to X symbols. X could be any number, e.g., 4 or 10.

The user, in viewing this information, could make an informed decision on where to set the desired temperature (or setpoints) using the control panel 3.02.

Figure 3B:
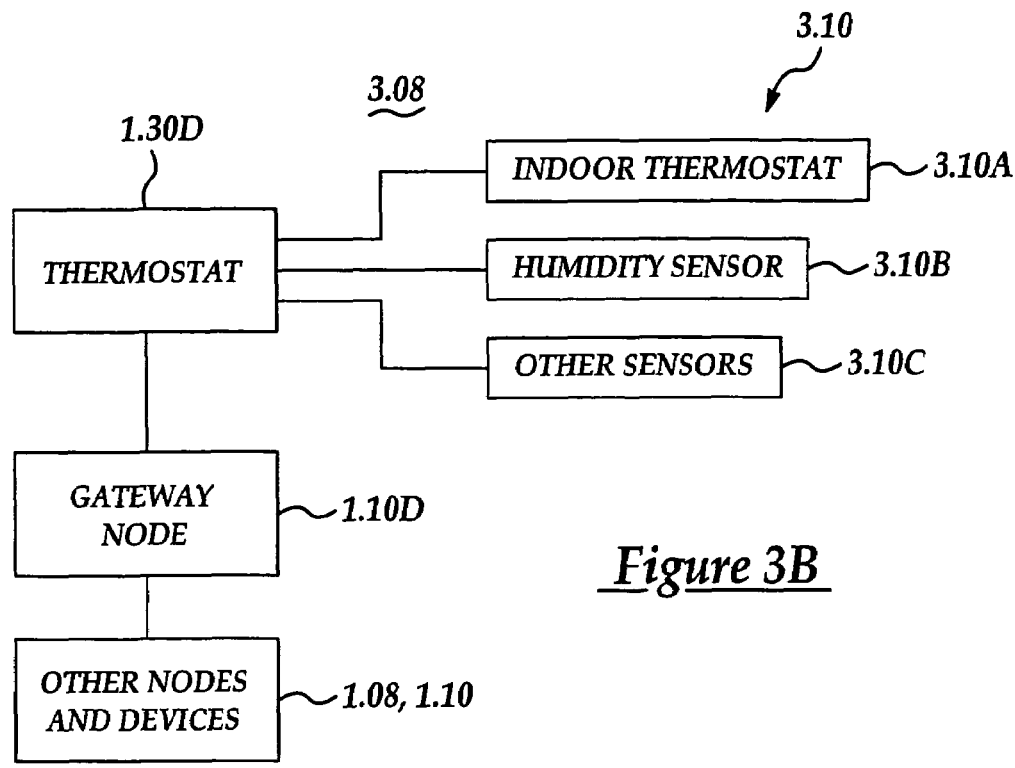
FIG. 3B is a block diagram of the advanced thermostat device of FIG. 3A.

With particular reference to FIG. 3B, in another aspect of the present invention the thermostat 1.30D forms part of a temperature and environmental sensing and control system 3.08. In this aspect of the present invention, the thermostat 1.30D is a node having a node processor 2.02, memory 2.04 and two-way communications channel 2.06. As shown, in the illustrated embodiment, the thermostat 1.30D is coupled to the nodes 1.10 at the customer site 1.04 through the gateway node 1.10D. The thermostat 1.30D is also coupled to one more sensors 3.10 which are adapted to sense one or more parameters related to indoor or outdoor air quality. Based on the sensed data, the thermostat 1.30D controls other devices 1.08 to manage air quality. The managed devices may include one or more HVAC systems, air cleaners or electrostatic filters, fans, humidifiers, de-humidifiers, damper and fresh air input ducts, and ionization devices or at type of device 1.08 which may affect air quality.

In one embodiment the sensors 3.10 include an indoor air temperature sensor 3.10A and a humidity sensor 3.10B. In another embodiment, the thermostat 1.30D may also include sensors 3.10C for measuring and/or sensing one or more of the following: outside temperature, UV intensity, wind direction and speed, relative humidity, wet bulb thermometer, dew point. In still another embodiment, the thermostat 1.30D may receive external information through the gateway node 1.10D, such as information related to the local weather forecast.

In a first embodiment of the present invention, the temperature and environmental sensing and control system 3.08 will manage indoor air temperature. In a second embodiment, using the sensor data and/or external information, the temperature and environmental sensing and control system 3.08 will manage the air quality and humidity in the site 1.04 by controlling the operation of the appropriate heating, filtration, conditioning and cooling equipment in conjunction with damper and fresh air input ducts, electro-static filters and ionization devices to maximize comfort and indoor air quality.

In one aspect of the invention, the system 3.08 will manage the available environmental conditioning devices 1.08 to maintain the optimum temperature, humidity and air quality conditions based on user defined minimum and maximum values for comfort indices and price of energy indices.

In another aspect of the present invention, the system would be able to switch between energy types, e.g., electric versus gas for environment heating and would also have the ability to switch suppliers based on the asking price of the energy suppliers or brokers serving the location.

In still another aspect of the present invention, the system 3.08 would balance two primary factors. First, the system 3.08 would maintain the environment within user defined acceptable minimum and maximum values for one or more air quality parameters, for example, air temperature and/or humidity. Second, the system 3.08 also vary these acceptable parameters based on user defined preferences and/or price points and and/or historical data (see below) to achieve the optimum environmental conditions.

To provide feedback to the user, the system 3.08 may also record the number of energy units (energy units as used here include for examples: kilowatt hours, BTU's, Therms, and Jules but is not so limited) used as a function of time for each of the devices 1.08 monitored and/or controlled by the system 3.08. Furthermore, the system 3.08 may report back detailed consumption data as a function of time and summarize these details to provide at a minimum, daily averages for any user defined period, monthly totals, as will as track the costs of each energy unit consumed per period and provide detailed and average daily cost for any user defined period as well as monthly totals.

In one aspect of the present invention, the system 3.08 may be capable of communicating with the devices 1.08 which have associated control or load control nodes 1.10B, 1.10C, beyond its primary management function of the environmental air management systems permitting each control node point within the site 1.04 or other sphere of control up to and including the entire utility supply chain, to use the same economic modeling techniques and controls that it uses to manage their primary functions.

The thermostat 1.30D is the customer or user's primary interface with the system 3.08. As discussed above, the thermostat 1.30D will be capable of displaying to the user the current cost of energy as well as its relative cost as a graphical or numeric value (1-10) or ($$$$$$$$$$) where 1 is low and 10 is high or $ is low and $$$$$$$ is high.

In another aspect of the present invention, the system 3.08 may also display on the display screen 3.04, energy efficiency data. The energy efficiency data may used to indicate, based on control parameters set in the system 3.08, how energy efficient the management protocol and control parameters capabilities are. This relative efficiency data may relate to the site's 1.04 performance on a standalone basis or may be tied to a comparison group against which relative efficiency can be determined or both. This data indicating the relative and actual cost of energy and effiency can also be communicated to other remote devices 1.08 like TV screens, or other display devices (at the site 1.04 or remote) which are capable of communicating and displaying information. These devices 1.08 may includes but are not limited to appliances with displays or indicator lights to reflect the cost of energy or any other means available at points of consumption or stand along means to inform the customer of the relative and actual cost of energy and their relative energy efficiency level. The system 3.08 may also manage, report and track its energy unit usage and interface with energy unit suppliers via a communications channel. In one embodiment, the system 3.08 controls will be located at the site 1.04, while the processors for modeling and managing the sources and types of energy units to be utilized and committed to can be local or distributed and operate over a communications network without regard to the actual location of or distance from the site 1.04.

In one aspect of the invention, the user may set a temperature setpoint, i.e., a desired temperature and the system 3.08 based on the temperature setpoint, sensed data, as well as the user's historical use of the system 3.08 may determine an effective setpoint. The system 3.08 may then control the devices 1.08 as a function of the effective setpoint.

The temperature setpoint may have an associated "deadband". For example, a temperature setpoint of 72 degrees may have a deadband of +/−5 degrees. In this example, the system 3.08 would not initiate cooling until the actual temperature reached 77 degrees or would not initiate heating until the actual temperature reached 67 degrees.

In another aspect of the present invention, the variable dead band of operation of the system 3.08 may be directly tied to the cost of energy and the customer's willingness to pay. For example, a fixed set point to a cost of energy may be set and an optimal ramp rate based on a time and temperature differential to achieve savings. Alternatively a user defined ramping rate such as 1 degree per 30 minutes to modify the temperature set point of the site 1.04 to reduce the operation of the heating or cooling system during periods of high energy prices may be defined.

In one aspect of the invention, the system 3.08 manages comfort for the customer site 1.04 by learning from the user's inputs or adjustments to the system 3.08 to change or modify indoor air temperature. This learning process alters the operation of the system 3.08, freeing the customer from having to make changes to manage the indoor environmental condition. To accomplish this, the system 3.08 must actively monitor and control not only the temperature setting in the home 2.18 but may also monitor and actively control the humidity levels.

In one embodiment, the system 3.08 determines the effective temperature to accommodate changes in the indoor humidity settings. For example, if the customer initially sets the thermostat at 72 degrees F., the system 3.08 senses the indoor humidity level and maintains a relationship between the temperature and humidity level sensed. As the humidity level of the home 2.18 rises in summer, the set point would remain at 72 degree F., however, the effective setpoint that the system 3.08 must maintain is automatically lowered to maintain a consistent level of comfort. As a default parameter, the system 2.18 may have to lower the effective set point from that established by the customer by 3 degrees F. for every 10% of relative humidity that is sensed to retain the comfort level in the site 1.04. On the opposite side of the control algorithm, as a default parameter, the effective set point would be raised by 3 degrees F. for every 10% reduction in sensed humidity within the home 2.18 to maintain the desired comfort level in winter. The ratio of 3 degrees F. + or − is a default setting and would be modified as needed based on the user's changes to the set point at the thermostat 1.30D. Changes to the effective set point as it relates to the sensed humidity therefore may be increased of decreased from the default ratios permitting the control algorithm to learn the user's individual preferences and over time, eliminate the need for the site 1.04 occupant to make any changes.

In another aspect of the present invention, the system 3.08 allows one or more occupancy modes to be defined and/or modified and/or utilized by the user. The use of different occupancy modes would assist in achieving a reduced level of demand on the energy delivery system as well as reduce the total cost of operation site 1.04. In one embodiment, the occupancy modes may be defined or modified through the user interface 1.14 (see below) and activated through the thermostat 1.30D and/or the user interface 1.14. Examples of possible occupancy modes include: home, away, weekend, weekday, holiday. Specific modes may also be defined for different users.

The system's 3.08 performance and energy reduction capabilities are further enhanced during all periods by applying the most energy effective set point or its related off set if the occupancy mode is "vacant" and applying the comfort management off set if the occupancy mode is "home". This occupancy sensitive control is further enhanced by the addition of occupancy sensing devices that communicate with the system 3.08.

In still another aspect of the present invention, the system 3.08 may determine the time necessary to recover from a one occupancy mode to another mode. In another words, this recovery time at which a transition or recovery process is to be initiated if the system 3.08 is set to a "recover by" time versus the default of "start recovery at" time.

The system 3.08 may be enhanced by having access to energy pricing data. Energy price information is used by the system 3.08 to predict the total cost of operation at the site 1.04 for maintaining the environmental comfort. Forward projection of pricing enables the system 3.08 to determine the optimal humidity and temperature settings that can be achieved for the site 1.04 and perform humidity level increases in the case of heating or humidity level decreases in the case of cooling so that the effective set point can be either lowered in the case of heating or raised in the case of cooling, permitting the heating or cooling system to run less during periods of higher prices. This ability to precondition the site in anticipation of increased pricing on average will reduce the total energy bill for the site 1.04.

Energy pricing information may be entered by the customer, be pre-established as part of an energy supplier program or be set to a default value designed to create a balance of comfort and savings.

Figure 3C:
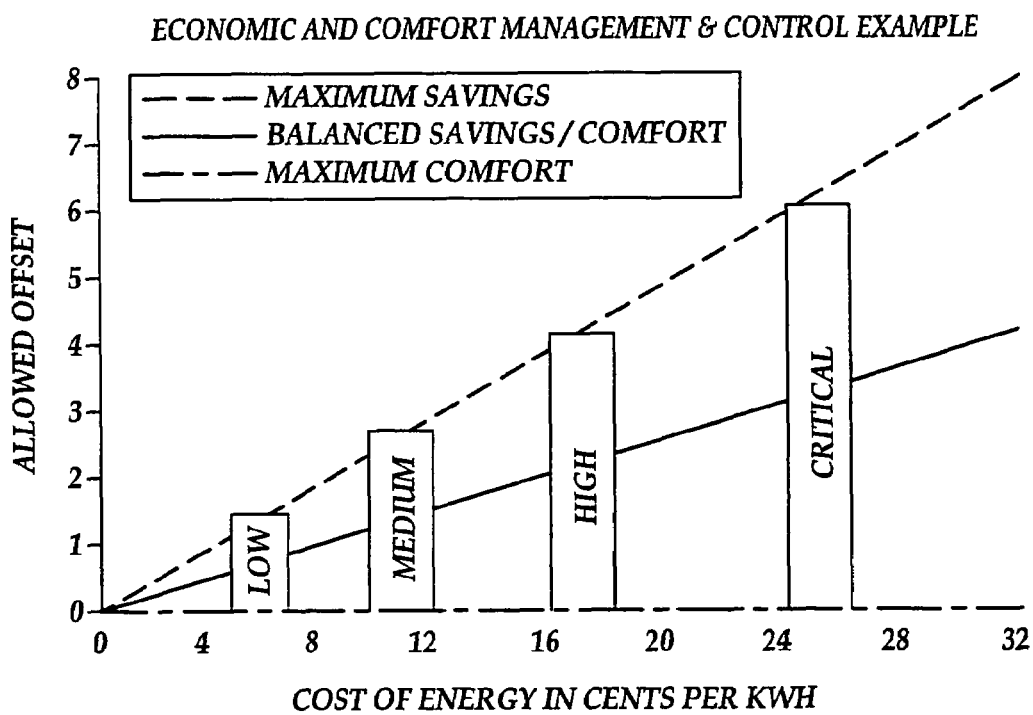
FIGS. 3C-3G are graphs illustrating an exemplary economic and comfort management control strategy, according to an embodiment of the present invention.

With reference to FIGS. 3C-3G, one implementation of the above described system 3.08 will now be explained. The graph of FIG. 3C, depicts how, as energy prices rise, the ability of the system 3.08 to manage the indoor air temperature may be managed. In the graph of FIG. 3C, three scenarios are presented, however the present invention is not limited in the number or type of scenarios that might be offered or exist with any given implementation. In the illustrated embodiment, the three scenarios are maximum savings, balanced savings and comfort, and maximum comfort. For each user selected scenario, the system 3.08 has a predetermined default offset (which defines the deadband). Additionally, the offset may vary as a function of a characteristic of the supplied energy, e.g., availability and/or price. In the illustrated embodiment, different offsets are defined for energy supply classifications of low, medium, high, and critical.

Because some energy suppliers offer what is known as time-of-day pricing in their tariffs, the illustrated price points could be tied directly to the tariff structure for the energy supplier. If real time pricing is offered by the energy supplier serving the site 1.04, this same temperature allowed variance could be utilized to generate savings and reduce supply chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. These 4 tiers are superimposed in the graph of FIG. 3C to illustrate how the tiers would be used by a energy supplier to signal the customer and the system about the relative cost of energy.

This feature is applicable to the systems 3.08 described above when either a fixed set point is used or can further improve the ability of the system that utilizes the programmable set point feature to expand the operating efficiency of the heating and/or cooling systems while reducing the total demand on the energy delivery system. By combining the price data with preconditioning of the site temperature and humidity levels and further applying the occupancy mode of the site, additional savings as described above can be achieved. As a direct result, if deployed in sufficient quantities in a geographic area, price volatility in energy prices can be reduced.

In one aspect, the system 3.08 manages comfort by balancing humidity and temperature based on its learned preference setting using customer inputs or using system defaults. This ability to manage temperatures is enhanced by including a economic management system built into the system 3.08 which will direct the operation of the devices 1.08 system to achieve customer desired economic goals. This example of how the system can manage costs and comfort should not be construed as limiting or constraining the ability of the system 3.08 to deliver additional benefits of comfort or cost management.

Figure 3D:
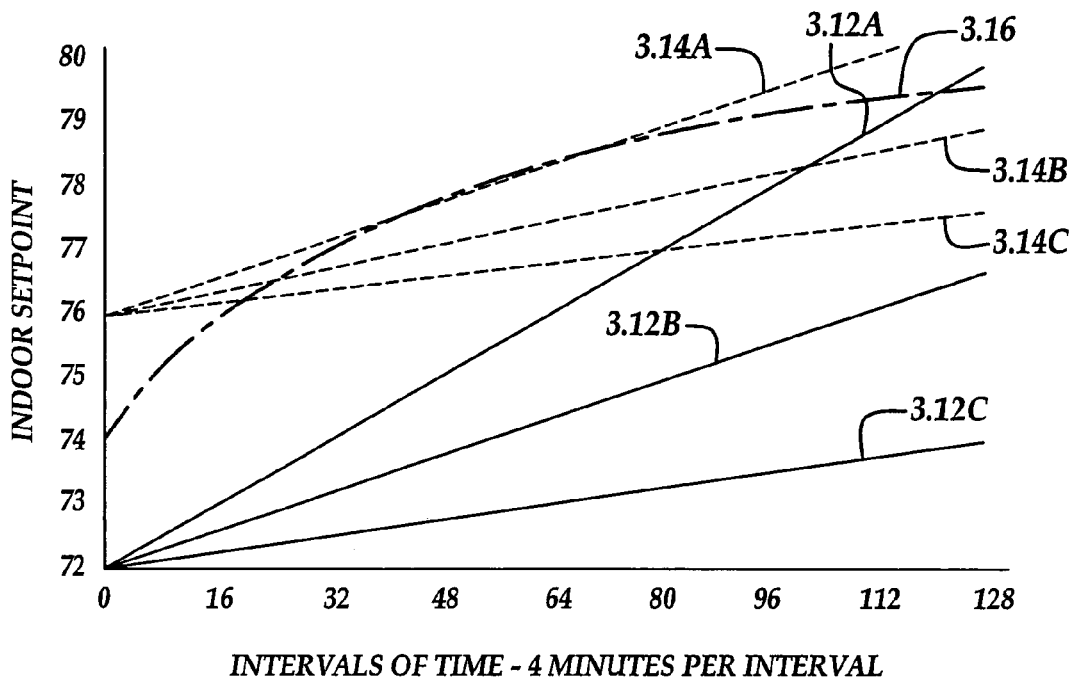

To begin the process the system 3.08 tracks and learns about the thermal gain characteristics of the home 2.18. To do this, the system 3.08 tracks the thermal gain rate of the home 2.18 for each set point selected over time by the customer. With reference to FIG. 3D, a thermal gain table for two set points is illustrated. FIG. 3d shows two set points for the home 2.18 that the thermostat 1.30D has recorded. The first set point for which data is available is 72 degrees F. The three trends illustrated as lines 3.12A, 3.12B, and 3.12C plot the thermal rate of gain in the site 1.04 for different outside temperatures. On the day represented by line 3.12A the outside temperature was 99 degrees F. On the day represented by line 3.12B, the outside temperature was 90 degrees F. On the day represented by line 3.12C, the outside temperature was 77 degrees P. The next set point for which data is illustrated is the set point of 76 degrees F. The three trends shown as lines 3.14A, 3.14B, and 3.14C illustrate the thermal rate of gain in the home 2.18 for the same outside temperatures plotted in the 3.12A, 3.12B, 3.12C data points. This illustration is used to show the impact the set point versus outside temperature differential has over the thermal gain rate in the home 2.18. While these graphs are drawn to illustrate the rate of thermal gain, they do not depict the rapid initial gain when the differential is large and the slower rate of thermal gain, which occurs as the indoor temperature reaches the outside temperature. This rate if thermal gain change is illustrated in FIG. 3D as plot line 3.16 which shows the thermal gain for a set point of 74 degree F. and an outside temperature of 90 degrees F.

Figure 3E:
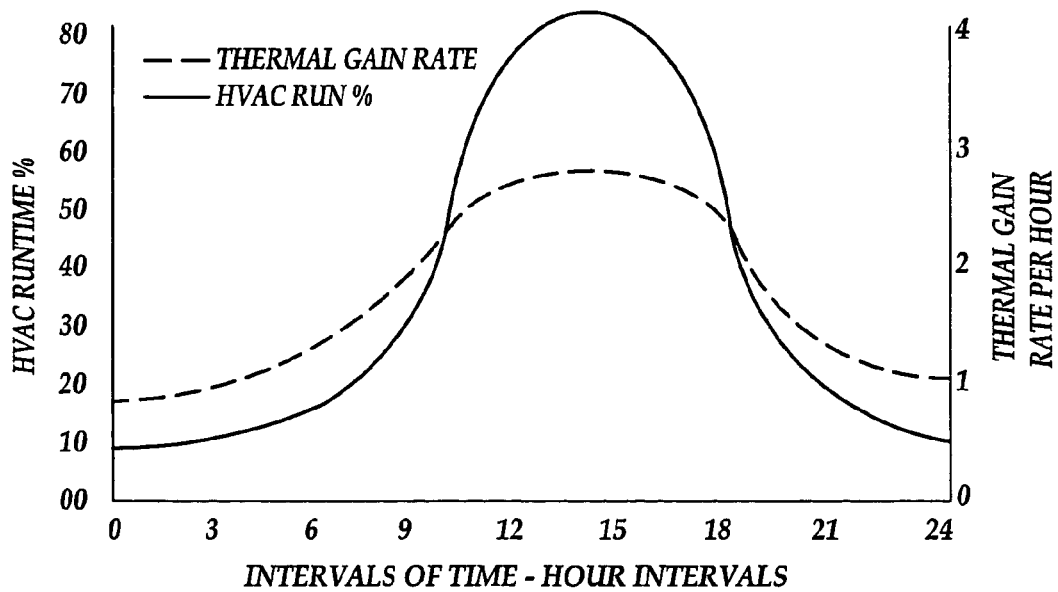

The second step is to learn the operational run characteristics of the HVAC system as a function of the thermal gain. Since the outside temperature varies continuously during a typical day, the rate of thermal gain and the HVAC run times also vary in accordance with these changes. FIG. 3E illustrates a typical day showing plot lines for the thermal gain rate and the associated HVAC run time. It should be noted here that the setpoint of the system 3.08 was set at a fixed point for the entire day and the use of humidity sensing and control of humidity levels were not introduced into the illustration so that the graphical plots depict a normal home with a normal HVAC control thermostat. Here again, the illustration depicts that as the outside temperature rises and the differential between the indoor setpoint and the outside temperature increase, the thermal gain causes the HVAC system to cycle more frequently. At some point, in extremely hot weather or more importantly in periods of high humidity, with the setpoint at a low setting, the thermal gain would exceed the HVAC units' ability to recover the indoor air temperature to the setpoint. When this occurs, the HVAC run time plot would plateau at 100% of operation and the indoor air temperature would rise above the setpoint, until the outside temperature dropped to a level where the thermal gain did not exceed the HVAC units ability to recover the indoor temperature setting or the indoor humidity level dropped to the point where the occupant began to feel cold and adjusted the setpoint higher, permitting the unit to resume a more normal cyclical pattern.

Figure 3F:
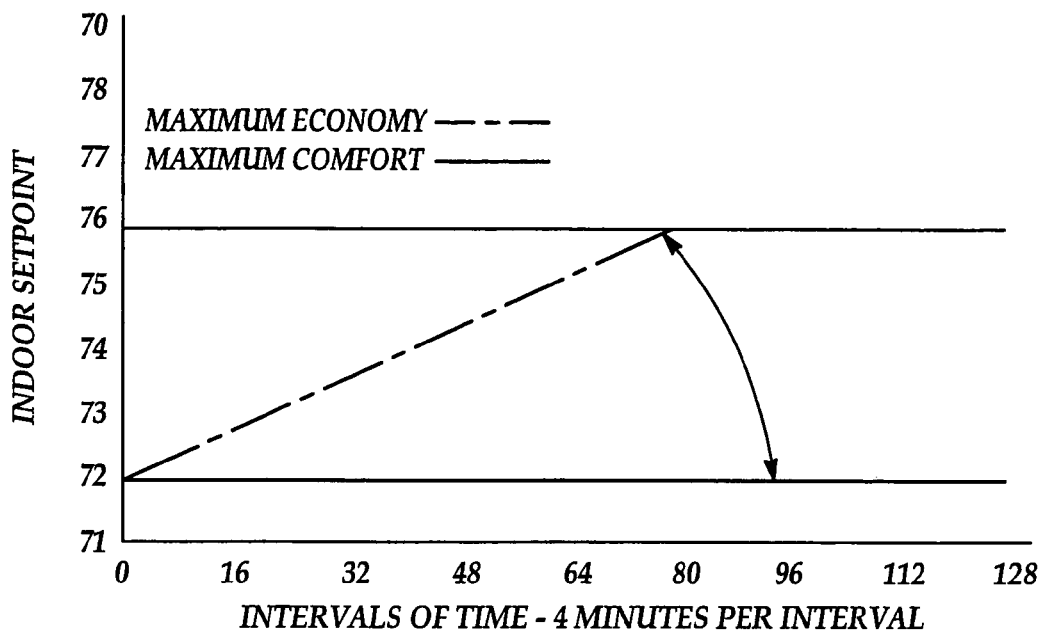

The third step is for the user to pick from a plurality of economic options offered by the system 3.08. These options range from 100% comfort management without any regard for cost to 100% economic management without any regard to comfort. This choice at a high level, for example, would be but is not limited to a selection scheme from 1 to 10 which the user would select from, where 1 is pure comfort management and 10 is pure economic management. While this example would in its simplest from provide a selection of 10 options, the underlying control options used by the system 3.08 could be modified and expanded to provide an infinite number of options. To illustrate how the options in this example would drive the control logic we will now review the control parameters effected and illustrate the resulting controls. The primary control parameter would be tied to the number of degrees from the set point that the customer would make available to the system 3.08 to achieve economic benefits. This parameter would start with the set point established by the CUSTOMER (for this example 72 degrees F.) and at the maximum comfort setting would not move off of this set point (see FIG. 3F). In the maximum savings setting, the set point offset would be 4 degrees F. which would permit the system in this example to vary the temperature in the home form the normal set point of 72 F. by the 4 degree offset making the acceptable temperature range 72 F. to 76 F. within which the system 3.08 would manage the environment. The next parameter that would be used to achieve economic goals would be the ramping rate at which the system 3.08 would permit the temperature to rise within the site 1.04 as it moved from one set point to a higher or lower one to achieve economic benefit. Here again, for the maximum comfort setting, since the allowable offset is zero, the ramping rate has no effect. In this case however, another parameter that regulates the offset from the set point used by the system 3.08 to trigger recovery back to the set point (the dead band of operation) would be an alternative control parameter. In this case, if the normal dead band was 2 degrees F., for the maximum comfort range this might be lowered to 1 degree. In the maximum savings setting where the allowable temperature range has a 4 degree variable, the ramping rate would be capable of being controlled through a combination of varying the dead band range and the thermal gain rate in the site 1.04. For the maximum savings setting, the dead band in this example would be raised to 3 degrees F. and the rate of thermal gain per hour would be set at 3 degrees F. per hour. The results of this example are illustrated in FIG. 3F. The examples here are only used to illustrate how the system 3.08 using the inputs from the customer would vary the operation of individual parameters as described to either maintain an optimum comfort or optimum savings control algorithm and are not meant to limit the number of control parameters that the system 3.08 might use of the way in which these different levels of comfort or savings are achieved. Additional parameters and controls could also be in more elaborate implementations of the system. The following paragraphs disclose these additional control parameters and control modes but should not be construed as limiting the system's capabilities to these examples.

Figure 3G:
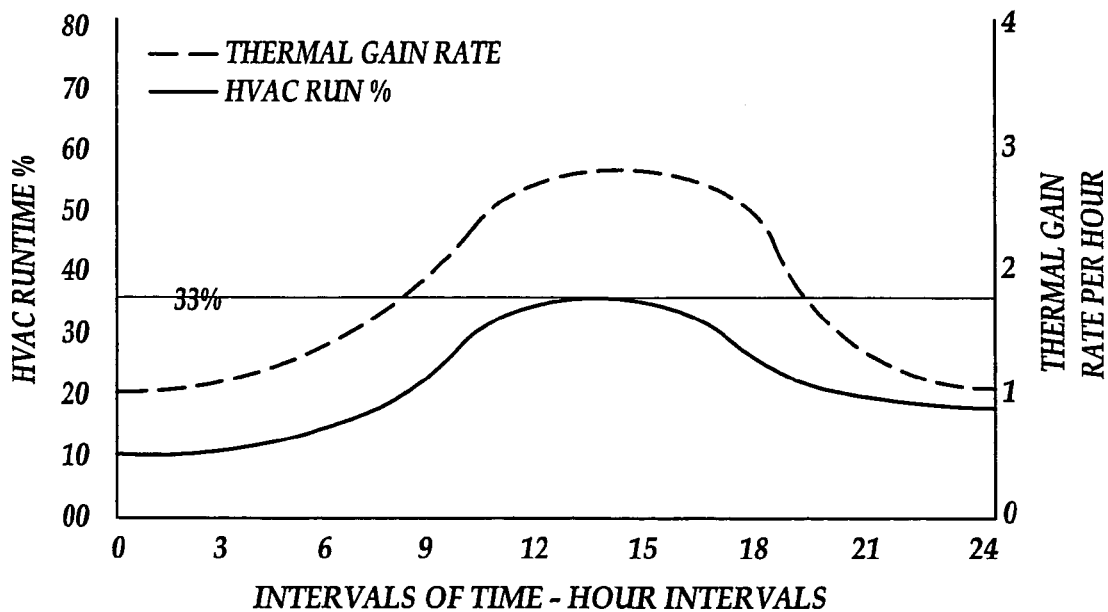

In another aspect of the present invention, the system 3.08 uses the learned thermal gain characteristics of the site 1.04 along with the customer selected allowable temperature variation range to maintain a flat level of demand and consumption. Under this control program, the system 3.08 uses the thermal gain rate of the home 2.18 and its associated HVAC system run time to produce a base line of consumption. Using this base line the system 3.08 can be instructed to manage the demand and consumption rate at either a flat level or at some reduced level by varying the indoor air temperature within the allowable range. The following illustrates how this control program works, but should not be construed to limit the capabilities of the system 3.08 to perform these functions using different control logic or additional sensing devices to improve the process. For this example, the set point of the thermostat is 72 degrees F. and the allowed variation selected by the customer is 4 degrees F. making the acceptable range for indoor temperature from 72 degrees F. to 76 degrees F. Since the time, when the base line is set can be triggered by a plurality of conditions, such as a user or program defined time of day, percentage level of operating run time, energy consumption rate for a give period of time or any other measurable on sensed event, for this example it is assumed that the customer has set the base line trigger to be set when the HVAC units run time reaches 33%. In the early morning when it is cool, the system 3.08 in this example will be operating at a cycle rate of 10%. As the outside temperature rises, the thermal gain on the home 2.18 is monitored along with the HVAC cycle rate on a continuous basis. The rise in the outside temperature causes the HVAC cycle time to increase as illustrated in FIG. 3E. As the system 3.08 reaches the trigger level of 33% cycle run time, the base line is established and the system 3.08 using its computed thermal gain rate and the corresponding HVAC cycle run time projections, computes the required effective set point offset needed to keep the HVAC cycle run time at the specified trigger level of 33%. By adjusting the effective set point upward, the system 3.08 is able to maintain the HVAC run time at the predetermined trigger level up to the point that the thermal gain rise rate exhausts the allowed temperature variant allowed for the site 1.04. At this point, the system will have the option, based on control parameters set in the system by the customer or user or any other controlling entity, to exceed the cycle run time trigger level or exceed the allowed temperature depending on whether comfort or economic requirements are the primary drivers for the site 1.04, the energy supply chain or a combination of both. FIG. 3G illustrates this scenario, assuming that the thermal gain of the site 1.04 does not exhaust the allowed temperature variant for the site 1.04.

It should be noted that the setting of this trigger point and the control of the system 3.08 may be for this example, or for any example, or for the entire system, under the control of a party other than the customer and therefore is not be limited in its scope as a residential or commercial control system. In a large-scale deployment, the system 3.08 can be under the control of an energy supplier and can be used to manage a plurality of environmental control devices attached to the energy supply chain. It should also be noted that the control of the system 3.08 may be shared by a plurality of sources each having a defined level of authority and control over an individual control point or group of points as needed to manage, monitor and balance the demand of the delivery supply chain.

As discussed above, another feature of the system 3.08 is its ability to receive the cost of energy from the energy supply chain. Price signals could take the form of tiers or actual prices. In either case, the customer would be capable of specifying to the system 3.08 their willingness to pay for comfort or their desire to save by inputting into the system 3.08 a plurality of offsets from the set point that the system 3.08 could use to manage the environmental air comfort range. In FIG. 3C several scenarios are illustrated. In the first scenario, the customer can specify using levels of comfort or savings their willingness to provide additional temperature variants based on the cost of energy from the supply chain. Three lines are depicted, one be for maximum comfort, one for balance comfort and savings and the third for maximum savings. In the maximum comfort setting the customer is indicating that they will not give up anything based on the price of energy and therefore will not generate any savings. In the balanced comfort and savings setting, the customer is willing to give up 4 degrees of comfort to achieve savings. In the maximum savings setting the customer is indicating that they will give up 8 degrees of comfort to achieve savings over comfort. These setting are specified as being set by the customer, however they may be controlled by other means such as the energy supplier or other outside management entities. An example of this might be a utility or other energy services company that offers a customer a flat rate per month for energy but under that agreement the customer would relinquish control of their heating and cooling system to the provide.

Under this example the entity managing the system 3.08 would provide pricing commensurate with their ability to control the home and the premise occupant or customer would pay less for their energy as that level of control by the supplier increased. In this example as in all other examples it should be noted that these features of the system 3.08 are not separate and can be used in a plurality of combinations to create control systems capable of delivering benefits to all parties associated with the generation, delivery and consumption of energy. In our example above, where the customer wanted to achieve maximum savings to was willing to give up 8 degrees of comfort to achieve that goal, if the site 1.04 as equipped to manage humidity levels, and the humidity level could be managed so as to reduce it by 20%, the actual temperature variant available to the system 3.08 to achieve the customers goals would increase from 8 degrees to 14 degrees giving the system 3.08 a lot of latitude to manage within.

Another feature of the system 3.08 that improves both comfort and energy efficiency is its ability to determine the optimal fan extended run time that can be applied to forced air HVAC systems to gain additional cooling and heating benefit from residual cooling and heating absorbed into the duct system during the thermal recovery process. Traditionally, heating and cooling systems upon reaching the desired set point shut down the heating or cooling generation unit and enter a state of non-operation. In the case of heating, a sensor in the plenum unit will force the fan to continue to operate, for safety reasons, until the plenum temperature drops to a safe level. At this point the fan and system cease to operate. When in cooling mode, the entire system 3.08, including the fan, typically cease operation as soon as the set point is achieved. In both of these cases, there is residual thermal benefit stored in the ductwork that is lost to the site 1.04. The system 3.08, using sensors, will continue to operate the fan to extract this residual thermal benefit from the duct system and transfer it into the conditioned space of the site 1.04. In the case of heating, the fan will continue to operate until the duct temperature lowers to the point of being equal to that of the sensed temperature of the conditioned space. In the case of cooling, the fan will continue to operate until the duct temperature rises to the point of being equal to or some offset greater than that of the sensed temperature of the conditioned space.

In a more elaborate implementation of the system 3.08, the environmental control system would utilize additional sensors, controls and in some cases ancillary humidity control devices to maximize savings for the customer and reduce the impacts on the environment. This is accomplished by making the system 3.08 overall more energy efficient, thus permitting power generators to reduce the operation of their power generation facilities, resulting in a reduction in air pollution and the consumption of our limited natural resources. Energy efficiency improvements through a combination of balancing thermal gain and sensed humidity can be performed in a plurality of ways. For illustration purposes, several will be discussed here but should not be considered as limiting the ways that improvements in energy consumption rates and comfort can be achieved.

The two primary factors effecting comfort in conditioned air space are temperature and humidity. As stated earlier, humidity plays a large factor in comfort and by controlling humidity levels, temperatures can be raised and traditional HVAC systems will run less thus saving energy. Traditional HVAC systems, by their design, remove humidity in the air as a function of moving air through a cooling coil. This humidity remove creates a more comfortable environment but typically, the removal of the humidity is purely a byproduct of the cooling process and is not controlled. The system 3.08 may offer the ability to modify existing HVAC systems to make them humidity control systems by the addition of humidity sensing communicating nodes. These nodes sense humidity levels in the conditioned space and provide the input to the system 3.08 so that it can manage not only the temperature but the humidity levels in the site 1.04. Sensors alone however cannot perform the humidity control process. In addition, the system 3.08 supports a plurality of communicating control switching, monitoring and metering sensors to complete the process. The following example of humidity control, that can be incorporated into new HVAC systems or as a modification to existing HVAC systems, is designed to illustrate how the system 3.08 can significantly improve on the operating efficiency and the associated cost of operation of HVAC units. Through improved operating efficiency the systems will reduce the total energy they consume, improving the economy, reducing emissions and preserving natural energy resources.

A traditional HVAC forced air system consists of a heating unit, a cooling unit, a fan and air filtration system. Air is drawn from the conditioned space through a return air duct system and is filtered and them passes through the fan chamber where it is then directed through a heating chamber followed by a cooling chamber. In the case of a heat pump, the heating and cooling are performed by the same chamber using a common coil, and may be supplemented by a resistive heating strip chamber in climates where heat pump operation may be marginal during periods of extreme cold weather. Air them is passed into the supply duct system where it is transported back to the conditioned space through a series of ducts and registers. In a cooling scenario, the heating chamber is inoperative and only the cooling process is active. As air passes through the cooling coil, the cooling coil reducing the ambient air temperature by absorbing heat. At the same time, moisture in the air condenses on the cooling coil and flows down the coil as a result of gravitational forces and is collected into a drip pan at the bottom of the chamber from there the moisture is piped to a suitable point of disposal. By default, as mentioned earlier, this process removes humidity from the air. Another important point is that traditional HVAC units have a multi speed fan. This fan is designed to operate a several speeds depending on its design and operates at a low speed setting when the heating process is active and at a high speed when the cooling process is active. It does this because heated air is lighter and moves easily through the duct system requiring less force to move sufficient air into the conditioned space to recover the temperature to the designated set point. Cooled air because it is denser requires greater force to move it through the duct system and therefore requires a higher fan speed to move an equivalent amount of air through the system 3.08. As a result, traditional HVAC systems have multi speed fans built in but are solely used to compensate for the air density. The system 3.08 takes advantage of this capability to utilize the lower speed fan settings to reduce the humidity levels in the home. It accomplishes this task by using a two-way communicating control node capable of modifying the fan speed settings to operate it in its normal high setting when recovery of the ambient air temperature is required and in the low speed setting to reduce the humidity levels in the home. To dehumidify the home 2.18, the system 3.08 would operate the air conditioning compressor to cause the cooling coil to drop in temperature and would operate the fan at a low speed causing more humidity to be removed from the air as it passes through the cooling coil at a slower rate allowing more moisture to be removed. The cooled air would follow its normal path through the supply duct system and would pass the dryer and colder air into the conditioned space. Through a learning process, the system 3.08 would be able to determine and record in its memory, the rate of dehumidification its associated HVAC unit is capable of delivering. HVAC units equipped with multi speed compressors would operate more efficiently in this scenario than standard single speed compressor units. For dehumidification in a home with a multi speed compressor, the low speed compressor setting would be used to reduce the amount of energy the system 3.08 uses. To complete the dehumidification control process, one of two additional two way communicating sensors or a combination of both would be needed. Because the cooling coil as it removes humidity from the air might become over loaded with condensation and begin to freeze up, sensors to detect either airflow or the presence of icing of the compressor coil would be needed. The system 3.08 is capable of utilizing inputs from these sensors to either increase the fan speed to cause the coil to defrost or cycle the compressor while operating the fan in either a low or high speed to force warm air through it thus defrosting the coil. In heating season, as the outside temperature drops so do the humidity levels, resulting in low relative humidity levels. Just as humidity removal in summer makes the air feel colder, removal of humidity in winter has the same effect. The major difference is that in winter, the resulting cold feeling creates an indoor air comfort level that is undesirable and customers raise the temperature as the humidity levels drop to maintain a more comfortable environment. This condition dries out wood doors and floors as well as human sinuses resulting in shrinking of wood products and bloody noses. By increasing the humidity levels in the site 1.04, the temperature can be maintained at a lower level while retaining the same relative level of comfort. In addition, by increase the humidity level, wood products will not tend to shrink as much and sinus conditions will not plague the customer. To accomplish humidity control during the heating season, the addition of a humidifier in the supply air duct system 3.08, boosts the humidity levels of the conditioned air space allowing a lower temperature setting to be maintained thus reducing the amount of energy required to maintain a satisfactory comfort level. The system 3.08 is capable of managing the humidity levels using the humidity-sensing node described earlier in the cooling section but does not require the additional freeze and defrost sensors. Unfortunately, traditional humidification systems are designed to only work when the heating process is active. This is because they depend on the heated air exiting the heating chamber to pass through a series of mesh grids or membrane that is soaked with water. As the heater air passes through these grids or membranes, they pickup moisture through the process of evaporation and transport it through the supply duct system into the conditioned air space. To improve on this process, the system 3.08 incorporates a modified duct humidification process which heats this grid or membrane to permit unheated air passing through it to transport moisture into the conditioned space, not requiring the main heating process to be active to accomplish its task. In addition, the system 3.08 is capable of controlling remote, distributed humidification units throughout the site 1.04, like the units available for sale today in a number of retail stores, which are specially equipped with a two way communications node controller integrated into them. A less elaborate adaptation of this fully integrated solution that the system 3.08 supports, is a wall plug adapter with an integrated two way communicating control node, relay contactor and optional humidity sensor. This unit can be used to adapt traditional humidification units or vaporizers and make them an integral part of the humidity control system. An additional sensor device is used to measure moisture content on surfaces, which are exposed directly to the outside like glass windows. As the humidity level rises in the site 1.04, excess moisture may gather on these cold surfaces resulting in condensation accumulation. To manage this condition, optional communicating sensors to detect moisture accumulation are included with the system 3.08.

Another method of controlling humidity levels in the site 1.04 during the cooling season which the system 3.08 supports is the modification of the cooling chamber coil to incorporate heat pipe technology to increase the units dehumidification capabilities on average by 2 times. Communicating sensors as described above would still be needed if low speed fan operation was used, however with heat pipe cooling coil retrofit devices, often times humidity levels can be maintained without the need to perform additional dehumidification. The amount of humidity reduction and the ability of the system 3.08 to perform the process efficiently all must be balanced to achieve savings and comfort. Cooling coil heat pipe retrofit devices are available from numerous companies throughout the world like Heat Pipe Technology Inc. of Gainesville, Fla. Companies like Heat Pipe Technology also make stand alone retrofit dehumidification units that can tied directly into the existing residential HVAC system, permitting the dehumidification process to use the existing duct work in the home to distributed dehumidified air without the need to operate the existing air conditioning compressor. This process is much more energy efficient as the compressor used in the retrofit add-on dehumidification unit uses considerably less energy than the whole house compressor but does require a capital investment on the from front end which might make it less appealing to some customers. The system 3.08 also supports other forms of dehumidification like desiccant systems and other forms of humidity absorption technology.

Dehumidification control in more elaborate implementations of the system 3.08 can be used to precondition the site 1.04 in anticipation of events that would call for or require demand reductions on the energy supply chain. An example would be a simply energy supplier program where time of day rates are used to encourage the reduction of system demand during peak periods. In anticipation of such events, the system 3.08 is capable of preconditioning the home to reduce the humidity levels in summer or increase them in winter thus permitting comfort levels to be maintained while raising the ambient air temperature to reduce demand and total consumption. This preconditioning process while described here and supported by the system 3.08 as a "on demand" or "on request" type of program, could be used as the system default, resulting in a permanent reduction of demand on the system 3.08 and a total reduction in energy usage. The capital investment to manage humidity levels in the site 1.04, represent about 20% of the annual energy bill but can be easily recovered by managing humidity, which in topical climate conditions would result in an annual energy usage decrease of up to 14%. On the reverse side of this scenario, is the heating load reduction, which would impact a number of different energy supply chains and natural resources. Here again, the equipment to humidify the site 1.04 to increase humidity levels during heating seasons would be capable of being recovered within 18 to 24 months assuming that they were managed by the system 3.08 to achieve lower heating set points as a function of relative humidity levels.

Additional two-way communicating sensors will also improve the operational capabilities of the system 3.08 by providing additional input data. Occupancy sensors as an example would provide the system 3.08 with knowledge of if there were people present in the site 1.04. The system 3.08 is capable of receiving authorization from any authorized entity to perform items like ramping, set point modifications or dehumidification differently depending on the presence or absence of the occupant. If unoccupied, the system 3.08 can be directed to take more savings related actions and defer comfort control options. This ability increases its ability to deliver savings and reduce demand on the supply chain without affecting the occupants' level of comfort.

Additional two-way communicating sensors are supported by the system 3.08 to support indoor air quality as well. Examples of such sensors are $CO_2$, NOX, Radon, Gas, Formaldehyde and CO detectors. These sensors would supply input to the system 3.08 and if so equipped, would trigger the operation of air exchange systems to lower levels of such gases in the site 1.04 or trigger and alarm condition. Other communicating sensors to detect smoke or fire are also supported and permit the system 3.08 to perform emergency shut down of the air handler and other equipment should such a condition be detected. With such safety and security features, the system 3.08, as a direct result of its communications capabilities, has the ability to interface with and report alarm conditions to a plurality of end points. Examples of such points include but are not limited to cell phones, pagers, monitoring centers, local and remote alarm horns, bells and lights as well as digital display devices like PC's, in premise kiosks, TV screens and personal radios with digital display screen capabilities like XM Radio and Sirius Radio. The system 3.08 also supports traditional air filtration filter monitoring as well as more sophisticated electro static filtration systems and UVG bacteria and virus air cleansing systems. In all cases the system 3.08 uses its two-way communicating senor node technology to control and monitor the performance of these units.

In one aspect of the invention data various data elements are stored within the system 1.02. In one embodiment, the data may be stored in gateway node 1.10D. However, each node 1.10 in the system 1.02 includes a node processor 2.02 and memory 2.04. Therefore, any node 1.10 in the system may assume the processing and/or the control of one or more devices and/or the storage of system data 1.02 in the event the gateway node 1.10D becomes disabled. In one embodiment, the following data may be maintained or stored by the system 1.02.

1. The current supplier of energy units, the current price per energy unit including delivery.

2. The current operating cost per hour based on the rate and cost of energy units being used.

3. The total energy units used and their cost for today, this week, and this billing period and the past 14 billing periods by supplier and energy type if multiple types are available.

4. The total energy units used by type and their associated cost for the day, week and billing period for the past 14 billing periods.

5. The balance of available credit per energy unit supplier and an estimate of the available hours and days of energy unit purchases that represents if a debit system 3.08 for prepaid energy is being used.

6. A computed average cost per energy unit by supplier and a percentage of the total energy unit requirement being purchased from that supplier including delivery costs.

7. A breakdown of energy units consumed and their cost and supplier by individual appliances if multiple appliance control and metering is activated.

8. A projected total billing period cost for each energy type and source.

9. An aggregated total by type and source of energy unit.

10. A history of temperature set points for the day.

11. An average of temperature set points for the week and billing period

12. Historical totals of energy units usage and cost for this month, last 14 months and year to date.

13. The current temperature set point both user set and fixed.

14. The current dead-band high and low degree spread both user set and fixed.

15. The average temperature maintained for the day, week and billing period.

16. The average thermal degree gain or loss per unit of time for the site 1.04 for a rolling 30, 60 and 90 day period by hour of the day.

17. The average thermal recovery time per degree when heating and cooling systems are operational for a rolling 30, 60, and 90 day period by hour of the day.

18. The projected annual cost of operation for each of the appliances being monitored.

19. The operational efficiency factor of each appliance being monitored based on historical consumption patterns and current operating statistics.

20. The current and historical settings for minimum and maximum dead-band temperature and cost settings.

21. Warning indicators of operational irregularities in monitored appliance consumption patterns.

22. Warning indicators for low balances in debit accounts if prepaid energy unit accounts are present.

23. Average daily cost of operation of whole site 1.04 and individual appliances on a 30, 60 and 90 day rolling average and same period last year.

24. Data, text and billing messages from energy unit suppliers and information sources.

25. Weather information and history data including at a minimum outside temperature lows and highs, humidity, chance of precipitation wind speed and direction, solar exposure time and angle and UV indexes by day, by week, by billing period.

26. Total heating and cooling degree days and other statistical data needed to normalize consumption and usage data.

27. Computed thermal recovery time for heating and cooling adjusted to compensate for the external temperature, wind speed, direction, UV index, humidity and cooling or heating degree day factors. This computed factor is used to more accurately compute the recovery time for thermal gain or loss when combined with the average normalized thermal gain or loss for the site 1.04. This factor may also be computed centrally and transmitted, frequently enough to permit adequate factoring of recovery times to maximize efficiency and reduce operating costs. Transmitting centrally computer factors will eliminate the need for external sensors at each location thus lowering the cost of installation and ongoing maintenance.

28. A Table of available energy suppliers and user defined preference indicators by supplier and type of energy units provided to be used in choosing the supplier of choice if price points and terms of sale are equal during a given time period.

29. A table used to compute supplier parity when option 28 above is not entered which contains at a minimum, the available suppliers, the type of energy units available and the number and cost of energy units purchase this billing period.

30. An optional user supplied preferred energy unit type indicator.

31. User selected temperature ramping option indicator with default 1 degree per hour ramping and optional user defined ramping time frames and degree settings.

32. Low and high temperature alarm settings to protect against heating and cooling system failures. This alarm trigger point is user defined, and if not entered, defaults to + or −5 degrees above and below the maximum dead-band comfort range entered by the user. This feature is defeated if the system 3.08 is placed in the off position, but will be overridden if the user elects to activate the temperature alarm mode capability of the system 3.08.

33. Alarm activation indicator which is user selected to permit the automatic alarming and notification of a monitoring service if one is available and subscribed to by the occupant, owner or system provider. Alarm points and settings are user defined or can be allowed to default to system 3.08 defined default points based on the users, owners or operators preference.

34. Communications channel interface parameters and data including types and routing information necessary to perform communications activities on the attached network or networks available. These parameters include all information required to perform password verification and encryption as needed or deemed necessary by the owner, operator or communications system provider. These parameters also include the necessary routing and identification data for alarm trigger reporting points and services used by or subscribed for or available to the site 1.04.

35. Consumption rates and consumption signature and weather related normalization factors for major appliances in the site 1.04 under the control of the system 3.08 for which a direct form of metering consumption is not available. Estimated consumption rates for major appliances in the site 1.04 under the control of the system 3.08 for which a direct form of metering consumption is not available.

36. Centralized load aggregation and computational service providers interface information.

37. Computed normalization factor for the site 1.04 based on historical consumption and external factors.

38. Energy efficiency factors derived from modeling the site 1.04 using a model such as the DOE-2.1 modeling system for comparison of operational efficiency.

39. Minimum requirements dead-band range definitions to be used when the site 1.04 if vacant or unoccupied.

40. Set point pattern change tracking tables to reflect specific day, time and day type setting changes to be used with "follow my lead" artificial intelligence learning and execution routines.

41. Set point pattern change tracking tables to reflect specific outside weather conditions in relationship to set point changes initiated by the occupant for use with the "follow my lead" artificial intelligence learning and execution routines.

4. Customer Control Node Management System and Methods

Figure 4A:
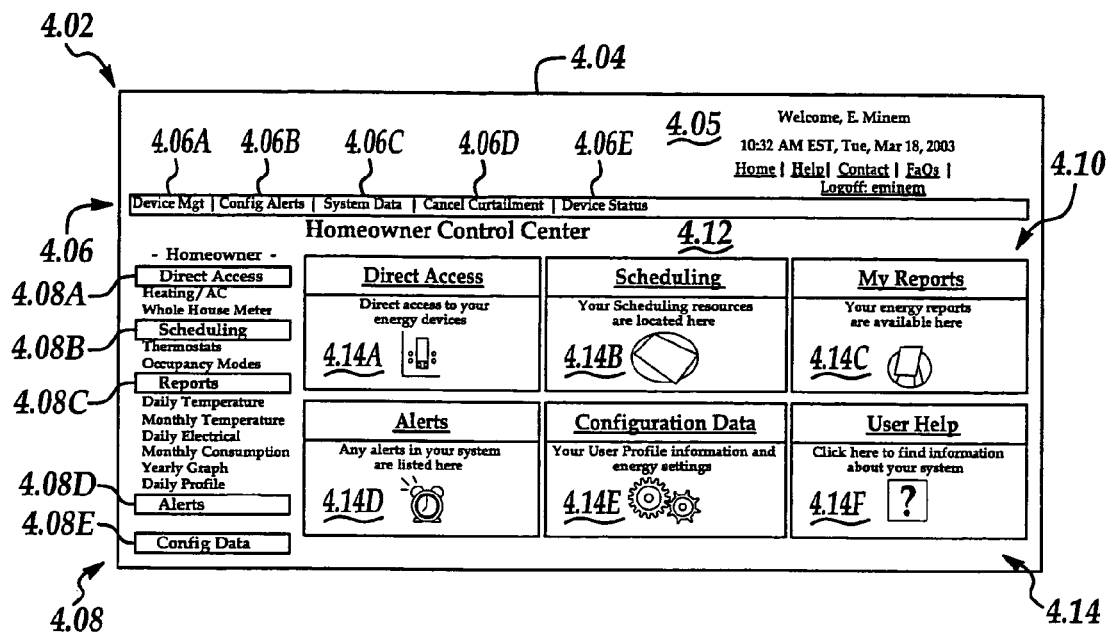
FIG. 4A is a graphical illustration of a customer GUI, according to an embodiment of the present invention.

With references to FIGS. 4A through 4R, the user interface 1.14 may be implemented as a web page or graphical user interface ("GUI") 4.02. The GUI 4.02 may be accessible from remote locations, as discussed above. In one embodiment, the customer may access the GUI 4.02 through a web browser or other display device like a television. In another embodiment, the customer may access the GUI 4.02 through a remote device, such as a mobile phone and/or personal digital assistant. By entering a user I.D. and password, the customer may access his or her account.

With reference to FIG. 4A, after the customer logs on to the system 3.08, a system home page 4.04 may be displayed. The system home page 4.04, includes an information section 4.05, a plurality of navigation buttons 4.06, a navigation menu 4.08, and a control panel 4.10.

In the illustrated embodiment, the information section 4.05 for an exemplary customer, Earl Minem is shown. The information section 4.05 includes a greeting, the time and date, as well as several links. Actuation of the links may, for example, redirect the customer to the home page, the help screen, an e-mail contact section, frequently asked questions, or may log the customer off of the web site.

The plurality of navigation buttons 4.06 includes a device management button 4.06A, a configure alerts button 4.06B, a systems data button 4.06C, a cancel curtailment button 4.06D and a device status button 4.06E. The navigation menu 4.08 includes links to several areas of the GUI 4.02 as described below.

When initialized, the GUI 4.02 displays a homeowner control center 4.12 in the control panel. In the illustrated embodiment, the homeowner control center 4.12 includes a plurality of hyperlinked icons 4.14. In the illustrated embodiment, the hyperlinked icons 4.14 include a direct access icon 4.14A, a scheduling icon 4.14B, a my reports icon 4.14C, an alerts icon 4.14D, a configuration data icon 4.14E and a user help icon 4.14F. Selection of a home link within the information section 4.05 will return the GUI 4.02 to the homeowner control center 4.12.

Figure 4B:
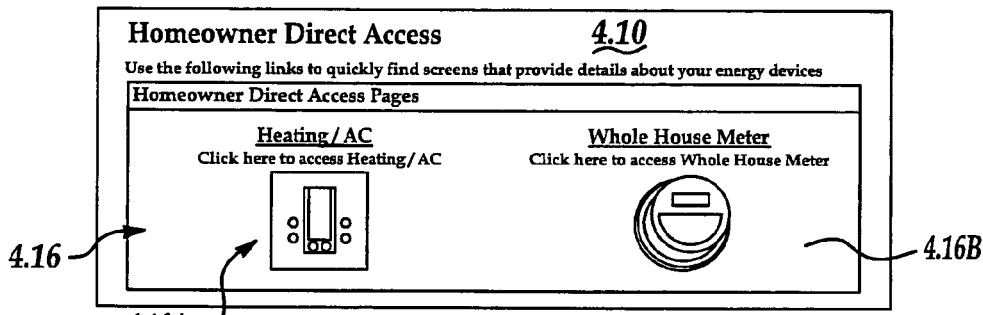
FIG. 4B is a graphical illustration of a control panel of the GUI of FIG. 4A.
Figure 4C:
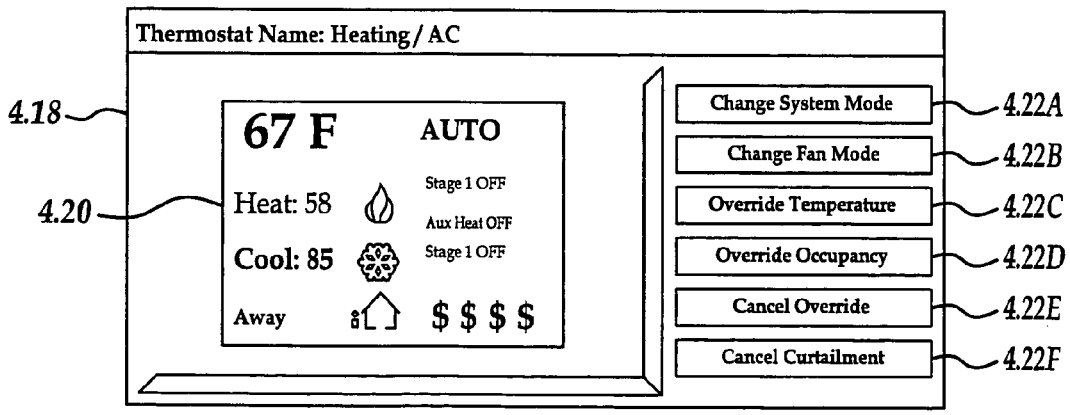
FIG. 4C is a graphical illustration of a virtual thermostat of the GUI of FIG. 4A.

With reference to FIG. 4B, when the customer selects the direct access icon 4.14Aa, a plurality of direct access icons 4.16 will be displayed in the control panel 4.10. In the illustrated embodiment, the customer has direct access of the HVAC system and the whole house meter. Correspondingly, a heating/AC icon 4.16a and a whole house meter 4.16B are displayed within the control panel 4.10. In another embodiment, all devices 1.08 to which the customer may have access are accessible here, e.g., a second thermostat or the water heater. With reference to FIG. 4C, selection of the heating/AC icon 4.16A, displays a virtual thermostat 4.18 within the control panel 4.10. The virtual thermostat 4.18 contains an information section or display 4.20 and a plurality of thermostat buttons 4.22. The display section 4.20 includes information related to the actual or real time conditions at the site 1.04. In the illustrated embodiment as shown, the current temperature within the customer site 1.04 is 67° Fahrenheit. The heating and cooling set points are set to 58° and 85°, respectively. The system 3.08 is in an automatic mode and the heating and cooling systems are in an off condition. Furthermore, as indicated, the occupancy mode is set to "Away". As discussed below, the system 3.08 allows the customer to program the HVAC systems use the virtual thermostat 4.18 and according to occupancy modes using heating and cooling set points. By using the thermostat buttons 4.22, the customer can change the current operating parameters of the thermostat. For example, selection of a change system mode thermostat button 4.22A allows the customer to select between automatic and a manual modes. Selection of a change fan mode button 4.22B allows the customer to change the fan mode from "on" to "automatic". Furthermore, selection of an override temperature button 4.22C or an override occupancy button 4.22D allow the customer to override the current temperature and occupancy schedules as defined below. Selection of a cancel override button 4.22E allows the customer to cancel a temperature or occupancy change which was input using the override temperature button 4.22C or the override occupancy button 4.22D. A cancel curtailment button 4.22F allows a customer to cancel any curtailment program (where permissible).

Returning to FIG. 4B, selection of the whole house meter icon 4.16B displays information within the control panel 4.10 related to the current power being delivered or utilized by the customer site 1.04. Additionally, information related to the accumulated power draw over a predetermined period of time may also be displayed. This information may be displayed graphically and/or numerically.

Returning to FIG. 4A, selection of some of the menu items within the navigation menu 4.08 are redundant with the icons 4.14 in the homeowner control center 4.12. For example, selection of a direct access button 4.08A displays the direct access icons 4.16 within the control panel 4.10.

Selection of the scheduling icon 4.14B or a scheduling menu item 4.08B, displays icons for each thermostat within the customer site 1.04 or an occupancy mode icon (not shown). With reference to FIGS. 4D, 4E, and 4F, selection of the thermostat scheduling icon or the thermostat menu item underneath the scheduling menu item 4.08B, displays an occupancy mode screen 4.24 within the control panel 4.10. In one embodiment, the system 3.08 allows the customer to define one or more occupancy modes (see above). Within each occupancy mode, the customer may set one or more parameters which control one or more devices 1.08, such as the HVAC system(s) while the occupancy mode is active.

For example, in one embodiment, the customer may set a cooling set point, a heating set point, and may also set an economy profile.

In the illustrated embodiment, the customer has eight occupancy modes. For example, the system 3.08 may include a home occupancy mode, an away occupancy mode, a sleep occupancy mode, and a vacant occupancy mode, as well as four user-defined occupancy modes. Each of these modes is indicated with a respective tab 2.26 along the top of the occupancy mode screen 4.24. As shown in FIG. 4D, selection of a tab 2.26 allows the customer to set the parameters for each mode.

For example, in the illustrated embodiment under the home occupancy mode, the cooling set point is set to 80° Fahrenheit, the heating set point is set to 68° Fahrenheit, and the economy profile is set to economical comfort. The economy profile may be used to control the HVAC system and/or other devices 1.08 based on characteristics of the supply chain, e.g., cost or availability of power. In one embodiment, each profile has an associated setpoint offset, e.g., +/−5 degrees. The parameters for each mode may be set to a set of default parameters by selection of a default button. Any changes made within the occupancy mode screen may be applied to the respective mode through selection of an apply button 4.30. In a further example, with reference to FIG. 4E in the away mode, the cooling set point is set to 85°, and the heating set point is set to 58° Fahrenheit.

In the illustrated embodiment, the economy profile is set through an economy profile drop down list 4.32. With reference to FIG. 4F, in the illustrated embodiment, the economy profile may be set to one of three profiles: maximum comfort, balance comfort, and economical comfort.

With reference to FIG. 4G, selection of the thermostat scheduling icon or the thermostat menu item under the scheduling menu 4.08B, displays a thermostat scheduling calendar 4.34 within the control panel 4.10. In the illustrated embodiment, the thermostat scheduling calendar 4.34 displays the month corresponding to the current date. However, the thermostat scheduling calendar 4.34 may be navigated using a navigation bar 4.36. Each day on the calendar 4.34 may be defined as a type of day, for example, any day may be defined as a weekday, a weekend, or a holiday. In the illustrated embodiment, all Saturdays and Sundays have been defined as weekends, and all Mondays, Tuesdays, Wednesdays, Thursdays and Fridays have been defined as weekdays. However, it should be noted that any day may be defined as any type of day. Each day within the calendar 4.34 is a hyperlink. Selection of the hyperlink for any particular day on the calendar 4.34 displays a thermostat scheduling panel 4.36 as shown in FIG. 4H. The thermostat scheduling panel 4.36 includes a thermostat dropdown list 4.38 and a select date drop down list 4.40. The thermostat drop down list 4.38 allows the customer to select between one or more thermostats which may be present within the customer site 1.04. The select day type drop down list 4.40 allows the customer to select between various pre-defined day types as well as to define a new day type.

The thermostat scheduling panel 4.36 permits the customer to select the occupancy mode which will be used for various time periods during the day.

For example, in the illustrated embodiment, at midnight of the selected day, the thermostat will be in the sleep occupancy mode. Beginning at 4:30 a.m., the thermostat will be in the user 1 occupancy mode and so forth as shown. The thermostat scheduling panel 4.36 also includes an apply button 4.42, an apply to current day button 4.42, an apply to all button 4.44, and a back to calendar button 4.46. Selection of the apply to current day button 4.42 will apply the start times and defined occupancy modes in the thermostat scheduling panel 4.36 to the selected day in the thermostat scheduling calendar 4.34. Selection of the apply to all button 4.44 will apply the scheduled start times and occupancy modes defined in the thermostat scheduling panel 4.36 to all of the day types which are selected in the select day type drop down list 4.40. As shown in FIG. 4I, the select day type drop down list 4.40 may include a number of pre-defined day types such as weekday, weekend, or holiday as well as the number of user-defined day types.

With reference to FIGS. 4A and 4J, selection of the alerts menu item 4.08D displays a configure alert screen 4.48 within the control panel 4.10. The system 3.08 includes a number of pre-defined alerts, for example, thermostat temperature out of range control, gateway node not responding, budget limit alarm, device malfunctioning, communication failure, ramping recovery failure, or duplicate IP address. For each alert, the customer may select or designate the destination, i.e., who gets notified for each alert, and how they are notified. In the illustrated embodiment, the configure alert screen 4.48 includes a destination drop down list 4.50 for each alert. The destination drop down list 4.50 allows the customer to select who gets notified when the alert occurs. For example, in the illustrated embodiment, the drop down list may include the home occupant, the service provider or the energy provider. The configure alert screen 4.48 also includes one or more check boxes 4.52 to indicate how the communication of the alert is to occur, for example, whether or not it is to occur by e-mail or through the customer or utility interfaces 1.14, 1.16. The configure alert screen 4.48 may also include a check box 4.54 for each alert to indicate whether or not the alert is configurable. The configure alert screen 4.48 may also include an entry box 4.56 for each alert which allows the customer to indicate what priority the alert should have. However in the another embodiment, the priority may be used to, e.g., provide a different delivery system based on the priority. In the illustrated embodiment, this is primarily for information purposes. Furthermore, the configure alert screen 4.48 may also include an alert type drop down list 4.58 which allows the customer to indicate whether or not a single alert should be sent or whether an alert should be sent each time an alert condition occurs. For example, if over a pre-determined amount of time, for example an hour, a thermostat temperature is out of range, the system 3.08 may be set to deliver a single alert or to send an alert each time the temperature is out of bounds.

The configure alert screen 4.48 also includes a submit button 4.60 and a reset button 4.62 for updating the system 3.08 with any input changes or resetting the alerts to default values.

The configure alert screen 4.48 may also include a personal data update link 4.64. Activation of the personal data update link 4.64 will display a personal data screen (not shown) within the control panel 4.10 which allows the customer to update its personal information such as address, telephone and e-mail information as well as user name and passwords. The personal data screen may also allow the customer to enter or update a budget threshold, e.g., a monthly budget threshold. As discussed above, the system 3.08 may be set to send an alert when the monthly budget threshold has been reached and/or is likely to be reached based on current usage.

Figure 4L:
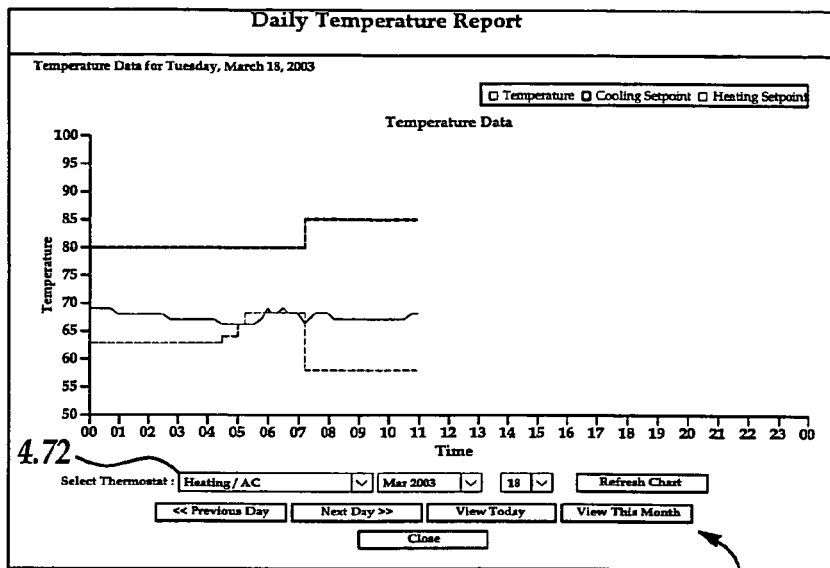
FIG. 4L is a graphical illustration of a daily temperature report pop up screen of the GUI of FIG. 4A.
Figure 4M:
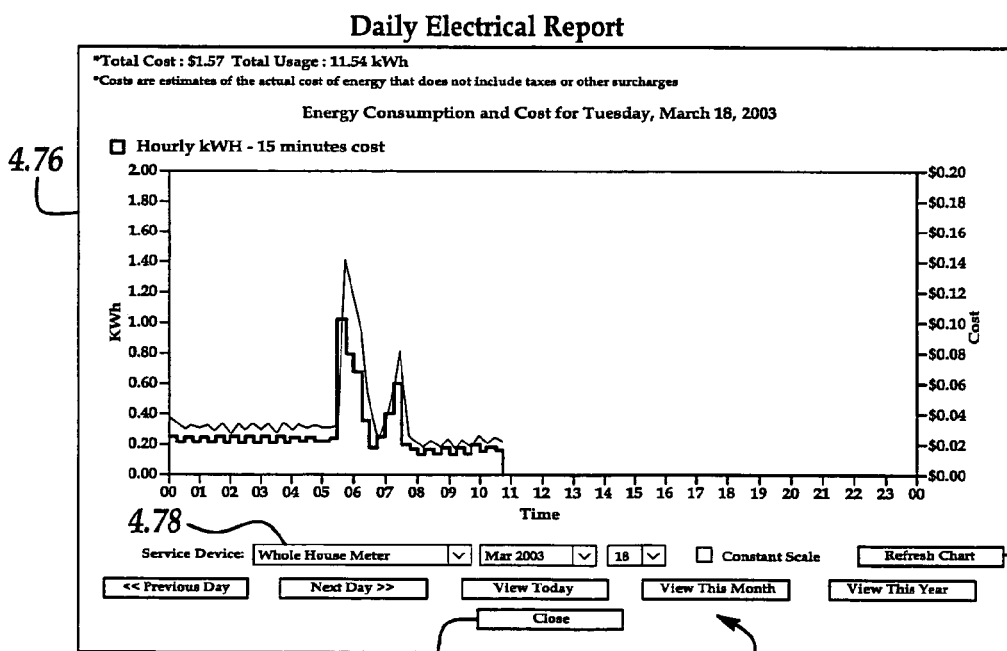
FIG. 4M is a graphical illustration of a daily electrical report pop up screen of the GUI of FIG. 4A.

With reference to FIGS. 4A and 4K through 4M, selection of the my reports icon 4.14C or the reports menu item 4.08C, will display a report screen 4.66 in the control panel 4.10. The report screen 4.66 includes a plurality of reports icons 4.68. Selection of a reports icon 4.68 will display a pop-up screen within the control panel 4.10. For example, selection of a daily temperature icon 4.68A will display a daily temperature report pop-up screen 4.70 as shown in FIG. 4L. Likewise, selection of a monthly temperature icon 4.68B will display a monthly temperature report pop-up screen (not shown). The daily temperature report pop-up screen 4.70 may allow the customer to select between multiple thermostats using a thermostat drop down list 4.72. The daily temperature report pop-up screen 4.70 may also include a plurality of drop down lists and/or buttons 4.74 which allow the customer to change the date or dates of the information being displayed in the report screen 4.70. For example, the customer may designate a specific date or navigate through the calendar by days or months.

The report screen 4.66 may also include a daily electrical usage icon 4.68C. With refence to FIG. 4M, selection of the daily electrical usage icon 4.68C will display a daily electrical report pop up screen 4.72. As with the temperature report pop up screen 4.70, the daily electrical report pop up screen 4.76 includes a service device drop down list 4.78, which allows the customer to select the device 1.08 for which data is being displayed. The daily electrical report pop up screen 4.76 also includes a plurality of navigation buttons 4.80 which allow the customer to navigate through the calendar as well as to display electrical usage information on a monthly or a yearly basis. A refresh button 4.82 updates the electrical report pop up screen 4.76 based on any changes made within the service device drop down list 4.78 or the navigation buttons 4.80. Selection of a close button 4.84 closes the daily electrical report pop up report 4.76.

Figures 4N, 4O, 4P, 4Q:
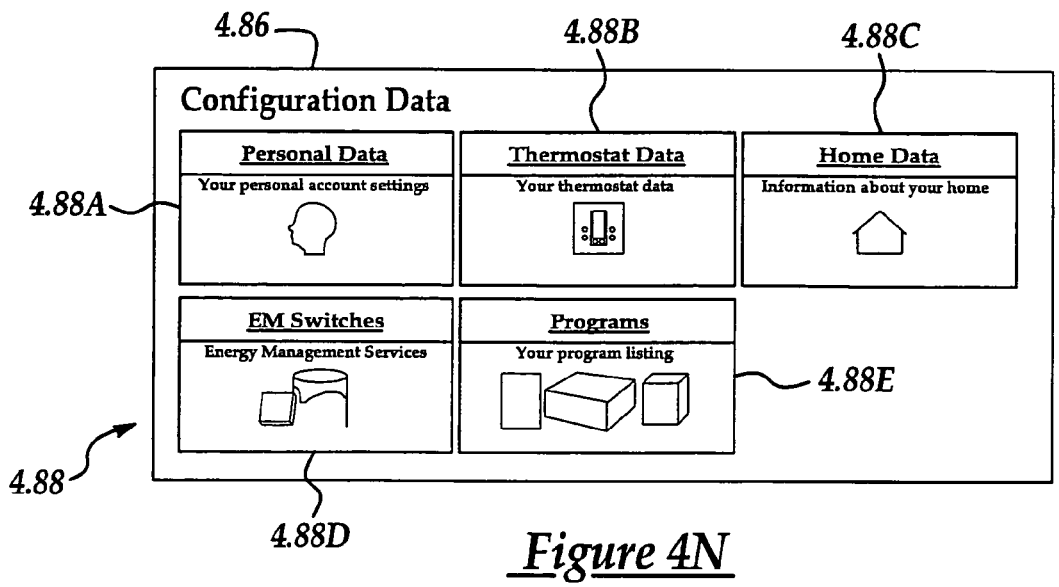
FIG. 4N is a graphical illustration of a configuration data screen of the GUI of FIG. 4A.
FIG. 4O is a graphical illustration of a thermostat data screen of the GUI of FIG. 4A.
FIG. 4P is a graphical illustration of a heating drop down list of the GUI of FIG. 4A.
FIG. 4Q is a graphical illustration of a cooling drop down list of the GUI of FIG. 4A.

With reference to FIG. 4N, selection of a config data menu item 4.08E displays a configuration data screen 4.86 within the control panel 4.10. The configuration data screen 4.86 includes a number of configuration data icons 4.88. Selection of a personal data icon 4.88A displays a personal data screen described above. Selection of a thermostat data icon 4.88C displays a list of the thermostats within the customer site 1.04. Each thermostat may be selected and a thermostat data screen 4.90 will be displayed within the control panel 4.10, as shown in FIG. 40. The thermostat data screen includes a first section for defining the heating section of the corresponding HVAC system and a cooling section for defining the corresponding cooling section of the HVAC system. The heating section includes a heating drop down list 4.92 which allows the customer to select the type of heating which corresponds to the current thermostat as shown in FIG. 4P. A cooling drop down list 4.94 allows the customer to set the type of cooling corresponding to the current thermostat as shown in FIG. 4Q. As shown in FIG. 4P, the thermostat data screen 4.90 allows the customer to set a plurality of high and low limits. For example, in the illustrated embodiment, the customer may set safety, alert, heat, and cool high and low limits. These limits may be used in controlling the corresponding HVAC system, as well as setting or delivering alert messages.

Selection of a home data icon 4.88C on the configuration data screen 4.86 displays a home data screen (not shown) within the control panel 4.10. The home data screen allows the customer to define various parameters regarding their home or the customer site 1.04 including details about the construction as well as defining water heaters and other devices which may be found at the customer site such as swimming pools, whirlpool baths, hot tubs, heated ponds, saunas, fountains, decorative lighting systems, auxiliary heat systems, and/or irrigation systems.

Selection of an energy switch icon 4.88D on the configuration data screen 4.86 displays information and allows the customer to modify parameters related to any energy management switches at the customer site 1.04.

With reference to FIGS. 4N and 4R, selection of the program icon 4.88E on the configuration data screen 4.86 displays a program participation screen 4.96 in the control panel 4.10. The program participation screen 4.96 provides a list 4.98 of all available power supply programs ("PSP") or PROGRAMS. The program participation screen 4.96 also includes a plurality of corresponding check boxes 4.100 which allow the customer to designate which PROGRAMS the customer desires to participate. The program participation screen 4.96 may also include other information regarding the listed PROGRAMS, including supply type, effective dates, and effective times. Each PROGRAM listed on the program participation screen 4.96 may be a hyperlink which, when selected, displays additional information related to the selected PROGRAM.

As discussed above, the customer GUI 4.02 allows the customer to view, configure and/or modify various parameters of the system 3.08. Generally, the type and nature of parameters which may be viewed or modified will be defined by the utility 1.06. As shown above, some of these parameters may be configured and/or modified using various drop down boxes, check boxes and/or entry boxes. However, it should be noted that some of these entry boxes, drop down lists and/or check boxes may be used to display certain parameters; however the utility may designate that the customer cannot modify these parameters.

5. Utility Control Node Management System and Method

With reference to FIGS. 5A through 5I, as discussed above, the utility interface 1.16 may be accessible through a web browser. With specific reference to FIG. 5A, after an authorized user at the utility 1.06 logs onto the system 1.02, a utility graphic user interface 5.02 is displayed. The utility GUI 5.02 includes a plurality of navigation links 5.04 on a utility display panel 5.06.

In the illustrated embodiment, the navigation links 5.04 include an immediate supply link, a scheduled supply link, a program definitions link, an active supply link, a supply history link, and a reports link. The navigation links also include a link to the utility GUI 5.02 home page and a link to log off the system. The utility display panel 5.08 includes a plurality of utility icons 5.08.

In the illustrated embodiment, the utility icons include an immediate supply icon 5.08A, a scheduled supply icon 5.08B, a program definitions icon 5.08C, and active supply icon 5.08D, a supply history icon 5.08E and a reports icon 5.08F. As discussed above, the utility interface 1.16 may be used to define or modify PROGRAMS, to display information regarding the current active supply of electricity over an electrical distribution network, provide information relating to the capacity of electricity available through implementation of one or more of the PROGRAMS, to supply historical data related to the distribution of electricity and to generate one or more reports.

Figures 5B, 5C:
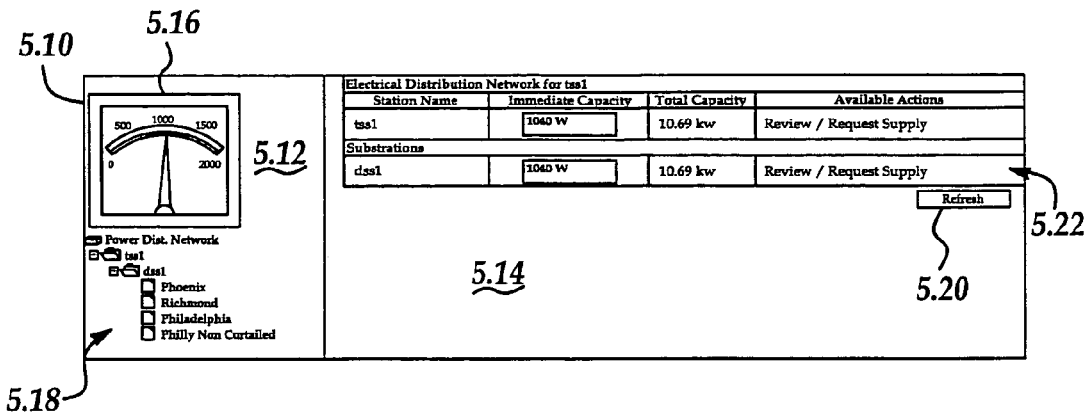
FIG. 5B is a graphical illustration of an immediate supply screen of the GUI of FIG. 5A.
FIG. 5C is a graphical illustration of an available program capacity pop-up of the GUI of FIG. 5A.

With reference to FIG. 5B, when the immediate supply icon 5.08A is selected, an immediate supply screen 5.10 is displayed within the utility display panel 5.06. The immediate supply screen 5.10 includes a power distribution network section 5.12 and an information section 5.14. In the illustrated embodiment, the power distribution network section 5.12 includes a meter 5.16 which provides an indication of the immediate capacity in watts (in real time) for the power distribution network.

In the illustrated embodiment, the power distribution network includes a single transmission substation, designated tss1, and a single distribution substation, designated dss1. Under the distribution substation, the following nodes are available: Phoenix, Richmond, Philadelphia and Philly non-curtailed, as shown. Within the system 1.02, one or more PROGRAMS may be defined which when activated may curtail one or more devices 1.08 across one or more customer sites 1.04 (see above). The meter 5.16 gives a graphical indication of the immediate power supply which is available from the PROGRAMS defined in the power distribution network.

Underneath the meter 5.16, a collapsible/expandable tree 5.18 is displayed. Each of the levels in the tree 5.18 are selectable. When a particular level within the tree 5.18 is selected, information regarding that level and the power distribution network above it are displayed within the information section 5.14. For example, as shown in FIG. 5B, when the distribution substation dss1 is selected, information regarding the station tss1 and the distribution substation dss1 are displayed.

In the information section 5.14 for each level of the distribution network, the immediate capacity and the total capacity are displayed. Immediate capacity is the real time instantaneous capacity available for the given level based on the defined PROGRAMS and the current status of all devices within those PROGRAMS. For example, for substation dss1 for all devices currently in a defined PROGRAM, those devices are drawing 1,040 watts. If the defined PROGRAMS were implemented, those devices would make available or supply 1,040 watts. The total capacity is the average for the current hour over a predetermined period, for example, the last seven weeks.

The information section 5.14 also includes a refresh button 5.20 which, when activated, refreshes or updates the information within the information section 5.14. Information related to each node, i.e., Phoenix, Richmond, Philadelphia or Philly non-curtail, may also be displayed in the information section by selection of the corresponding level within the power distribution network section 5.12. The information section 5.14 may also include a review/request supply link 5.22 for each component listed in the information section 5.14.

With reference to FIG. 5C, selection of the review request link 5.22 for a given node or station displays an available program capacity pop-up 5.24. The available program capacity pop-up 5.24 lists all defined PROGRAMS that are available for the given node at the current time. Each PROGRAM includes a corresponding checkbox 5.26 which enables the utility to activate a given PROGRAM. For each PROGRAM listed, the instantaneous, real time available power is listed in a box 5.28 for each PROGRAM. The total capacity 5.30 is also listed for each PROGRAM, i.e., if all defined devices 1.08 within a given PROGRAM were currently drawing power. The available power refers to the instantaneous power which would be available if the respective or corresponding PROGRAM were activated. The available program capacity pop-up 5.24 also includes a duration drop-down list 5.32. The available program capacity pop-up 5.24 may be utilized to immediately activate one or more PROGRAMS to free up capacity for selected duration. For example, in the illustrated embodiment if the emergency HVAC curtailment program and the emergency shut-off program were activated, the instantaneous available power would be 1200 watts. The available program capacity pop-up 5.24 also includes a submit button 5.34, a closed button 5.36 and a refresh button 5.38. If one or more of the checkboxes 5.26 were activated, and the submit button 5.34 were selected, the utility control system 1.12 would broadcast a curtailment signal to the gateway nodes 1.10D to shut down the affected devices 1.08 or otherwise curtail those devices 1.08. Activation of the closed button 5.36 closes the available program capacity pop-up 5.24. Activation of the refresh button 5.38 updates the available power available for each PROGRAM.

Figures 5D, 5E, 5F:
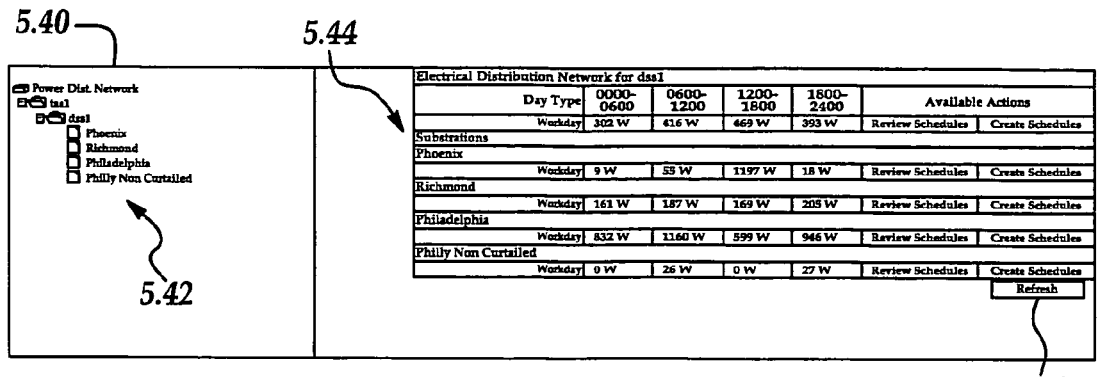
FIG. 5D is a graphical illustration of a scheduled supply screen of the GUI of FIG. 5A.
FIG. 5E is a graphical illustration of a find eligible program dialog of the GUI of FIG. 5A.
FIG. 5F is a graphical illustration of program summery table of the GUI of FIG. 5A.

With reference to FIG. 5D, selection of the scheduled supply button 5.08B displays a scheduled supply screen 5.40 in the utility display panel 5.06. The scheduled supply screen 5.40 includes a power distribution network tree 5.42 and an information section 5.44. As in the immediate supply screen 5.10, the tree 5.42 displays the stations, substations and nodes within the power distribution network. Each of the stations, substations and/or nodes may be selectable within the tree 5.42. Information related to the capacity available at the selected level within the tree 5.42 is displayed within the information section 5.44. In the illustrated embodiment, the power available at the given level during predetermined time periods of the current day are shown. This information is reflective of the capacity or power available from the scheduled PROGRAMS. For example, based on the activated programs, between military time 0000 and 0600, the scheduled programs in Philadelphia have a capacity of 832 watts. For each station, substation or node within the network, the utility 1.06 may review scheduled programs or create a new schedule for programs. The scheduled supply screen 5.40 also includes a refresh button 5.46 which when actuated updates the information in the information section 5.44.

Within the create schedules section of the GUI 5.02, a find eligible programs pop-up dialog 5.48 as shown in FIG. 5E is available. This dialog 5.48 allows the user at the utility to enter some or all information regarding a desired program or criteria for a program and search for any available program that fits the input criteria.

With reference to FIG. 5F, activation of the program definition button 5.08C displays a program summary table 5.50 in the utility display panel 5.10. The program summary table 5.50 lists and describes all available PROGRAMS. In the illustrated embodiment, each listed program may include a link 5.52 which leads to additional specific PROGRAM details. The program summary table 5.50 may also include a new button 5.54.

Figures 5G, 5H, 5I:
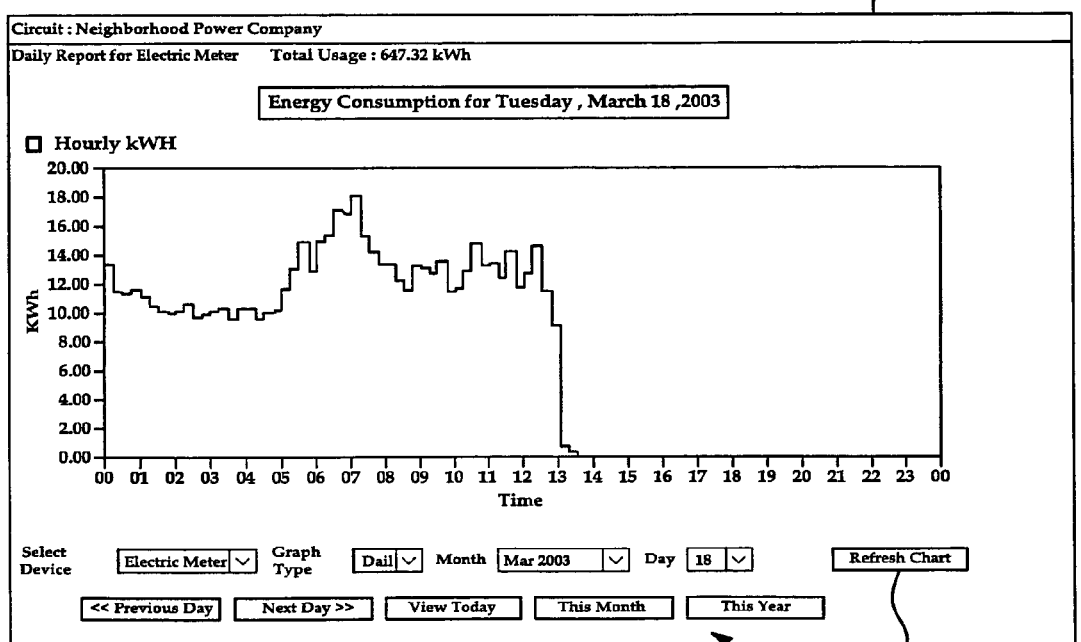
FIG. 5G is a graphical illustration of a program definition screen of the GUI of FIG. 5A.
FIG. 5H is a graphical illustration of a reports screen of the GUI of FIG. 5A; and, FIG. 5I is a graphical illustration of a portion of the reports screen of FIG. 5H.

With reference to FIG. 5G, selection of the new button 5.54 displays a program definition screen 5.56 in the utility control panel 5.10. The program definition screen 5.56 creates a new PROGRAM (see below). In one embodiment, the new PROGRAM may be broadcast to the gateway node 1.10D at each customer site 1.04. The customer may view the new PROGRAM along with the other available PROGRAM and subscribe to the new PROGRAM or any other available PROGRAM (see above).

In the illustrated embodiment, the program definition screen 5.56 includes a program name entry box 5.58 and a description entry box 5.60, both of which allow the user to enter appropriate text information.

The program definition screen 5.56 further includes a set of mutually exclusive supply type buttons 5.62 which allow the user to define a type associated with the PROGRAM. In the illustrated embodiment, the type may be one of "on demand" or "scheduled". An on demand PROGRAM can be implemented at any time, as needed, by the utility. However, an on demand PROGRAM may be limited to specific time periods. A scheduled PROGRAM is generally scheduled for specific days during specific time periods.

The program definition screen 5.56 also includes a set of drop down lists 5.64 which may be used to set PROGRAM available dates and times.

The PROGRAM may also be identified as "optional" or "overrideable" using one or more checkboxes 5.66. An optional PROGRAM may be opted into or subscribed to by the user. An overrideable PROGRAM means that once subscribed, the user may override the PROGRAM while it is running.

The program definition screen 5.56 may also include a plurality of checkboxes to 5.68 which is used to identify the types of devices 1.08 which may be included in the PROGRAM. In the illustrated embodiment, the system 3.08 includes HVAC systems, water heaters, pool pump and hot tubs/spas. A PROGRAM may be defined to include all devices 1.08 or one or more types of devices 1.08. The program definition screen 5.56 includes back button 5.70, a save button 5.72, and a reset button 5.74. Activation of the back button 5.70 returns the GUI 5.02 to the previous screen without saving the PROGRAM. Activation of the save button 5.72 save the current PROGRAM and returns the GUI 5.02 to the previous screen. Activation of the reset button 5.74 sets the values in the program definition screen 5.56 to default values.

Selection of the active supply button 5.08D displays a screen within the utility display panel 5.06 which provides detail regarding any active PROGRAMS. This screen may include a tree similar to the trees described above which details the power distribution network. The screen will also provide information related to all of the active PROGRAMS for any selected station, substation or node within the power distribution network. For example, for a given active PROGRAM, the following information may be provided: based on real time data received from the nodes 1.10, how many customers have signed up for the given program, how many customers are actively contributing to the given PROGRAM, and how many customers have opted out of the program. Furthermore, each device which may be affected by the program may be viewed.

Selection of the supply history button 5.08E displays a screen within the utility display panel 5.06 which provides historical data regarding any active program. The same type of information available for the active PROGRAMS (see above) may be available for any past time or time period.

With reference to FIGS. 5H and 5I, selection of the report button 5.08F displays a reports screen 5.76 within the utility display panel 5.06 which provides a graph of energy consumption for a given period of time for a given device or set of devices. In the illustrated reports screen 5.76, the total hourly energy consumption for Mar. 18, 2003 (as measured by the electric meters) is shown. The reports screen 5.76 includes an input section 5.78 which allows the user to select the device, e.g., electric meter, thermostat, water heater, pool pump or hut tub/spa, or the time period, e.g., daily, hourly, or monthly. The input section 5.78 also allows the user to change the time and/or date for which data is shown. The reports screen 5.76 also includes a refresh chart button 5.80 which may be used to update the graph to show updated real-time data and/or to reflect any changes made in the input section 5.78.

Obviously, many modifications and variations of the present invention are possible in light of the above teachings. The invention may be practiced otherwise than as specifically described within the scope of the appended claims.

The invention claimed is:

1. A system for managing environmental comfort at a site of a customer, the site having a temperature and environment management system, the temperature and environment management system being supplied with energy from an energy provider through a distribution network, comprising:
   a temperature sensor for sensing air temperature at the site; and,
   a thermostatic device being coupled to the temperature sensor and operable to establish a thermal gain characteristic of the site for a plurality of temperature setpoints and a plurality of outdoor air temperatures and a related percentage of run time of the temperature and energy management system as a function of the thermal gain characteristic and for receiving input from a user, the input including a desired temperature setpoint, the thermostatic device controlling the temperature and environment management system to operate at a fixed demand and consumption rate by varying the temperature setpoint based upon the thermal gain characteristic of the site.

2. A system, as set forth in claim 1, wherein the thermostatic device is selectively operable to either vary the demand and consumption rate when the thermostat control is based on the temperature setpoint or maintain the demand and consumption rate flat when the control is based on a fixed demand and consumption rate.

3. A system, as set forth in claim 1, wherein the demand and consumption rate is a reduced rate.

4. A system, as set forth in claim 1, wherein the thermostatic device uses a fixed demand and consumption rate control determined as a function of the temperature setpoint, the thermal gain characteristic and the operational characteristic.

5. A system, as set forth in claim 1, wherein the thermal gain characteristic and the operational characteristic include thermal recovery of the site.

6. A system, as set forth in claim 4, wherein the fixed demand and consumption rate can be modified to reduce demand for energy.

7. A system, as set forth in claim 3, wherein the fixed demand and consumption rate can be modified to reduce demand for energy.

8. A system, as set forth in claim 1, wherein the thermostatic device includes a display operable to convey information regarding the operation of the temperature and environment management system.

9. A system, as set forth in claim 8, wherein a current cost of energy and energy use information related to the site and individual devices within the site can be displayed using the thermostatic device display.

10. A system, as set forth in claim 3, wherein during a cooling operation, the thermostatic device reduces the operational characteristic and raises the setpoint to reduce total demand and raises the operational characteristic and lowers the setpoint to increase the total demand.

11. A system, as set forth in claim 3, wherein during a heating operation, the thermostatic device increases the operational characteristic and lowers the setpoint to reduce total demand and lower the operational characteristic and raises the setpoint to increase total demand.

12. A method for managing environmental comfort at a site of a customer, the site having a temperature and environment management system, the temperature and environment management system being supplied with energy from an energy provider through a distribution network, comprising:
    sensing air temperature at the site;
    establishing a thermal gain characteristic of the site for a plurality of temperature setpoints and a plurality of outdoor air temperatures and a base line of consumption;
    receiving input from a user, the input including a temperature setpoint; and,
    controlling the temperature and environment management system to operate at a desired demand and consumption rate by adjusting the temperature setpoint based upon the thermal gain characteristic of the site for the adjusted temperature setpoint to maintain the operation of the system at or below the base line of consumption.

13. A method, as set forth in claim 12, wherein the demand and consumption rate is flat.

14. A method, as set forth in claim 12, wherein the demand and consumption rate is a reduced rate.

15. A method, as set forth in claim 12, wherein the temperature and environment management system is controlled at a fixed demand and consumption rate.

16. A method, as set forth in claim 15, wherein the fixed demand and consumption rate can be modified to reduce demand for energy.

17. A method, as set forth in claim 12, further comprising the step of displaying the current cost of energy and energy use information related to the site and individual devices within the site using a thermostatic display device.

18. A method, as set forth in claim 12, wherein during a cooling operation, the thermal gain characteristic of the site is reduced and the temperature setpoint is raised to reduce the total demand and the thermal gain characteristic is raised and the temperature setpoint lowered to increase the total demand.

19. A method, as set forth in claim 12, wherein during a heating operation, the thermal gain characteristic is increased and the temperature setpoint is decreased to reduce total demand and the thermal gain characteristic is lowered and the temperature setpoint raised to increase total demand.

* * * * *